United States Patent
Brandt et al.

(10) Patent No.: US 11,253,064 B2
(45) Date of Patent: Feb. 22, 2022

(54) WALL MOUNT SYSTEM

(71) Applicant: Legrand AV Inc., Eden Prairie, MN (US)

(72) Inventors: Jamie Brandt, Savage, MN (US); Mathew Schuh, Savage, MN (US)

(73) Assignee: Legrand AV Inc., Eden Prairie, MN (US)

( * ) Notice: Subject to any disclaimer, the term of this patent is extended or adjusted under 35 U.S.C. 154(b) by 0 days.

(21) Appl. No.: 17/061,926

(22) Filed: Oct. 2, 2020

(65) Prior Publication Data

US 2021/0015255 A1 Jan. 21, 2021

Related U.S. Application Data

(63) Continuation of application No. 16/168,572, filed on Oct. 23, 2018, now abandoned, which is a
(Continued)

(51) Int. Cl.
| | |
|---|---|
| *G06F 1/16* | (2006.01) |
| *H05K 5/00* | (2006.01) |
| *H05K 7/00* | (2006.01) |
| *A47B 81/06* | (2006.01) |
| *F16M 11/10* | (2006.01) |

(Continued)

(52) U.S. Cl.
CPC .......... *A47B 81/061* (2013.01); *A47B 81/062* (2013.01); *A47B 81/064* (2013.01); *A47B 81/065* (2013.01); *A47B 97/001* (2013.01); *F16M 11/10* (2013.01); *F16M 11/18* (2013.01); *F16M 11/2092* (2013.01);
(Continued)

(58) Field of Classification Search
CPC ....... G06F 1/16; G06F 1/1601; H05G 5/0017; H05G 5/00; A47B 81/061; A47B 81/062; A47B 81/064; A47B 81/065; A47B 81/06
See application file for complete search history.

(56) References Cited

U.S. PATENT DOCUMENTS

| | | | |
|---|---|---|---|
| 7,438,269 | B2 | 10/2008 | Pfister |
| 7,878,473 | B1 | 2/2011 | Oh |

(Continued)

FOREIGN PATENT DOCUMENTS

| | | |
|---|---|---|
| CN | 101248238 A | 8/2008 |
| CN | 202 274 264 U | 6/2012 |

(Continued)

OTHER PUBLICATIONS

Chinese Office Action for Application No. 201480044801.6, dated Dec. 29, 2017 (7 pgs).

(Continued)

*Primary Examiner* — Anthony M Haughton
(74) *Attorney, Agent, or Firm* — Bradley J. Thorson

(57) ABSTRACT

A wall mount system for mounting a plurality of monitors on a wall. The system has a plurality of wall mount assemblies, a plurality of monitor interfaces adapted to receive an electronic display respectively, and a depth adjustment feature operably coupling each monitor interface to one of the wall mount assemblies and enabling the monitors to be positioned and adjusted to account for recesses or raised portions of the wall and present a continuous, planar monitor display surface.

14 Claims, 52 Drawing Sheets

Related U.S. Application Data continuation of application No. 14/896,176, filed as application No. PCT/US2014/041592 on Jun. 9, 2014, now Pat. No. 10,104,963.

(60) Provisional application No. 61/832,619, filed on Jun. 7, 2013, provisional application No. 61/900,517, filed on Nov. 6, 2013, provisional application No. 61/908,145, filed on Nov. 24, 2013.

(51) Int. Cl.
| | | |
|---|---|---|
| *F16M 11/18* | (2006.01) | |
| *F16M 11/20* | (2006.01) | |
| *F16M 13/02* | (2006.01) | |
| *A47B 97/00* | (2006.01) | |

(52) U.S. Cl.
CPC ........... *F16M 13/02* (2013.01); *H05K 5/0017* (2013.01); *F16M 2200/061* (2013.01)

(56) References Cited

U.S. PATENT DOCUMENTS

| | | | |
|---|---|---|---|
| 8,094,438 | B2 | 1/2012 | Dittmer et al. |
| 8,333,355 | B2 | 12/2012 | Stifal et al. |
| D675,213 | S * | 1/2013 | Stifal ........................... D14/451 |
| 9,146,001 | B2 * | 9/2015 | Stifal .................... F16M 11/24 |
| 9,383,060 | B2 * | 7/2016 | Geier .................... F16M 11/38 |
| 9,775,264 | B1 * | 9/2017 | Chiu .................... F16M 11/041 |
| 10,024,490 | B2 * | 7/2018 | Lam .................... F16M 11/046 |
| 10,508,766 | B2 * | 12/2019 | Gebril ................. A47B 97/001 |
| 10,533,702 | B2 * | 1/2020 | Kahn .................... A47B 97/001 |
| 11,016,319 | B2 * | 5/2021 | Iemura ..................... A47F 5/08 |
| 2006/0238967 | A1 | 10/2006 | Carson et al. |
| 2009/0656677 | | 3/2009 | Bakkom et al. |
| 2010/0309615 | A1 * | 12/2010 | Grey ..................... F16M 11/24 |
| | | | 361/679.01 |
| 2009/0656678 | | 2/2011 | Bremmon et al. |
| 2011/0198460 | A1 * | 8/2011 | Stifal ................... F16M 13/022 |
| | | | 248/201 |
| 2013/0119218 | A1 | 5/2013 | Astradsson et al. |
| 2013/0146727 | A1 * | 6/2013 | Oh ..................... F16M 11/2092 |
| | | | 248/277.1 |
| 2013/0206943 | A1 * | 8/2013 | Molter ................... F16M 13/02 |
| | | | 248/299.1 |
| 2017/0105529 | A1 * | 4/2017 | Kozlowski, Jr. ....... F16M 11/10 |

FOREIGN PATENT DOCUMENTS

| | | |
|---|---|---|
| CN | 202 674 111 U | 1/2013 |
| JP | 2002-354377 A | 12/2002 |
| JP | 2007-264634 A1 | 10/2007 |
| KR | 10-1083991 B1 | 11/2011 |
| WO | 2006/127826 A2 | 11/2006 |
| WO | 2011/099999 A1 | 8/2011 |

OTHER PUBLICATIONS

Chinese Office Action for Application No. 201480044801.6, dated Oct. 15, 2018 (4 pgs).
European Communication pursuant to Article 94(3) EPC for Application No. 14 807 732.4, dated Jul. 11, 2018 (4 pgs).
Extended European Search Report for Application No. 14807732.4, dated Feb. 22, 2017 (9 pgs).
International Preliminary Report on Patentability for Application No. PCT/US2014/041592, dated Dec. 17, 2015 (10 pgs).
International Search Report for Application No. PCT/US2014/041592, dated Sep. 30, 2014 (4 pgs).
Written Opinion for Application No. PCT/US2014/041592, dated Sep. 30, 2014 (10 Pgs).

* cited by examiner

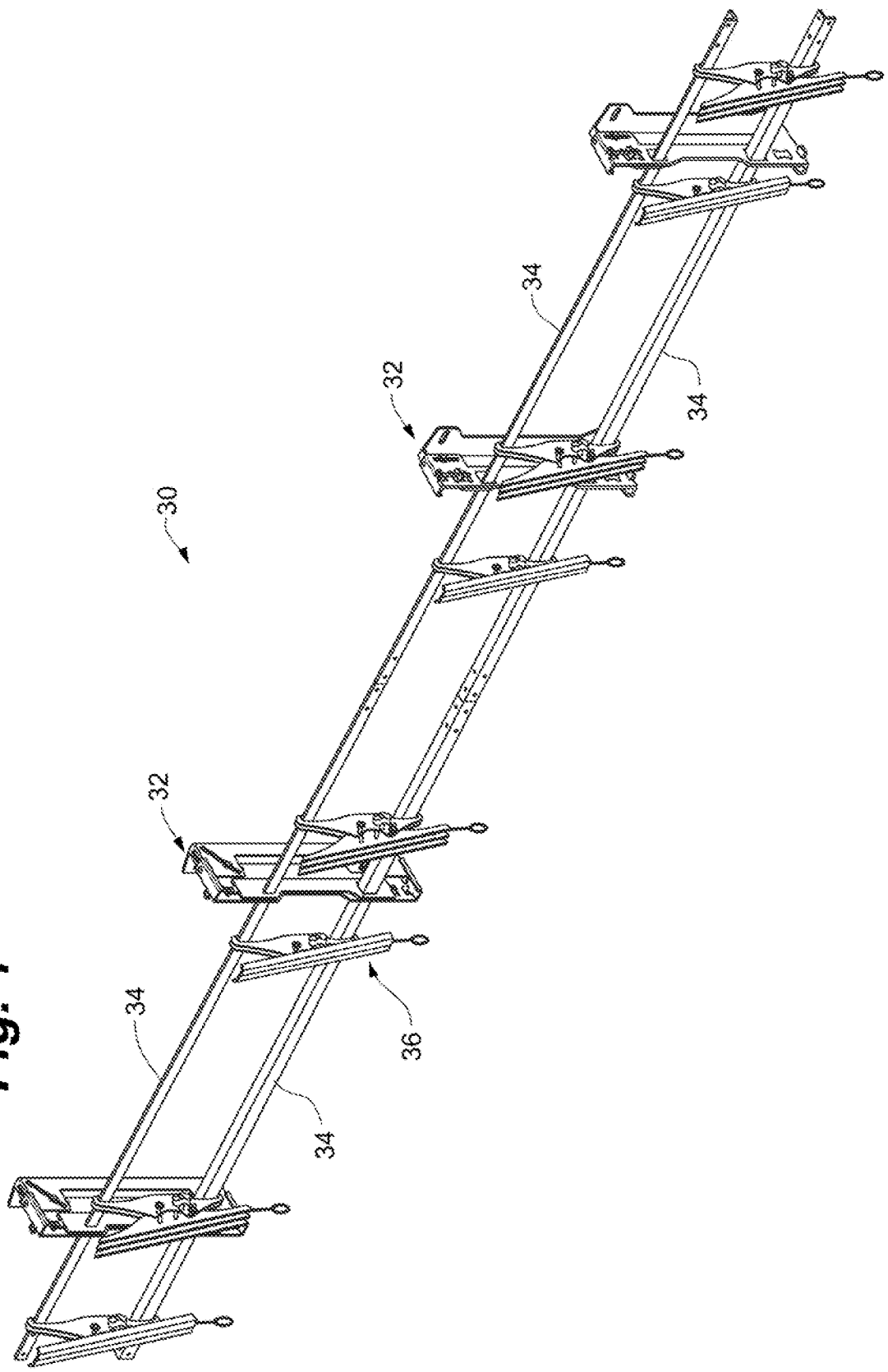

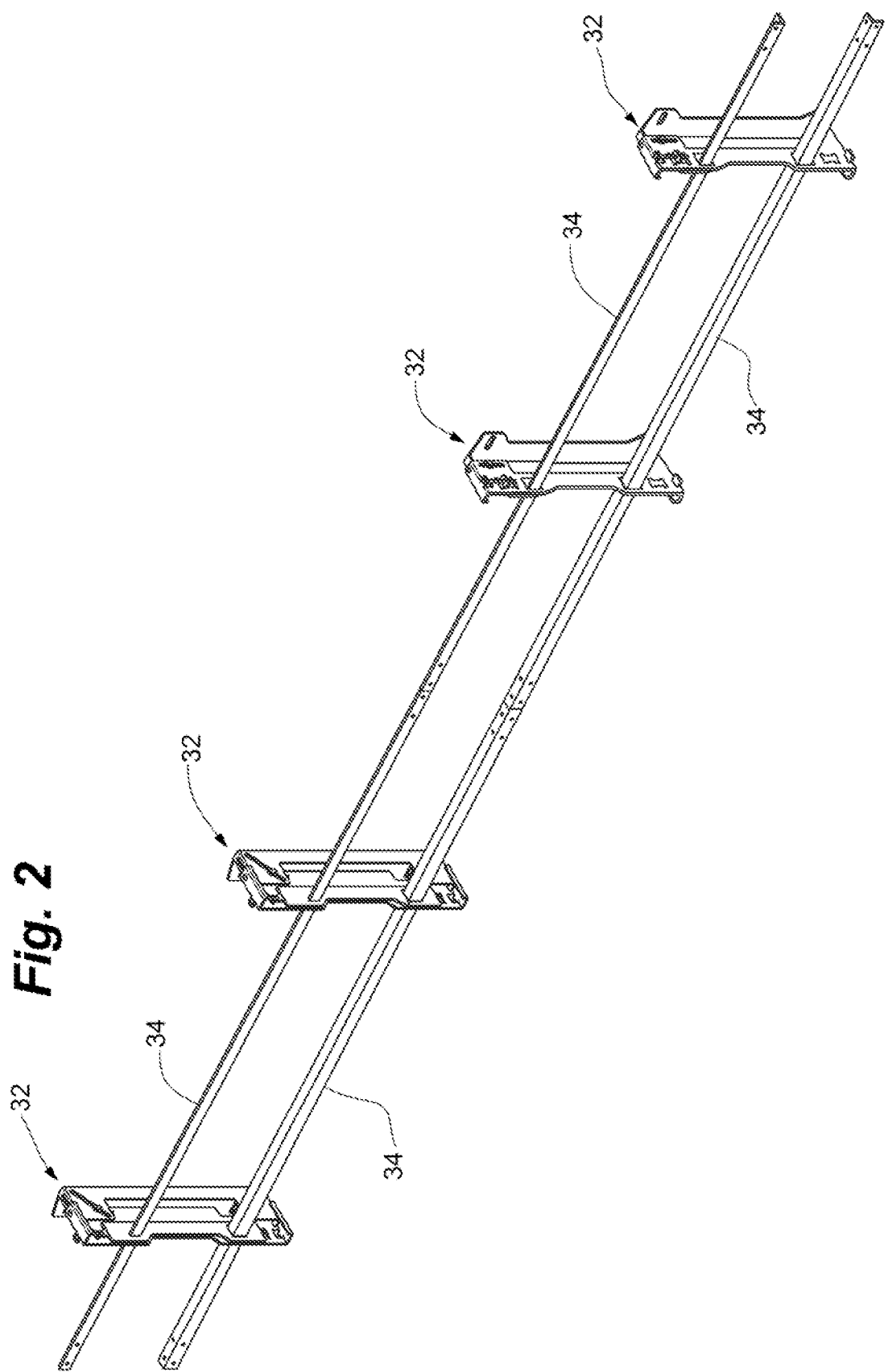

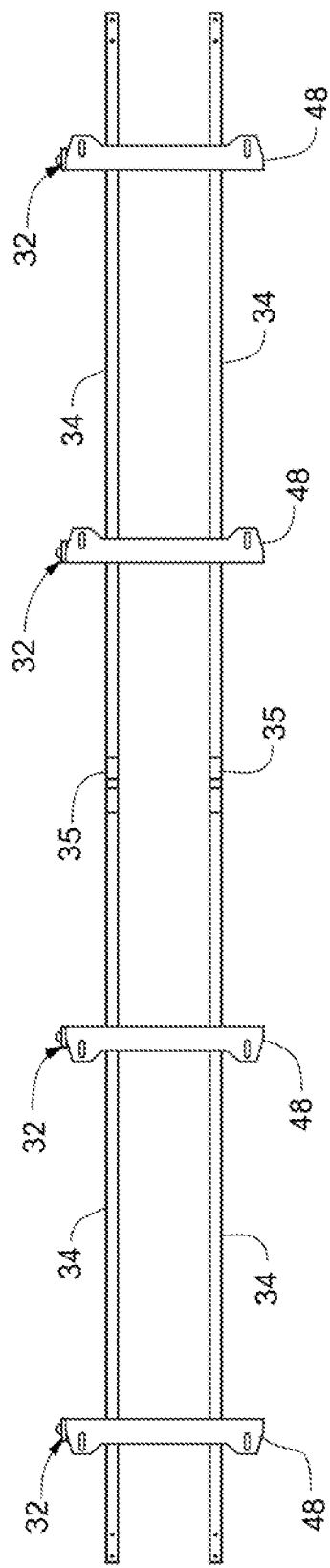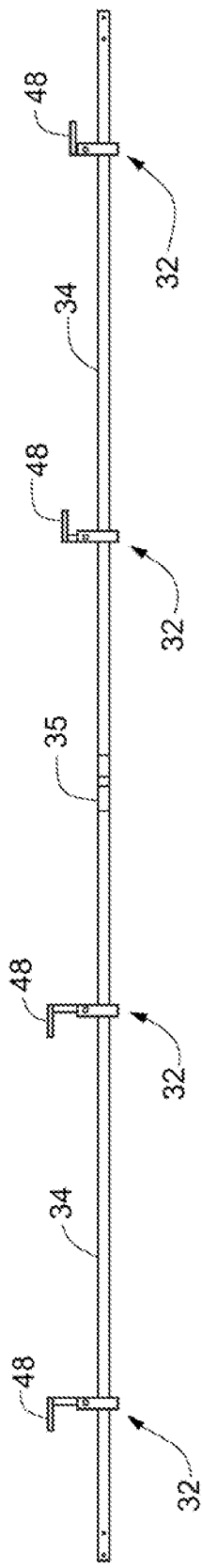

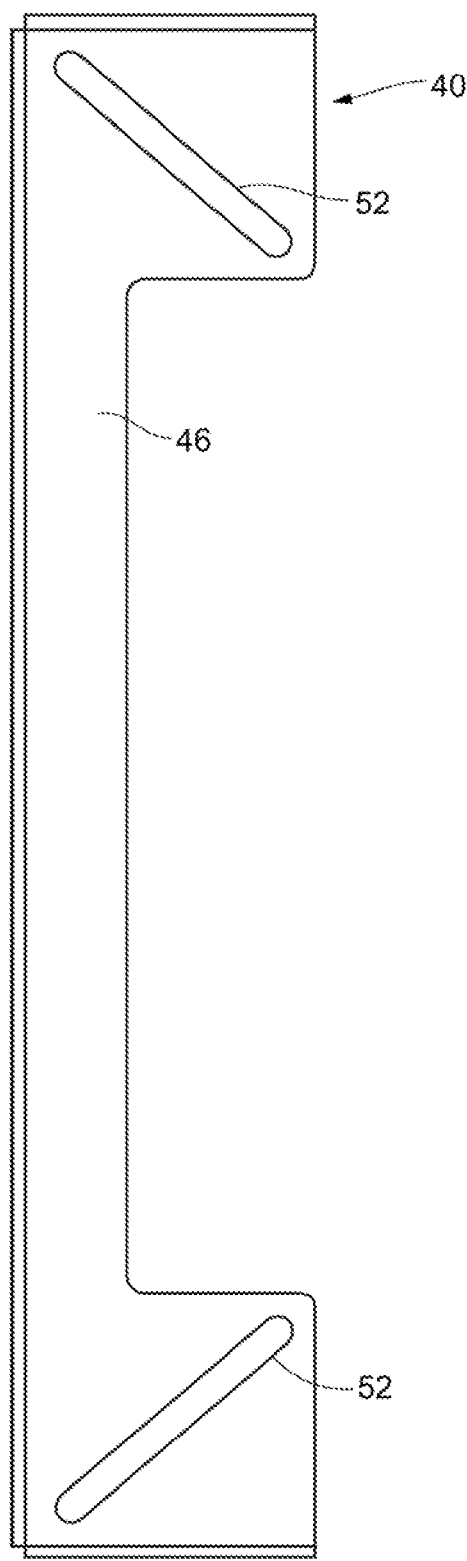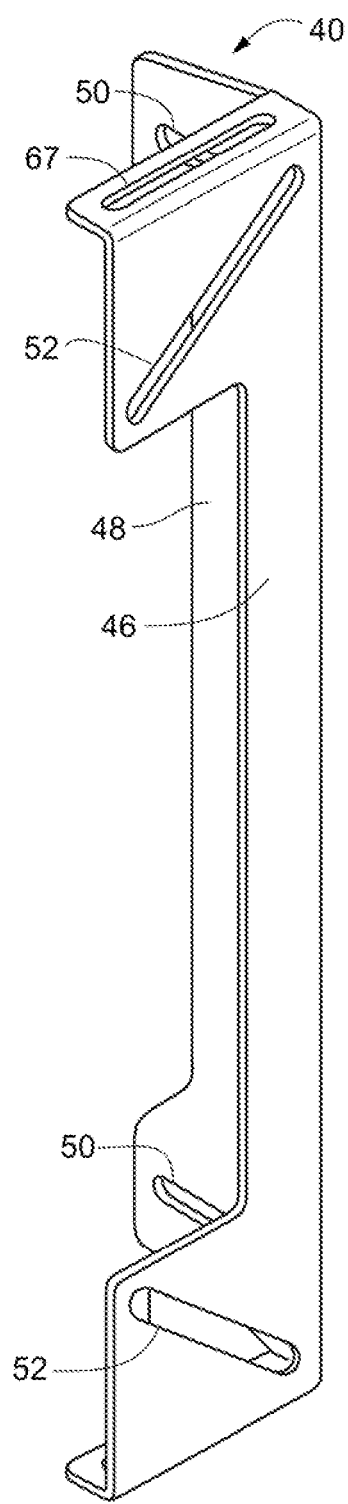

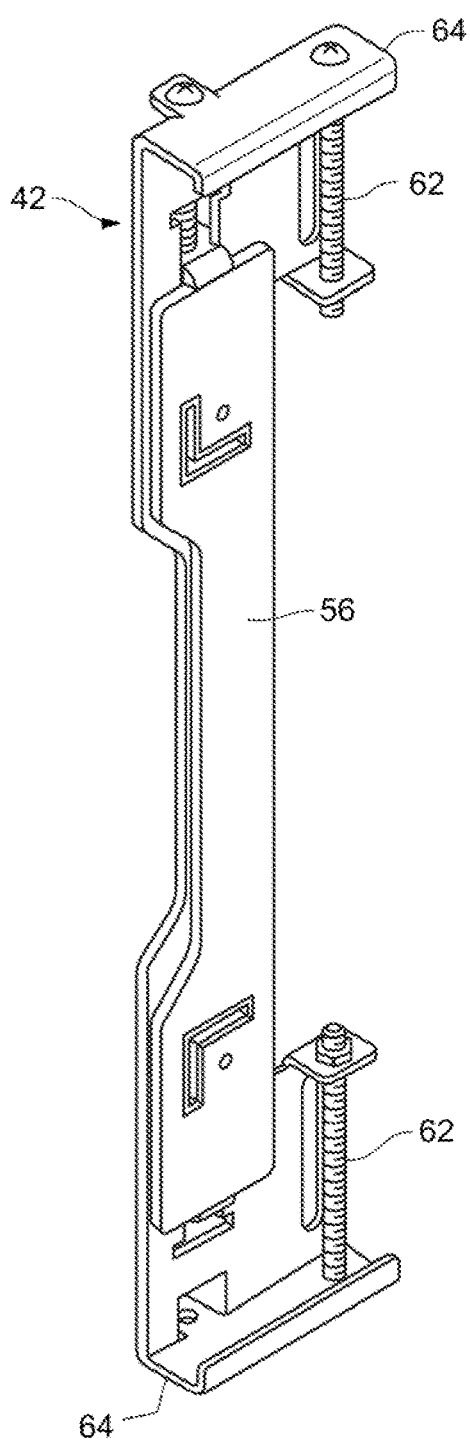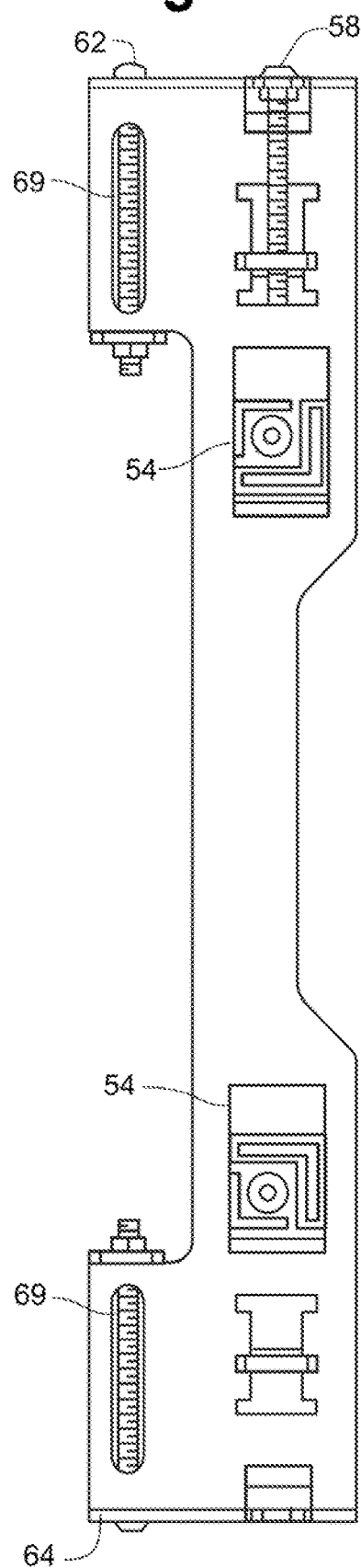

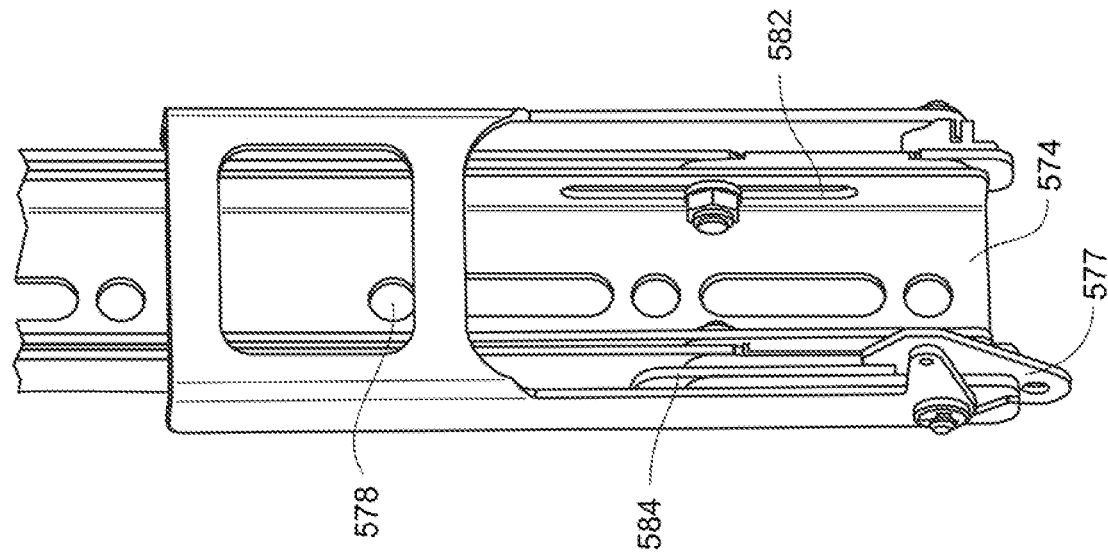
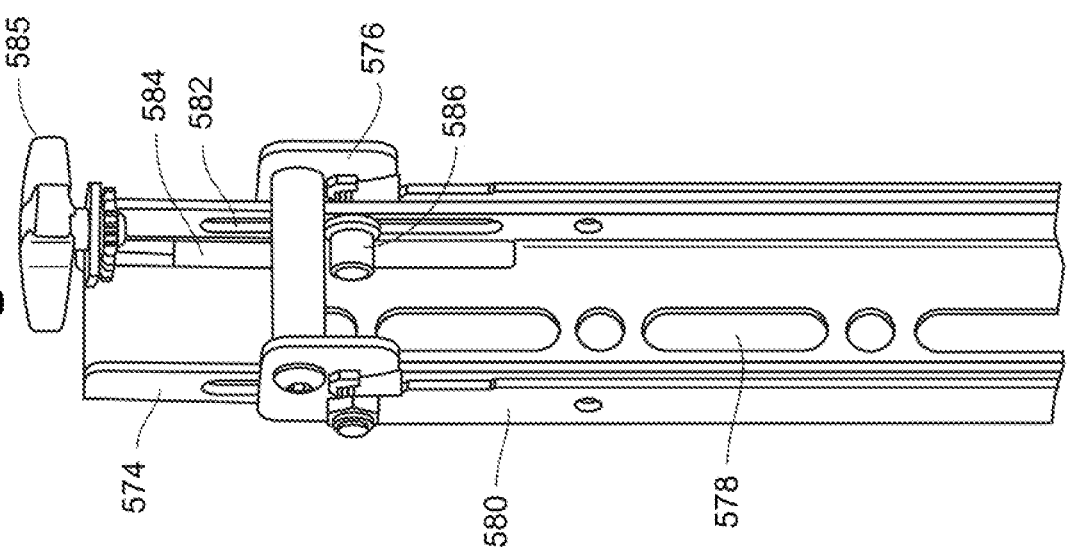

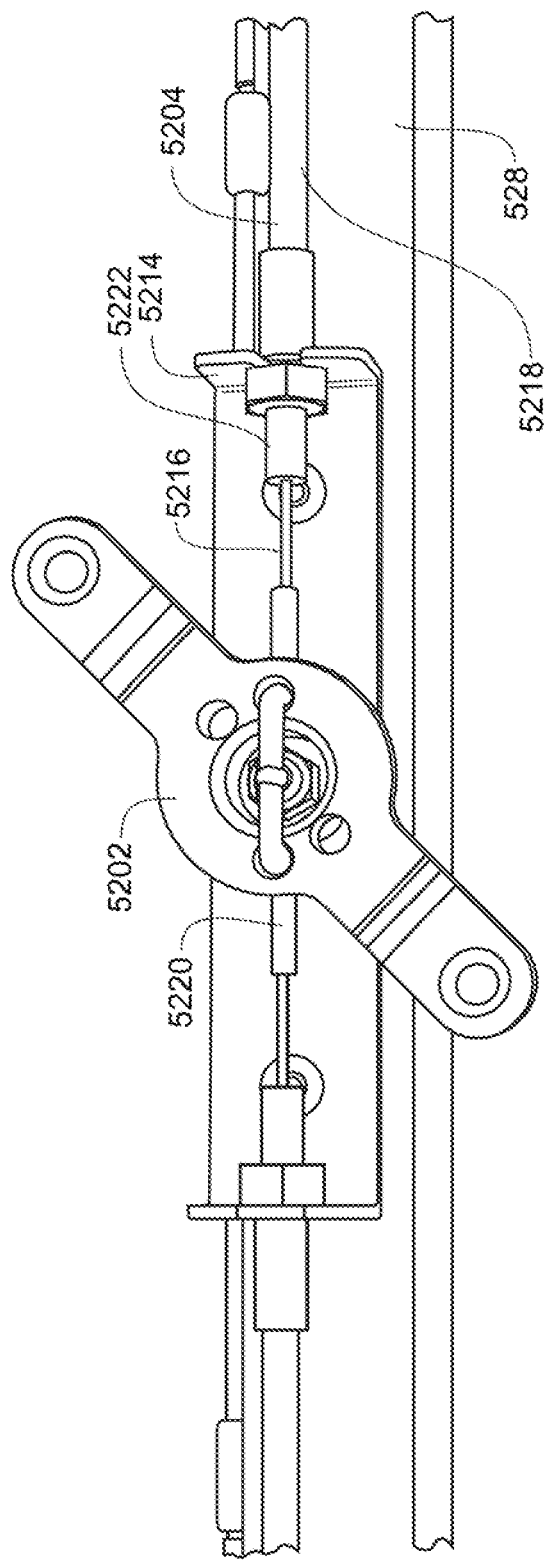

WALL MOUNT SYSTEM

RELATED APPLICATIONS

This application is a continuation of application Ser. No. 16/168,572, filed Oct. 23, 2018, and entitled "WALL MOUNT SYSTEM," which is a continuation of application Ser. No. 14/896,176, filed Dec. 4, 2015, now issued as U.S. Pat. No. 10,104,963 and entitled "WALL MOUNT SYSTEM" which is a national phase entry of PCT Application No. PCT/US2014/041592, filed Jun. 9, 2014 and entitled "WALL MOUNT SYSTEM"; which claims the benefit of U.S. Provisional Application No. 61/832,619, filed Jun. 7, 2013, and entitled "WALL MOUNT SYSTEM" U.S. Provisional Application No. 61/900,517, filed Nov. 6, 2013, and entitled "WALL MOUNT SYSTEM" and U.S. Provisional Application No. 61/908,145, filed Nov. 24, 2013, and entitled "WALL MOUNT SYSTEM", the entire disclosures of which are hereby fully, incorporated herein by reference.

FIELD OF THE INVENTION

The present invention is directed to a wall mount system for mounting television or computer monitors to a wall. Specifically, the present invention is directed to a wall mount system having adjustment features for positioning the monitor in a desired orientation when mounted on uneven or contoured walls.

BACKGROUND OF THE INVENTION

Television or computer monitors are often mounted on walls in restaurants, malls and similar settings with wall mounts to provide dynamically changing display updatable décor or information to viewers. Similarly, wall mounting of monitors in the home has also substantially increased in popularity. A wall mount also typically includes a monitor bracket engagable to the corresponding mounting features on the rear of the monitor. A wall mount also typically includes at least one wall bracket for securing the wall mount to the wall or underlying structure. Wall brackets often include a substantial foot print on the wall to distribute the weight of the monitor over a large portion of the wall. Typically, the wall bracket includes a large plate or frame positioned against the wall and secured with a plurality of fasteners to provide multiple anchor points between the wall and the wall mount. A tight fit between the wall bracket and the wall is necessary to prevent wobbling of the wall bracket, which can cause the fasteners to separate from the wall. Wall mounts are often incompatible with uneven or contoured walls where the wall mount is affixed over recesses or raised wall portions or the wall mount and correspondingly the monitor must be positioned in an awkward location on the wall.

A similar challenge is that wall mounted monitors are often used to form displays having a large viewable area such that the display can be viewed or read from a distance. Oversized or non-standard sized display monitors are often disproportionately more expensive than smaller monitors. Similarly, the display often includes a unique shape, such as an L-shape, to provide a desired aesthetic appearance or fit the display within the desired space. Typically, multiple conventionally sized monitors are arranged edge-to-edge to provide the desired display size or shape rather than a mounting a single oversized or uniquely shaped monitor.

In these configurations, each monitor is individually mounted to the wall and oriented to position the monitor into alignment with the adjoining monitors to present a continuous planar display. An individual wall mount is typically required for each monitor to ensure that the weight of each monitor is sufficiently supported. The inherent challenge with this arrangement is that each monitor must be individually oriented to present a single continuous display in a single plane. In particular, the alignment of the monitors is further complicated when the monitors are mounted to an uneven or contoured walls in which the recesses and raised portions of the wall change the relative initial depth of the mounting bracket of each monitor resulting in an uneven display. The issue is further complicated with large monitors where the weight of the monitor itself makes positioning and orienting the monitor more challenging. In addition, the increased weight of the monitor decreases the possible distance the monitor can be positioned away from the wall as the increased leverage could cause the fasteners to separate from the wall.

The inherent challenge of mounting monitors on uneven or contoured walls creates a need for mounting monitors to non-planar walls while still positioning the monitor in the desired orientation. Similarly, there is need for a means of aligning the multiple monitors positioned on non-planar walls to present a continuous, planar display.

SUMMARY OF THE INVENTION

A wall mount system, according to an embodiment of the present invention, can include a plurality of wall mount assemblies, at least one guide bar and a plurality of monitor mount assemblies. Generally, the wall mount assemblies can be affixed to the wall to position a guide bar in a generally horizontal orientation such that the monitor mount assemblies can be hung on the guide bar or otherwise engaged to the guide bar. Each wall mount assembly can include a depth adjustment feature for expanding or contracting each wall mount assembly independently of the adjacent wall mount assemblies. The independent depth adjustment feature allows the wall mount assemblies to be individually adjusted to account for recesses and raised portions of the wall such that the linear guide bar can intersect each wall mount assembly without bending the linear guide bar. The linear guide bar positions the monitor mount assemblies along a single axis rather than at varying depths such as when the monitor mount assemblies are mounted directly to the uneven or contoured wall. Accordingly, the guide bar facilitates edge-to-edge alignment of the monitors.

In certain embodiments of the present invention, each wall mount assembly can include a wall bracket, a base bracket and a depth adjustment assembly for moving the base bracket relative to the wall bracket along a linear axis to expand or contract the wall mount assembly. Each wall bracket can be positioned against a wall and affixed to the wall, wherein the depth adjustment assembly can be operated to move the base bracket to align an aperture of the base bracket with a corresponding aperture of the base bracket of an adjacent wall mount assembly. Each of the plurality of wall brackets can be individually expanded or contracted depending on the contours of the underlying wall while maintaining alignment of the base brackets. The guide bar can then be inserted through the aligned apertures to position the guide bar in a generally horizontal orientation such that monitor mounts can be hung on the guide bar. The individual depth adjustability of the wall mount assemblies provides continuous support for the guide bar regardless of whether the wall bracket is affixed to a recessed or raised portion of the wall.

In certain embodiments, each base bracket can further include a traveler mounted on a worm screw and positioned within the aperture. In this configuration, the aperture is elongated vertically such that the traveler can be moved vertically within the aperture by rotating the worm screw. The traveler can be operably engaged to the guide bar such that moving the traveler by rotating the worm screw raises or lowers the base bracket relative to the guide bar. The traveler provides an additional point of variability in the wall mount assembly to account for unevenness or contouring of the wall.

A wall mount system, according to an embodiment of the present invention, includes a plurality of wall mount assemblies, at least one guide bar, and a plurality of monitor mount assemblies. Each wall mount assembly can further include a wall bracket, a base bracket and a depth adjustment assembly for moving the wall bracket relative to the base bracket along a linear axis. The base bracket can further include an aperture for slidably receiving the at least one guide bar. Each monitor mount includes a hanger element and a mount element pivotably engaged to the hanger element, wherein the hanger element is engagable to the guide bar inserted through the apertures of the base brackets. The mount element can be pivoted relative to the mount element to change the pivot of the mounted monitor.

A wall mount system, according to an embodiment, can include a plurality of wall bracket assemblies, a guide bar assembly and a plurality of monitor mount assemblies. Generally, wall tracks can be affixed to the wall in a generally horizontal orientation such that a depth adjustment assembly can be hung on the wall track or otherwise engaged to the wall track. Each wall mount system can include a depth adjustment feature for expanding or contracting each wall mount system independently of the adjacent wall mount systems. Each wall mount system can include a tilt adjustment feature for tilting of each wall mount system independently of the adjacent wall mount systems. Each wall mount system can include a skew adjustment feature for skewing each wall mount system independently of the adjacent wall mount systems. Each wall mount system can include a horizontal inclination or declination adjustment feature for horizontal inclining or declining each wall mount system independently of the adjacent wall mount systems. The independent depth adjustment, tilt adjustment, skew adjustment, and horizontal adjustment features allow the wall mount systems to be individually adjusted to account for recesses and raised portions of the wall such that the wall track can intersect each wall mount system without bending the wall track. The wall mount system positions the monitor mount assemblies along a single axis rather than at varying depths such as when the monitor mount assemblies are mounted directly to the uneven or contoured wall. Accordingly, the wall mount system facilitates edge-to-edge alignment of the monitors.

A method of presenting a continuous, planar display from a plurality of monitors, according to an embodiment of the present invention, can include providing a plurality of wall mount assemblies, wherein each wall mount assembly can further include a wall bracket, a base bracket and a depth adjustment assembly adjustably linking the wall bracket to the base bracket. The method can further include affixing each wall bracket to a wall. In certain embodiments, the wall brackets can be positioned on the wall along a generally horizontal axis. The method can also include operating each depth adjustment assembly to move the corresponding base bracket relative to the wall bracket and along an axis perpendicular to the wall to align the base brackets along a single horizontal axis. The method can further include inserting at least one guide bar through an aperture in each base bracket such that the wall mount assemblies support the guide bar.

The method can also include providing a plurality of monitor mount assemblies each having a hanger element and a monitor element pivotably engaged to the hanger element. The method can further include slidably engaging each hanger element to the guide bar. The method can also include mounting a monitor to each monitor element. In certain embodiments, each hanger element can be slid along the guide bar to move the monitors horizontally to position the monitors in an edge-to-edge configuration. Similarly, in certain embodiments, each monitor element can be rotated to orient the monitors.

A wall mount system, according to an embodiment of the present invention, can include a wall mount assembly, an adjustment assembly, a guide bar assembly and a monitor mount assembly. Generally, the wall mount assembly can be positioned against the wall and secured to the wall. The adjustment assembly can be positioned on the wall mount assembly and operated to move a guide bar assembly relative to the wall mount assembly. Specifically, the adjustment assembly can include an elevation assembly for raising or lowering the guide bar assembly relative to the wall mount assembly so as to adjust the vertical position of a connected display relative to the wall. Similarly, the adjustment assembly can also include an adjustment assembly for moving the guide bar assembly toward or away from the wall mount assembly and correspondingly the wall. In addition, the engagement between the wall mount assembly and the guide bar assembly can adjusted to angle the guide bar assembly. The guide bar assembly includes a pair of parallel guide bars engagable by the monitor mount assembly, wherein the orienting of the guide bar assembly by the adjustment assembly correspondingly changes the positioning of the guide bars and any attached monitor mount assembly. The adjustability of the adjustment assembly allows the wall mount to be positioned in a more suitable portion of the wall, such as a more planar portion, without sacrificing the desired position of the monitor.

In certain embodiments, the wall mount assembly can include a pair of elongated wall tracks that can be affixed horizontally on the wall and can further include at least one pair of wall plates extending between the horizontally positioned wall tracks. An extension assembly and an elevation assembly are positioned on each wall plate, wherein the guide bar assembly is suspended between each pair of wall tracks. In this configuration, the wall tracks can be elongated to permit multiple pairs of wall plates and corresponding guide bar assemblies to be mounted the pair of wall tracks such that multiple monitors can be mounted a single pair of wall tracks. The single pair of wall tracks operates to provide a level mounting position for the each monitor mounted on one of the guide bar assemblies vertically aligned.

In certain embodiments, each monitor mount can include a mount plate having a pair of hook elements for slidably engaging the horizontally oriented guide bars. In certain configurations, the hook elements rely on gravity to maintain the engagement to the guide bars. In other configurations, the hook elements are adapted to receive fasteners for fixing the hook portions to the guide bars. In yet other embodiments, the hook elements can be spring biased to close around the guide bars to prevent disengagement from the guide bar assembly. In this configuration, the monitor mount assembly can further include a pull wire that can be pulled to over the biasing and open the hook elements. In certain embodiments, the monitor mount assembly can further include a lateral adjustment assembly for moving the monitor mount assembly horizontally along the guide bars providing another degree of adjustability to the wall mount system.

In certain embodiments, each adjustment assembly can include a lift plate, a primary extension plate, an elevation assembly and an extension assembly. The elevation assembly can include a worm gear rotatable by handle and can further include a traveler affixed to the lift plate. The worm gear is operably engaged to a corresponding wall plate such that rotation of the worm gear moves the traveler affixed to the lift plate, which in turn elevates the adjustment assembly and guide bar assembly. Similarly, the extension assembly further includes a worm gear positioned on the lift plate and a traveler affixed to a secondary extension plate through an elongated guide notch in the lift plate. The guide notch is angled such that moving the traveler causes the secondary extension plate to move outwards as the traveler is moved by the rotation of the worm gear. In certain embodiments, the secondary extension plate includes a spindle receivable within a second guide notch in the primary extension plate. The second guide notch is transverse to the first guide notch such that the extension of the secondary extension plate by the movement of the traveler causes the spindle to move within the second guide notch causing extension of the primary extension plate.

The above summary of the various representative embodiments of the invention is not intended to describe each illustrated embodiment or every implementation of the invention. Rather, the embodiments are chosen and described so that others skilled in the art can appreciate and understand the principles and practices of the invention. The figures in the detailed description that follow more particularly exemplify these embodiments.

BRIEF DESCRIPTION OF THE DRAWINGS

The invention can be completely understood in consideration of the following detailed description of various embodiments of the invention in connection with the accompanying drawings, in which:

FIG. 1 is a perspective view of a wall mount system according to an embodiment of the present invention;

FIG. 2 is a perspective view a plurality of wall mount assemblies and a plurality of guide bars of the wall mount system depicted in FIG. 1;

FIG. 3 is a rear view of the plurality of wall mount assemblies and guide bars depicted in FIG. 2;

FIG. 4 is a top view of the plurality of wall mount assemblies and guide bars depicted in FIG. 2;

FIG. 8 is a side view of a wall bracket of a wall mount assembly according to an embodiment of the present invention;

FIG. 9 is a perspective view of the wall bracket depicted in FIG. 8;

FIG. 10 is a perspective view of a base bracket of a wall mount assembly according to an embodiment of the present invention;

FIG. 11 is a side view of the base bracket depicted in FIG. 10;

FIG. 57 is a perspective rear view of the topmost portion of a monitor mount assembly according to an embodiment;

FIG. 58 is a perspective rear view of the bottommost portion of a monitor mount assembly according to an embodiment;

FIG. 60 is a perspective view of a cable release system handle of a monitor mount assembly according to an embodiment.

Figure 5:
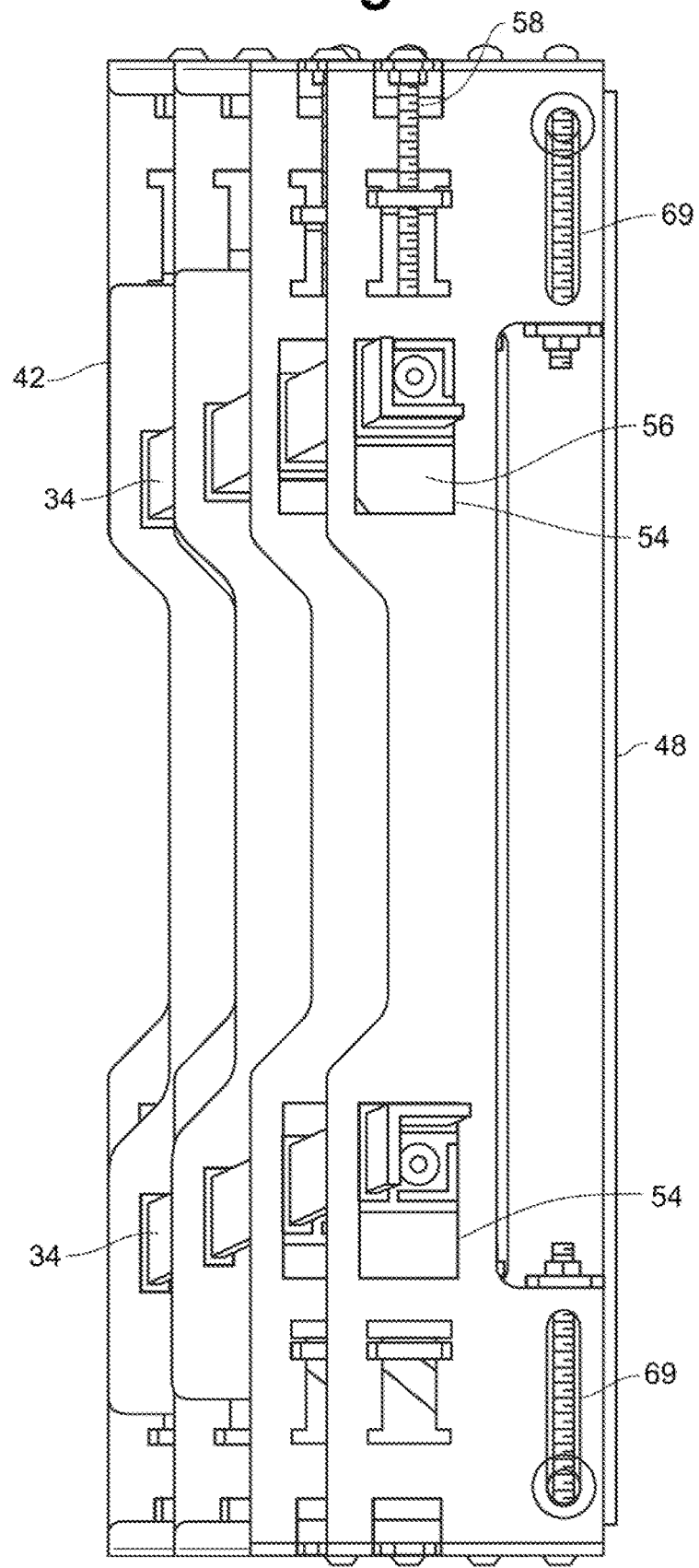
FIG. 5 is side view of the plurality of wall mount assemblies and guide bars depicted in FIG. 2.
Figure 6:
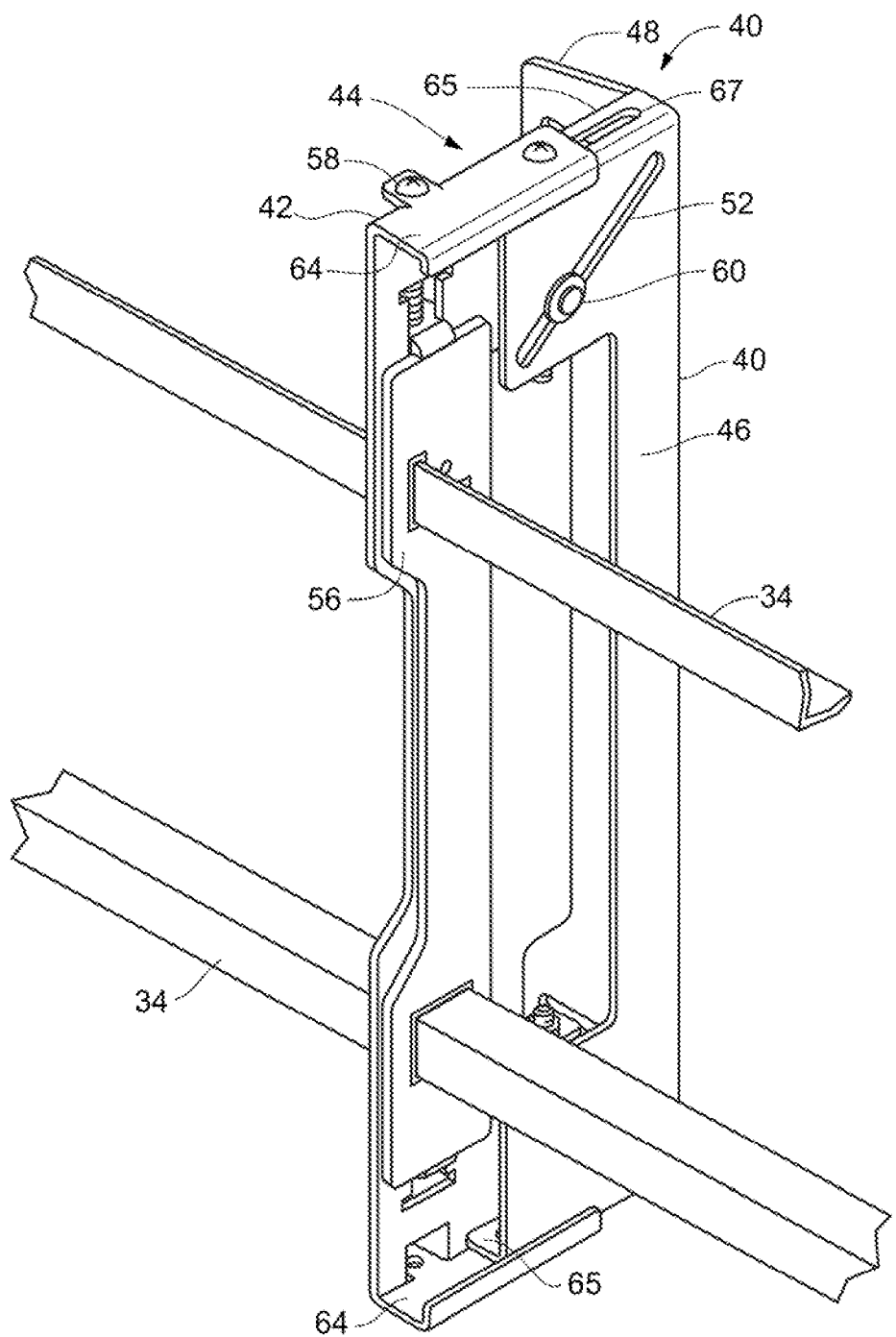
FIG. 6 is a perspective isolated view of a wall mount assembly positioned on a plurality of guide bars according to an embodiment of the present invention.
Figure 7:
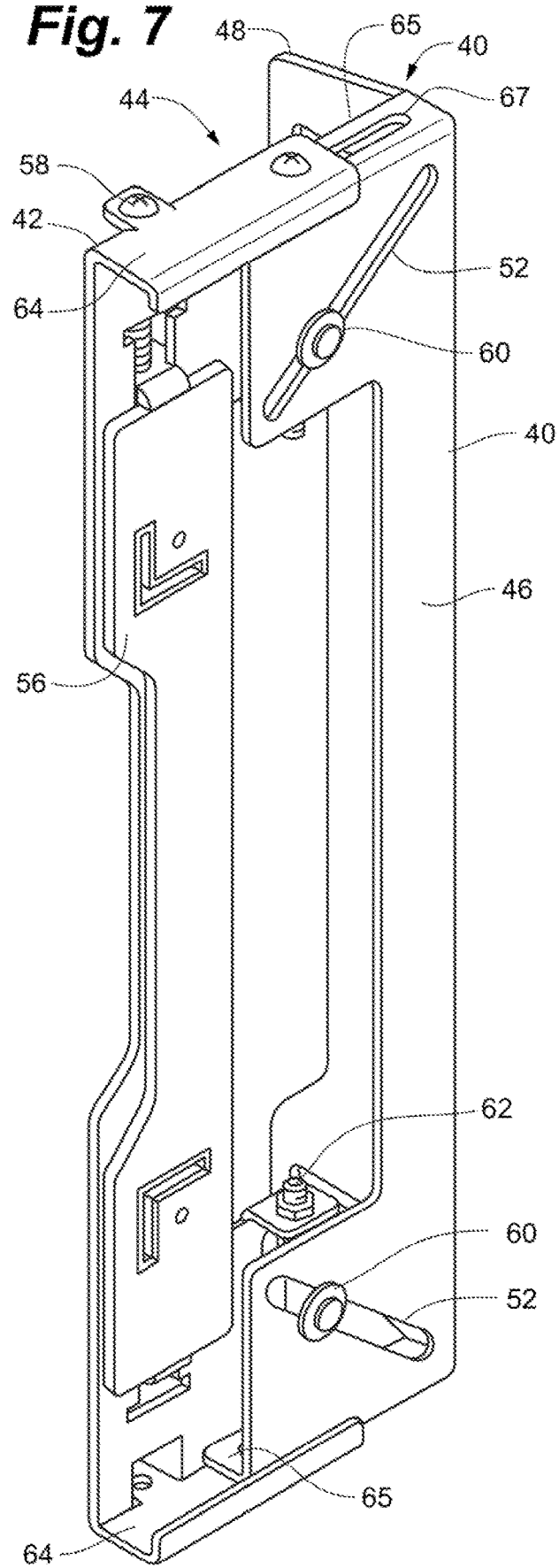
FIG. 7 is a perspective view of a wall mount assembly according to an embodiment of the present invention.
Figure 12:
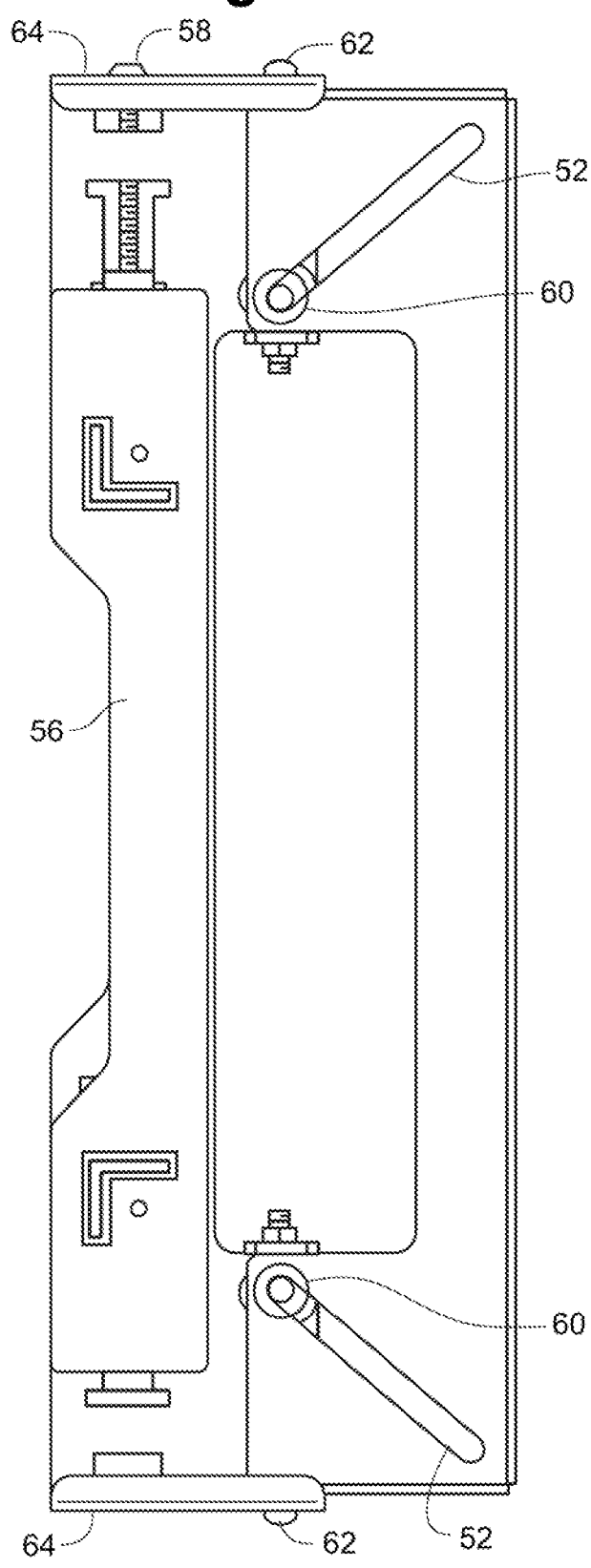
FIG. 12 is a side view of a wall mount assembly according to an embodiment of the present invention with the wall bracket extended linearly from the base bracket by a depth adjustment assembly according to an embodiment of the present invention.
Figure 13:
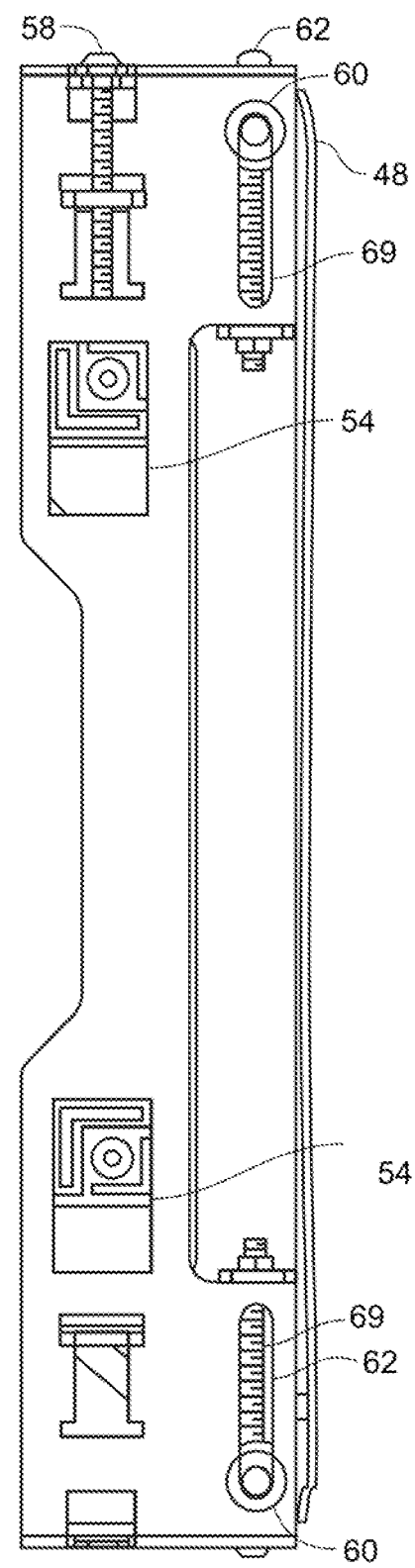
FIG. 13 is a side view of a wall mount assembly according to an embodiment of the present invention with the wall bracket retracted linearly from the base bracket by a depth adjustment assembly according to an embodiment of the present invention.
Figure 14:
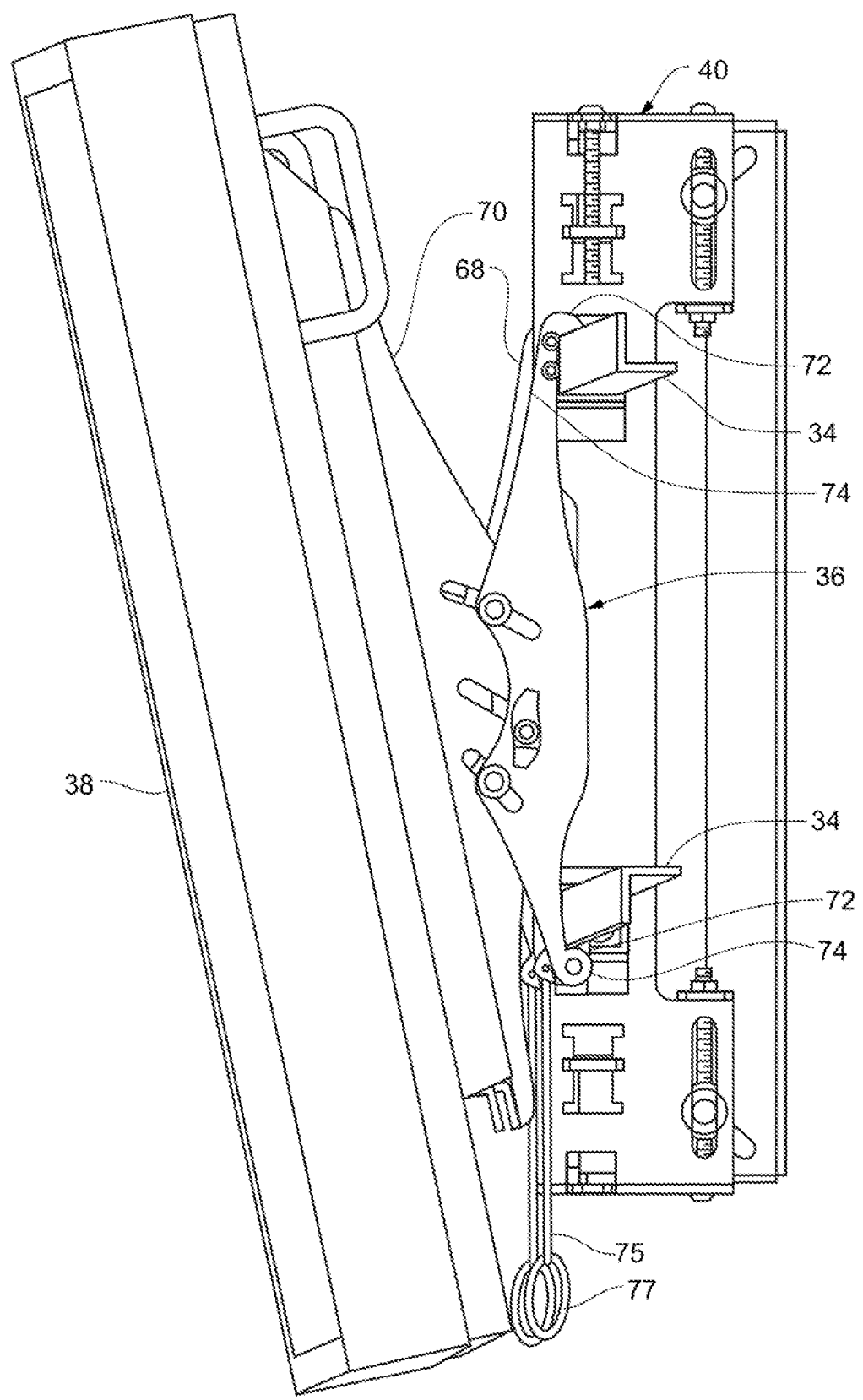
FIG. 14 is a perspective view of a monitor mounted on a monitor mount assembly, wherein the monitor mount assembly is positioned on a plurality of guide bars attached to a wall by a wall mount assembly according to an embodiment of the present invention.
Figure 15:
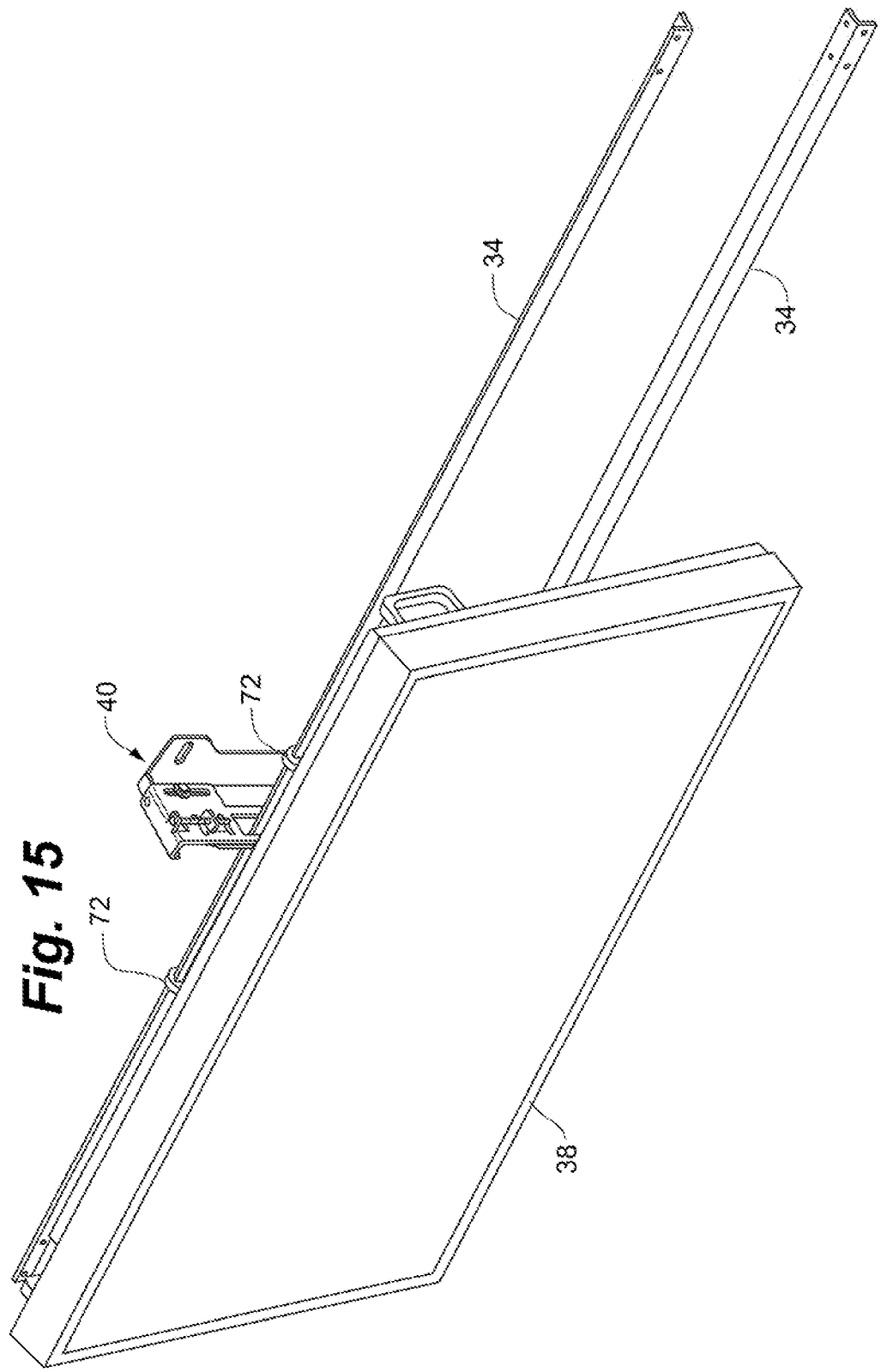
FIG. 15 is a perspective view of the monitor assembly depicted in FIG. 14.
Figure 16:
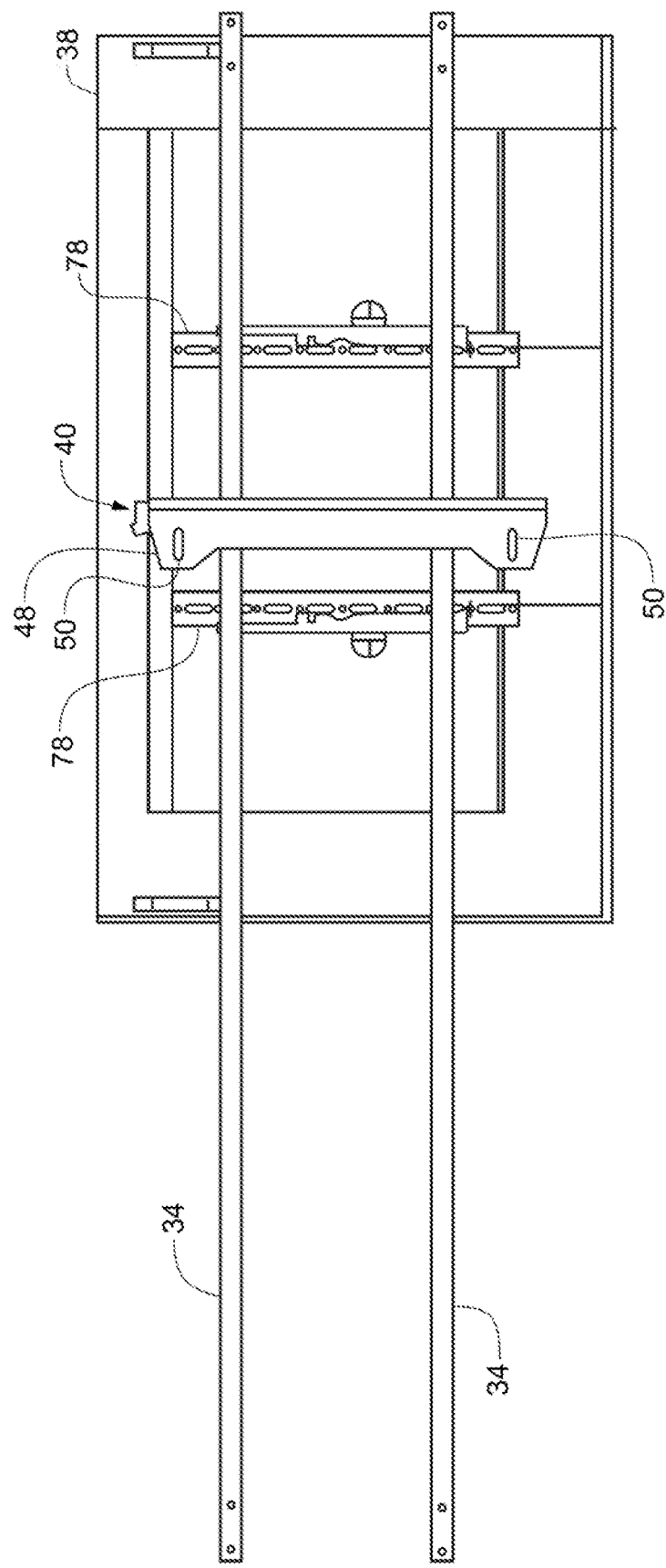
FIG. 16 is a rear view of the monitor assembly depicted in FIG. 14.
Figure 17:
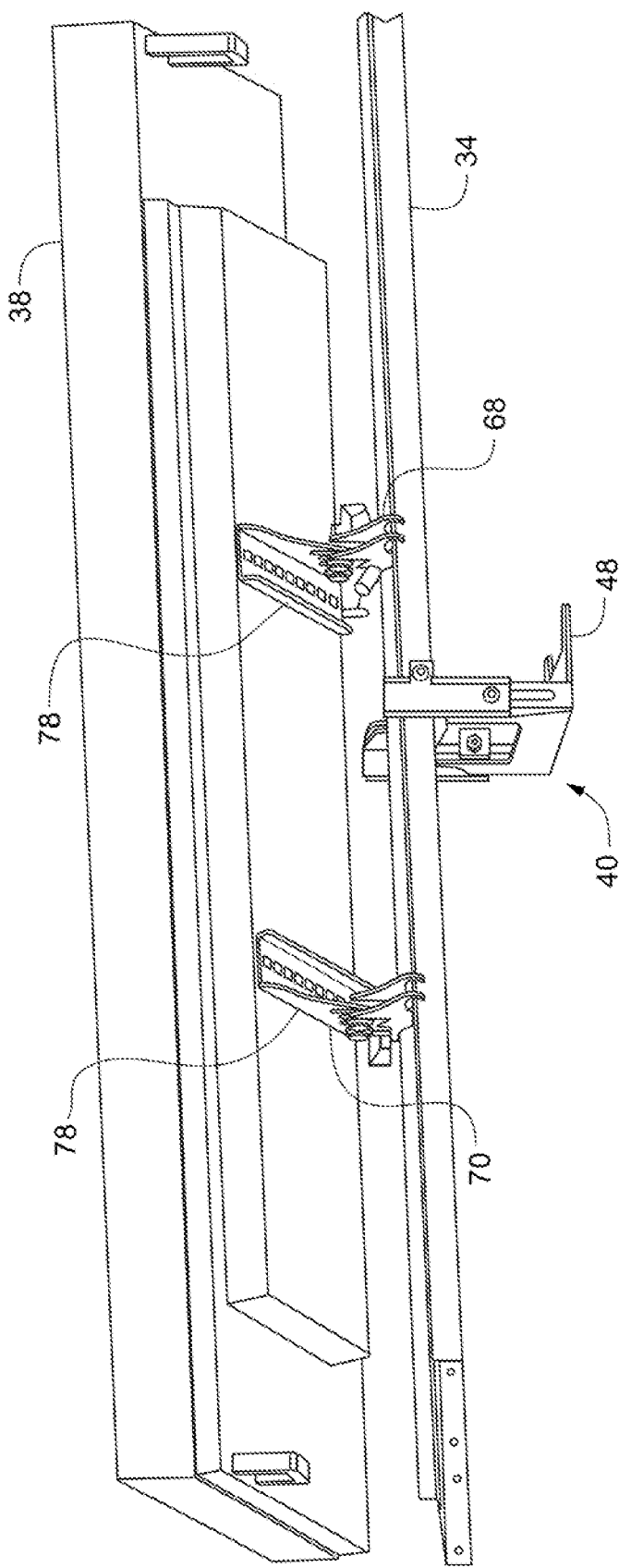
FIG. 17 is a perspective top view of the monitor assembly depicted in FIG. 14.
Figure 18:
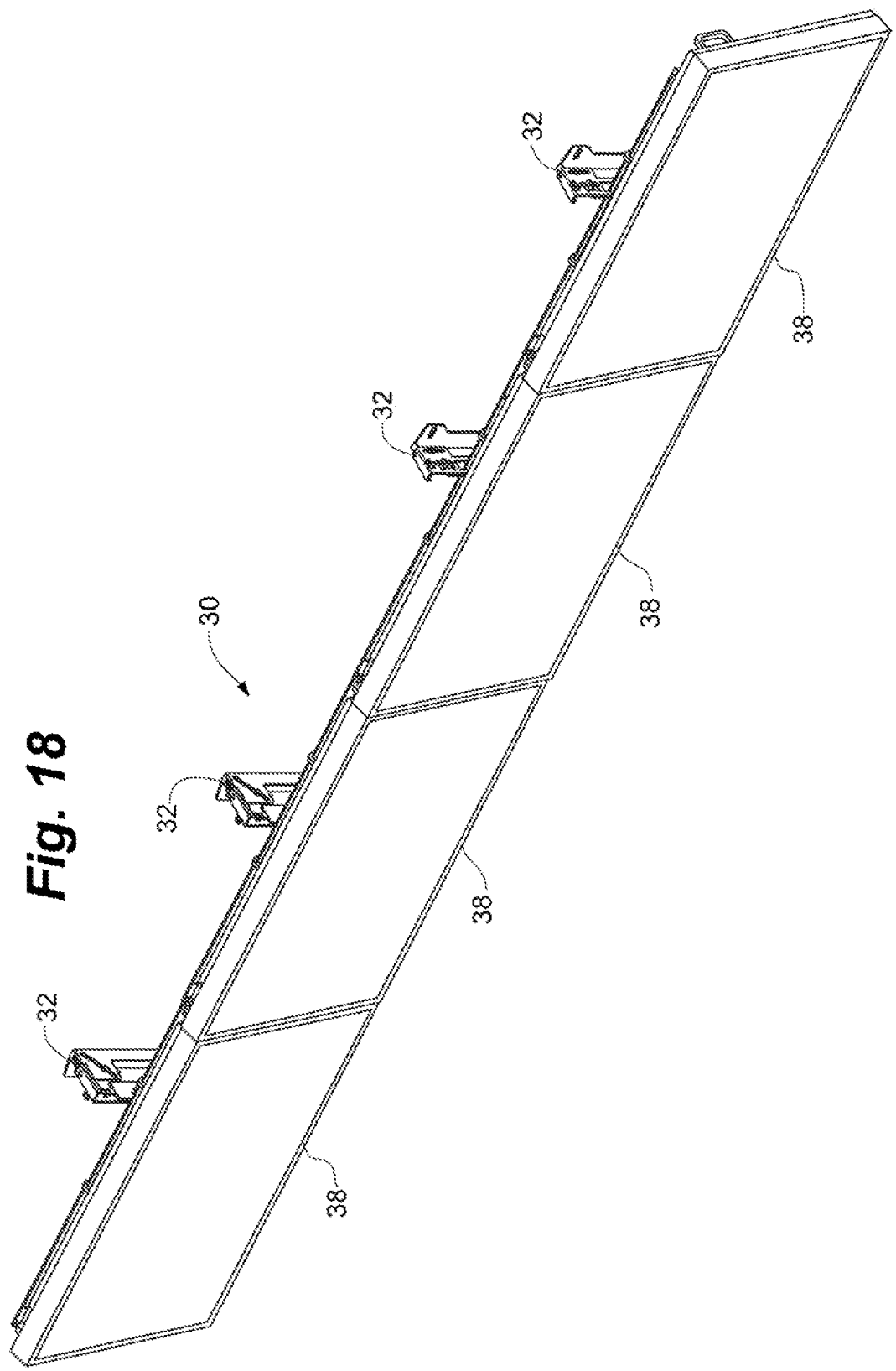
FIG. 18 is a perspective view of a plurality of monitors each mounted on a monitor mount assembly, wherein the monitor mount assembly is positioned on a plurality of guide bars attached to a wall by a plurality of wall mount assemblies according to an embodiment of the present invention.
Figure 19:
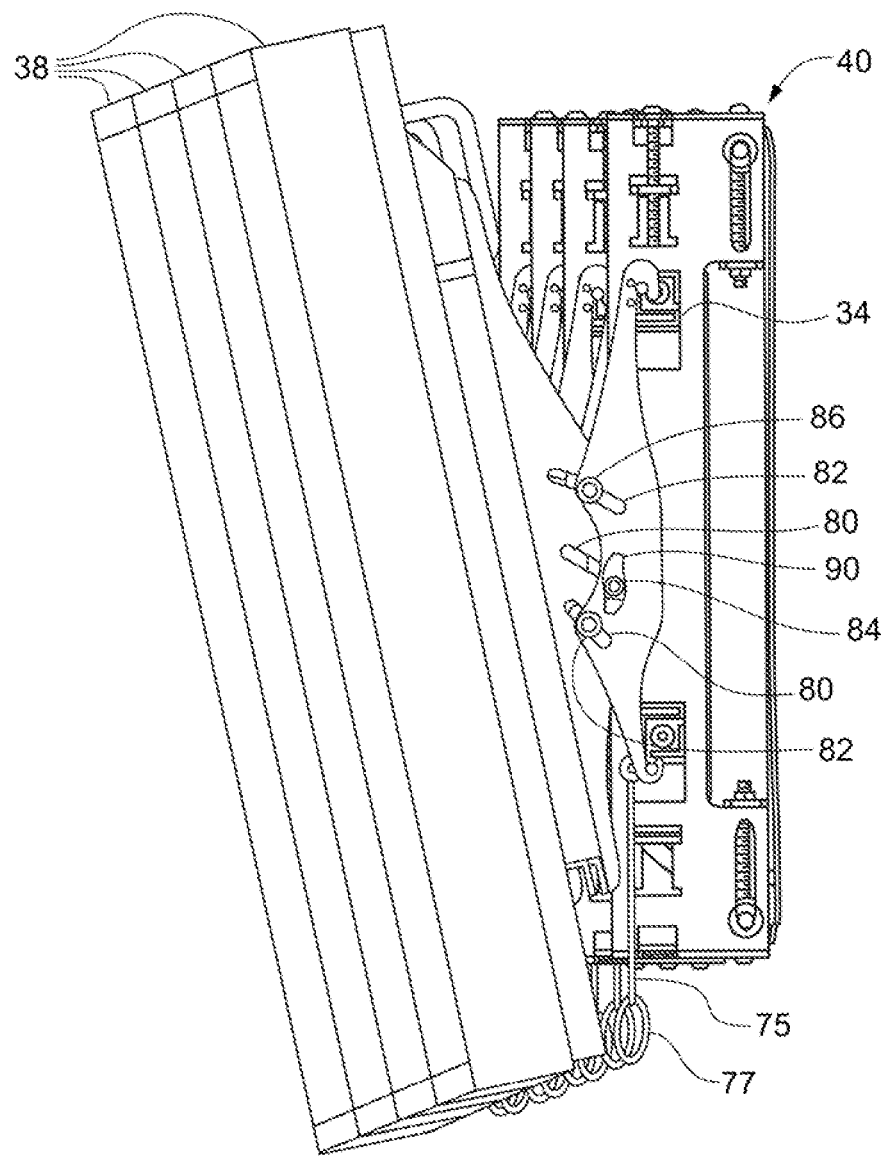
FIG. 19 is a side view of the monitor assembly depicted in FIG. 18.
Figure 20:
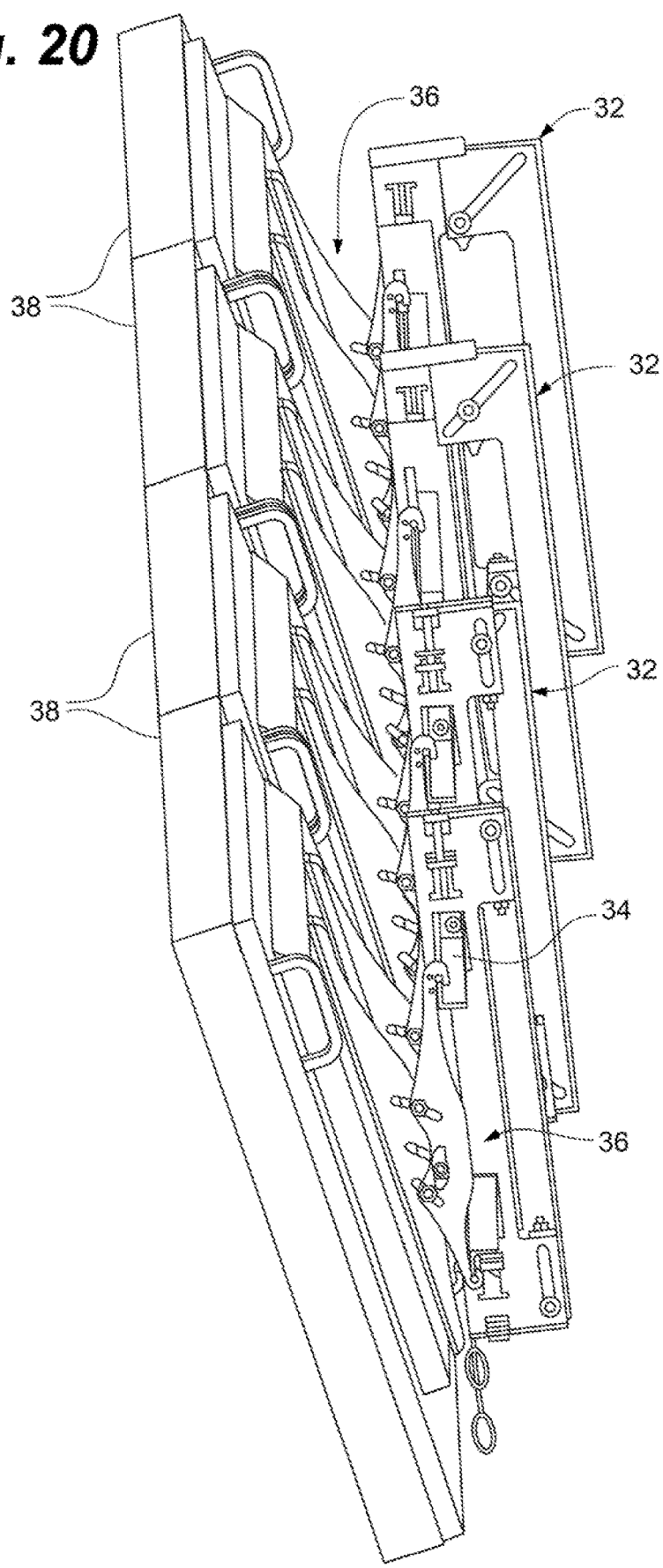
FIG. 20 is a side perspective view of the monitor assembly depicted in FIG. 18.
Figure 21:
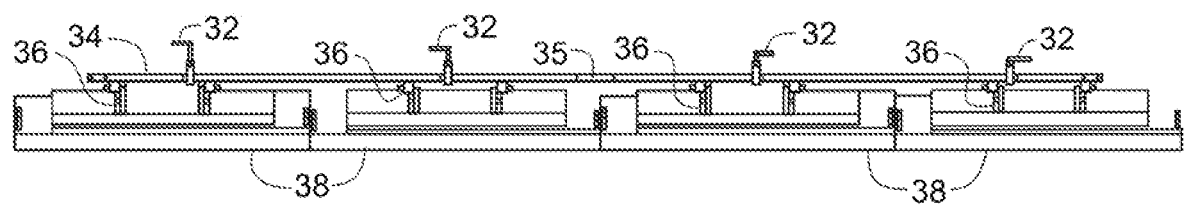
FIG. 21 is a top view of the monitor assembly depicted in FIG. 18.
Figure 22:
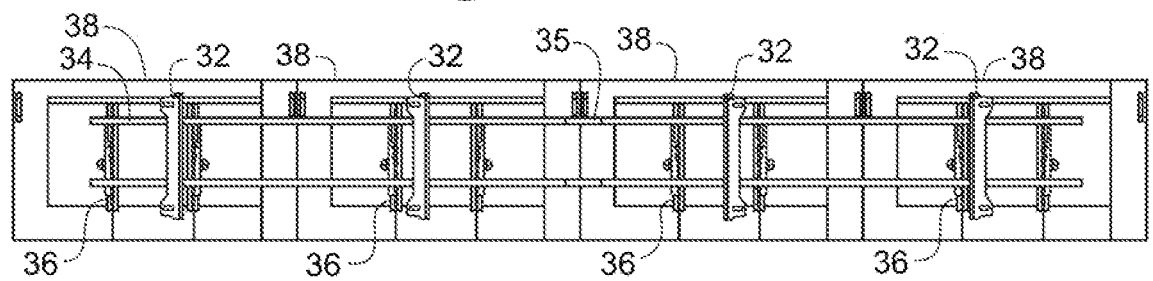
FIG. 22 is a rear view of the monitor assembly depicted in FIG. 18.
Figure 23:
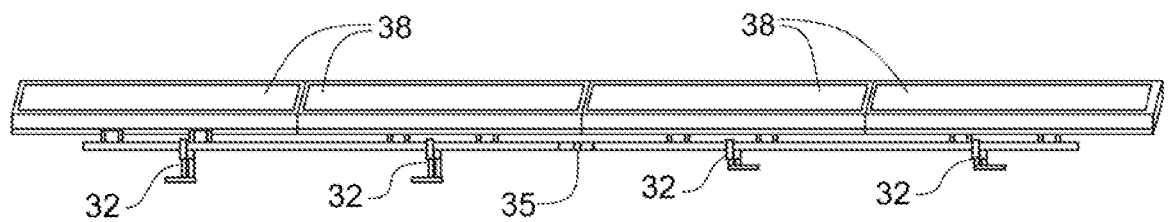
FIG. 23 is a bottom view of the monitor assembly depicted in FIG. 18.
Figure 24:
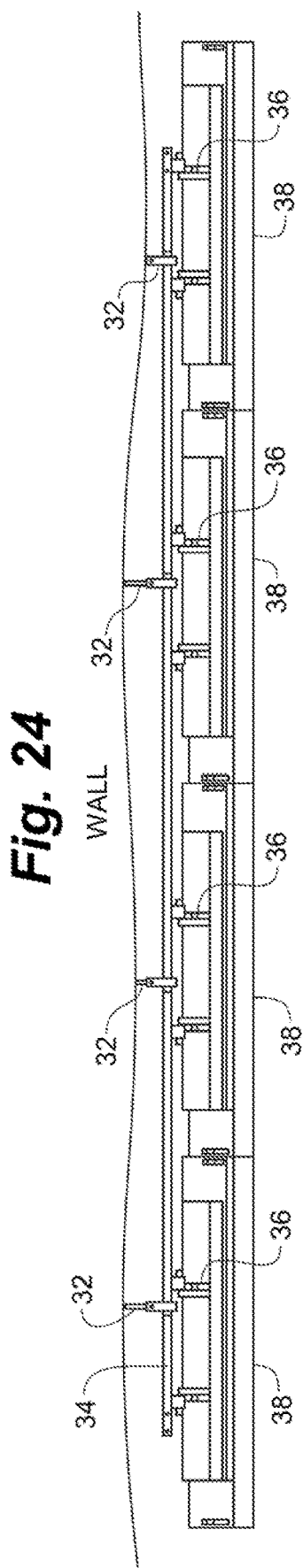
FIG. 24 is an illustrative top view of a wall mount system affixed to a contoured wall according to an embodiment of the present invention.
Figure 25:
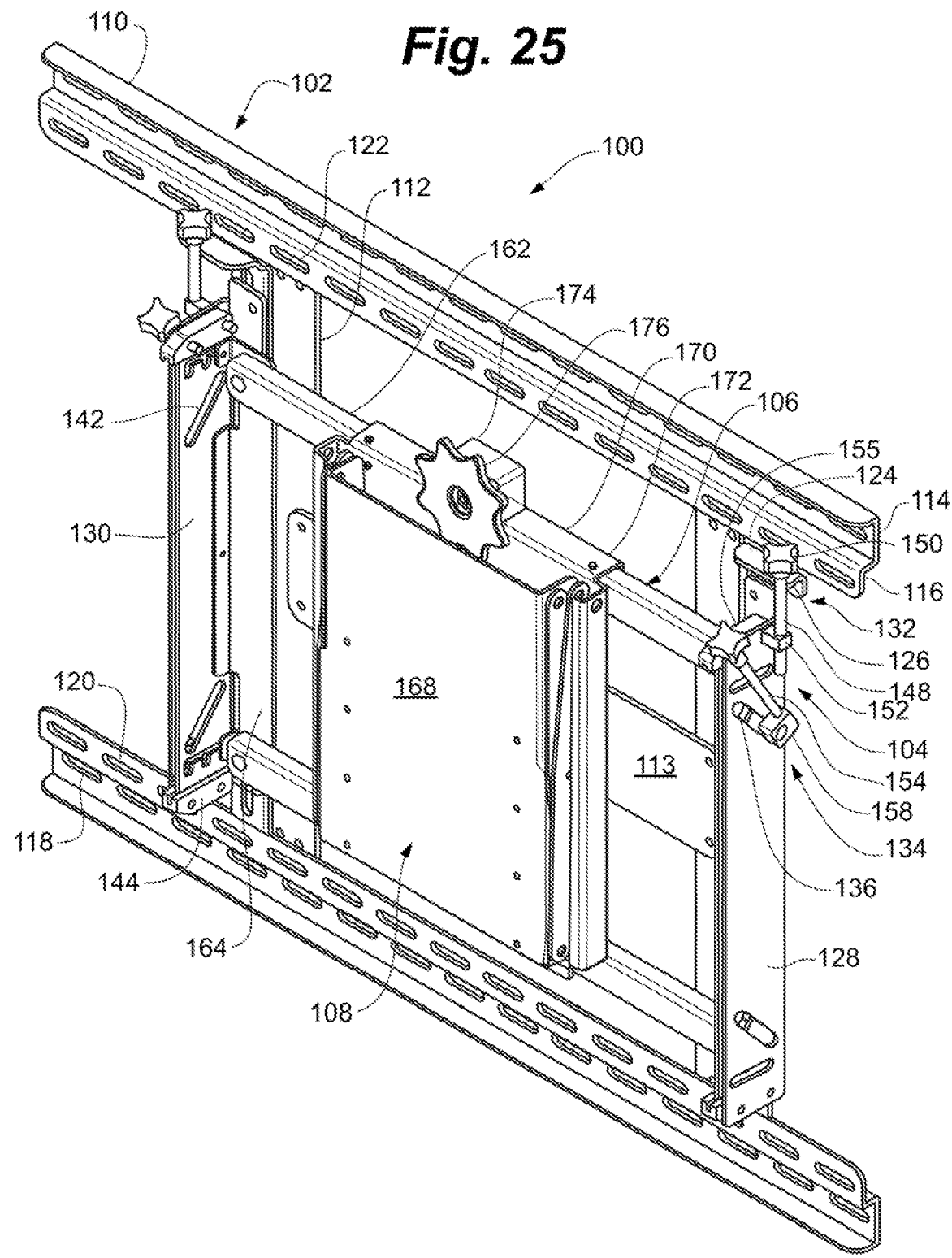
FIG. 25 is a perspective view of a wall mount system according to an embodiment of the present invention.
Figure 26:
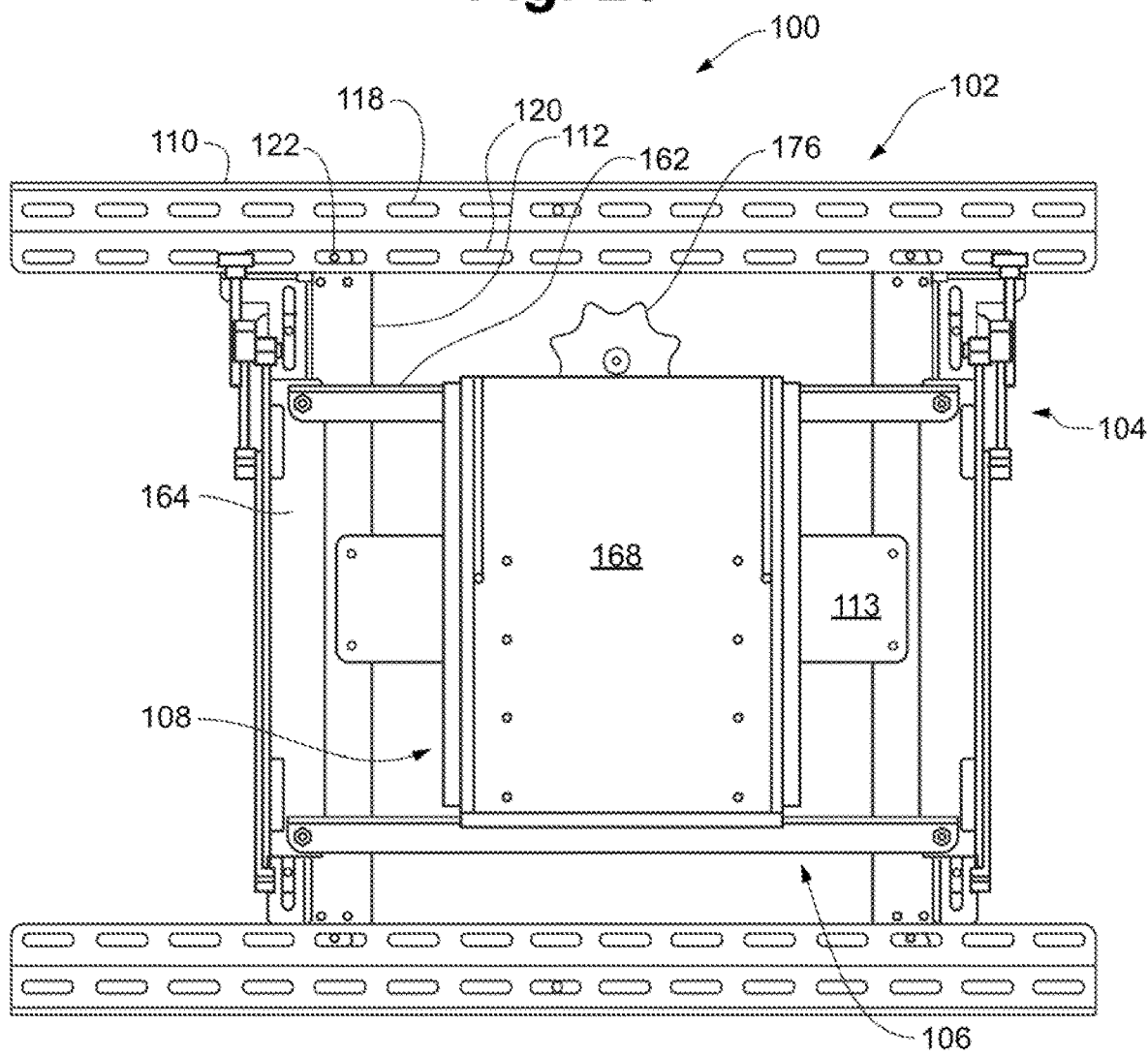
FIG. 26 is a front view of the wall mount system depicted in FIG. 25.
Figure 27:
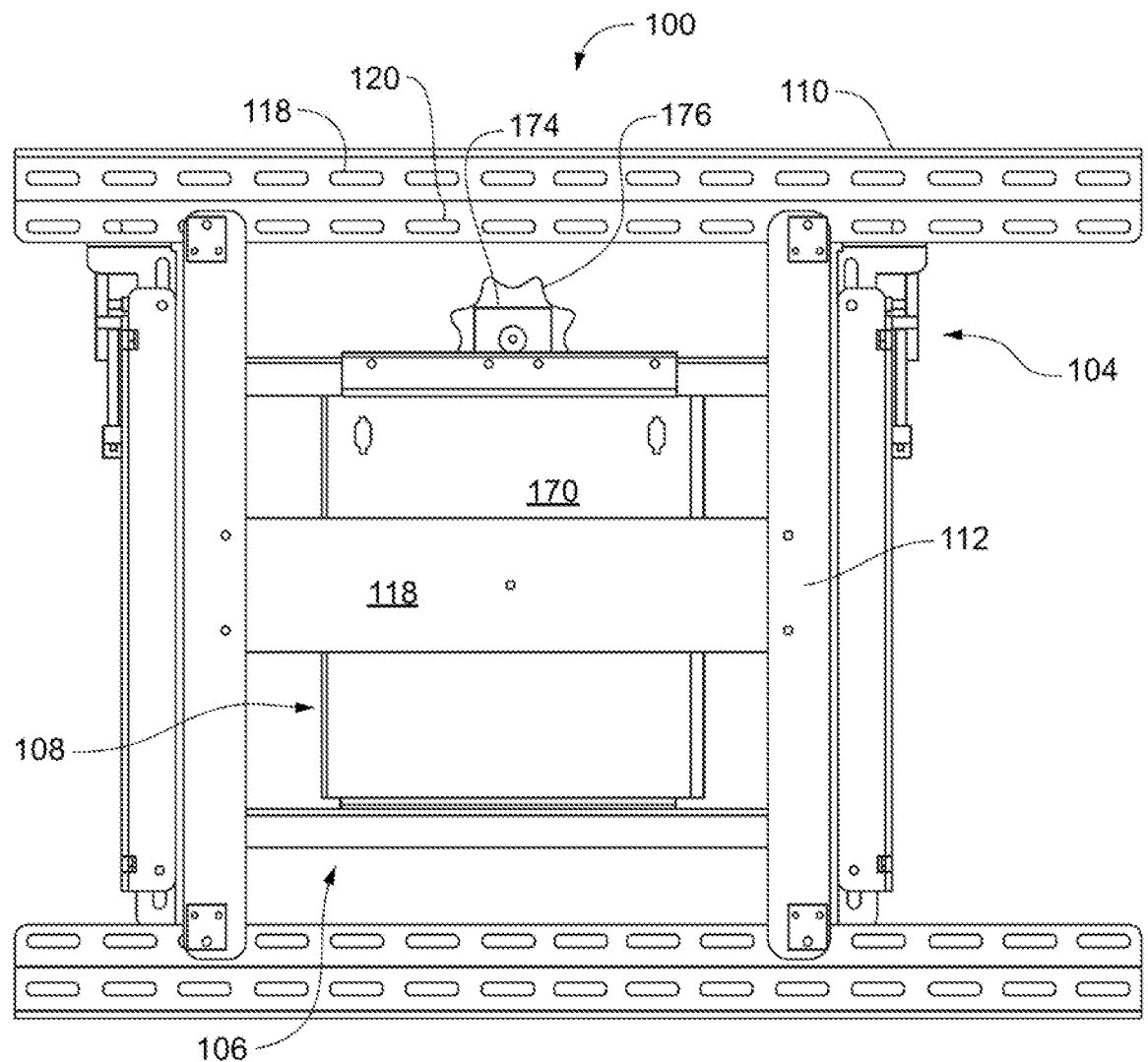
FIG. 27 is a rear view of the wall mount system depicted in FIG. 25.
Figure 28:
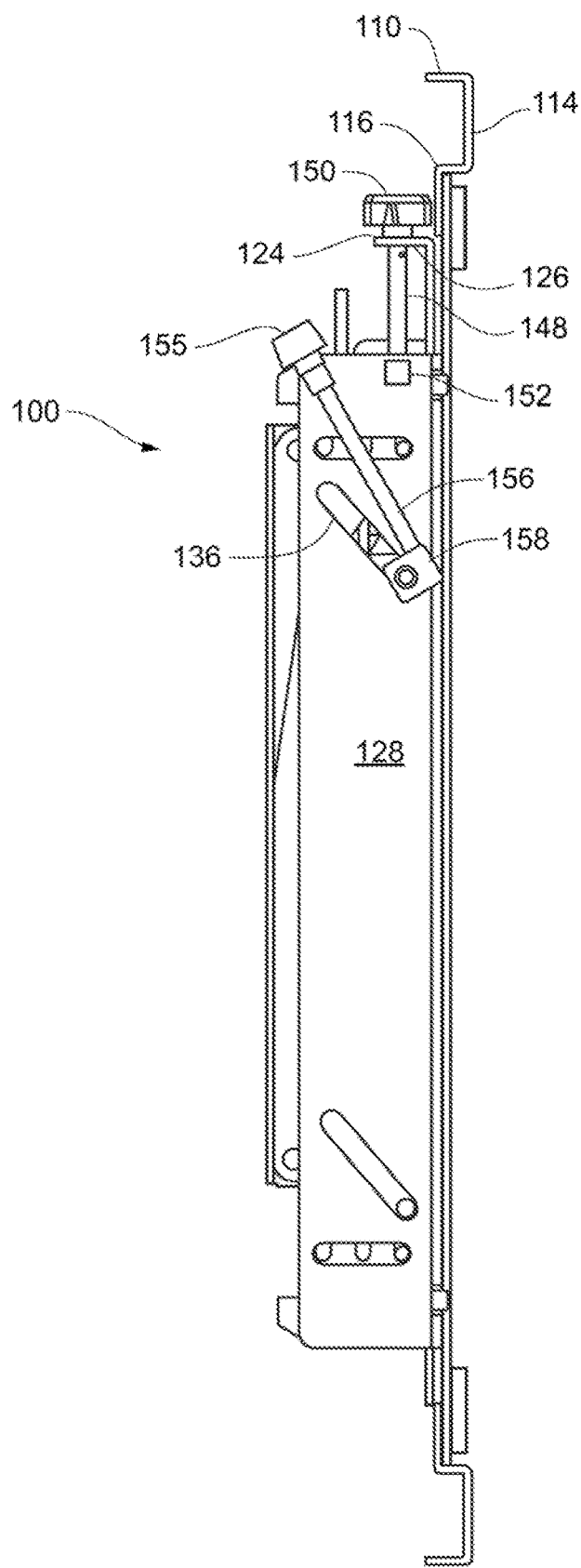
FIG. 28 is a side view of the wall mount system depicted in FIG. 25.
Figure 29:
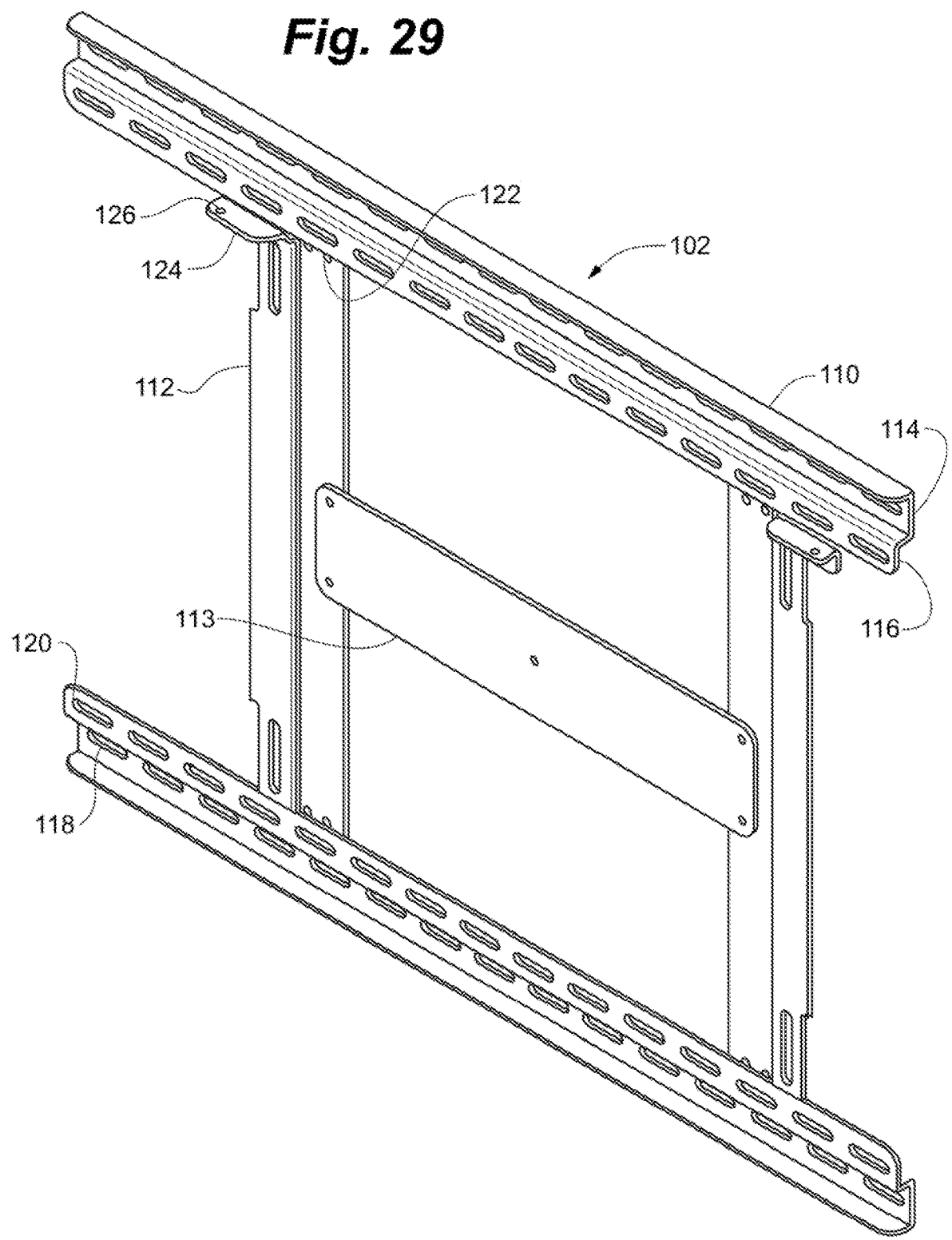
FIG. 29 is a perspective view of a wall mount assembly of a wall mount system according to an embodiment of the present invention.
Figure 30:
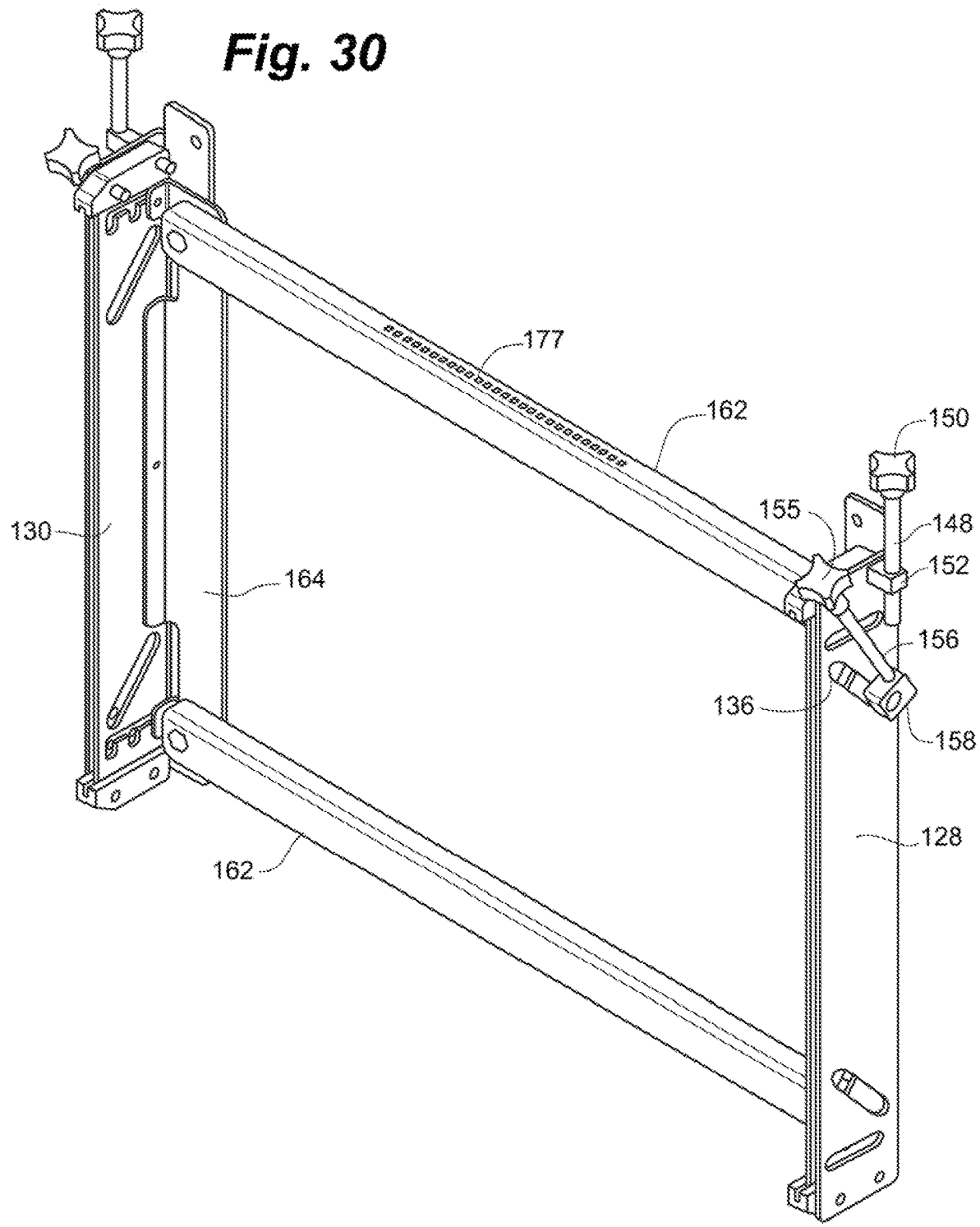
FIG. 30 is a perspective view of an adjustment assembly and guide bar assembly of a wall mount system according to an embodiment of the present invention.
Figure 31:
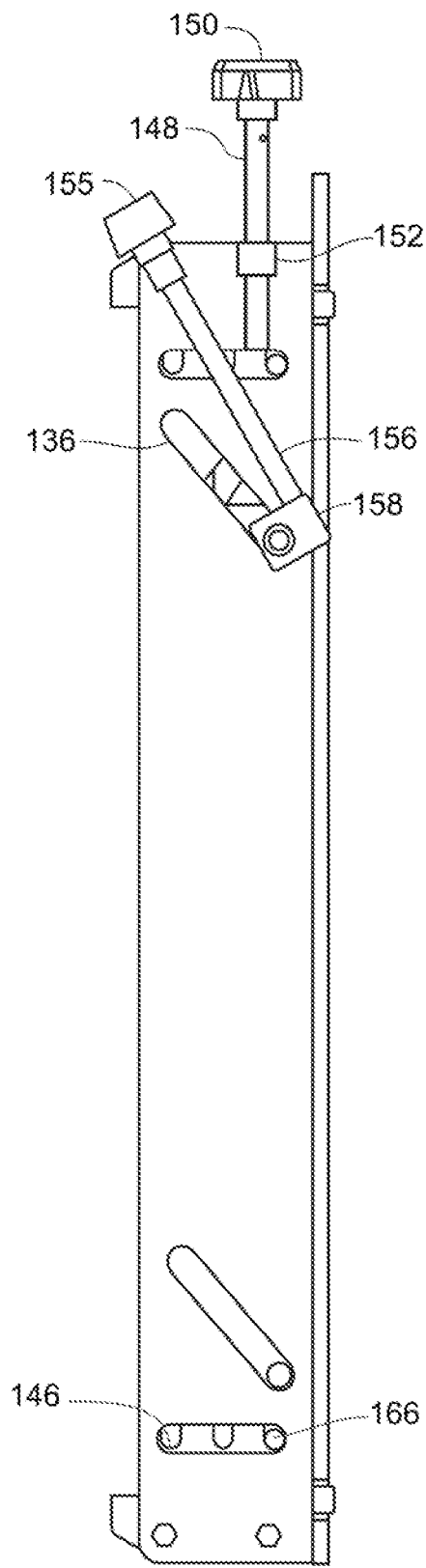
FIG. 31 is a side view of the adjustment assembly and guide bar assembly depicted in FIG. 30.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

As depicted in FIGS. 1-6 and 14-23, a wall mount system 30, according to an embodiment of the present invention, includes a plurality of wall mount assemblies 32, at least one elongated guide bar 34 and a plurality of monitor mount assemblies 36. Generally, the plurality of wall mount assemblies 32 is affixed to a wall, wherein each wall mount assembly 32 includes a depth adjustment feature for independently expanding or contracting each wall mount assembly 32. The mount assemblies 32 are expanded or contracted to account for recesses or elevated portions of a contoured or uneven wall such that the linear guide bar 34 is insertable through the each mount assemblies 32 regardless of the relative elevation of the portion of the wall to which the mount assembly 32 is mounted. In certain embodiments, at least a pair of guide bars 34 is inserted in parallel through the plurality of mount assemblies 32. Each monitor mount assembly 36 is releasably engagable to the guide bar 34, wherein the guide bar 34 vertically aligns each monitor mount assembly 36 with the adjacent monitor mount assembly 36. Each monitor mount assembly 36 is adapted to receive a monitor 38 wherein the guide bar 34 vertically aligns each mounted monitor 38 with adjacent mounted monitors 38. Similarly, the monitor mount assemblies 36 are slidable horizontally along the guide bar 34 to position the mounted monitors 38 edge to edge as depicted in FIGS. 18-23. In certain embodiments, each mounted monitor 38 is operably engaged to the guide bar 34 by at least two monitor mount assemblies 36.

As depicted in FIGS. 3-4 and 18-23, in certain embodiments, multiple mount assemblies can be positioned adjacent one another horizontally. In this configuration, the guide bars 34 are positioned end-to-end and secured with a bridging member 35 such that the guide bars 34 present a continuous engagable element.

As depicted in FIGS. 1-4, each mount assembly 32 includes a wall bracket 40, a base bracket 42 and at least one depth adjustment assembly 44. The depth adjustment assembly 44 adjustably engages the wall bracket 40 and the base bracket 42 such that the wall bracket 40 can be moved along a linear axis relative to the base bracket 42 to expand or contract the mount assembly 32.

As depicted in FIGS. 6-9 and 12-13, each wall bracket 40 further includes a plate portion 46 and at least one foot portion 48 generally transverse to the plate portion 46. Each foot portion 48 is positionable against a wall to such that the planet portion 46 is generally transverse to the corresponding portion of the wall. The foot portion 48 further includes at least one screw hole 50 for receiving a fastener for securing the wall bracket 40 to the wall. In certain embodiments, the screw hole 50 includes an elongated hole to ease alignment of the fastener with an ideal engagement point on the wall, such as a wall stud. Each wall bracket 40 also includes at least one elongated guide notch 52. In certain embodiments, the guide notch 52 is angled such that the guide notch 52 is not parallel to the linear axis of expansion for the mount assembly 32.

As depicted in FIGS. 6-7 and 10-13, each base bracket 42 includes a plate portion 53 comprising at least one aperture 54 for slidably receiving at least one guide bar 34. In certain embodiments, the aperture 54 corresponds to the dimensions and cross-sectional shape of the elongated guide bar 34 to prevent movement of the base bracket 42 except along axis parallel to the longitudinal axis of the elongated bar 34. In other embodiments, the aperture 54 is elongated vertically allowing the base bracket 42 to be moved vertically relative to the guide bar 34. In this configuration, the base bracket 42 further includes a traveler 56 positioned on a worm screw 58, wherein rotation of the worm screw 58 moves the traveler 56 along the length of the worm screw 58. A portion of the traveler 56 is positioned within the elongated aperture 54 such that the rotation of the worm screw 58 moves the traveler 56 vertically within the elongated aperture 54. The traveler 56 is slidably engagable to the guide bar 34 to permit horizontal movement of the base bracket 42 along the guide bar 34, while the worm screw 58 is rotatable to move the base bracket 42 vertically relative to the guide bar 34.

Each depth adjustment assembly 44 further includes a traveler 60 positioned on a worm screw 62 such that rotation of the worm screw 62 moves the traveler 60 along the worm screw 62. The worm screw 62 is positioned on the base bracket 42, while the traveler 60 is positioned within the guide notch 52 of the wall bracket 40 such that rotation of the worm screw 62 moves the traveler 60 within the guide notch 52. As depicted in FIGS. 6-13, the guide notch 52 is angled relative to the worm screw 62 such movement of the traveler 60 by the worm screw 62 moves the wall bracket 40 linearly with respect the base bracket 42. In certain embodiments, the base bracket 42 further includes a guide portion 64 defining a groove 66 for receiving a second foot portion 65 of the wall bracket 40 to guide the wall bracket 40 as the guide portion 64 is moved linearly by the rotation of the worm screw 62. In certain embodiments, the second foot portion 65 further includes an elongated notch 67 for receiving the worm screw 62 such that the worm screw 62 maintains the alignment of the wall bracket 40 and the base bracket 42 as the depth adjustment assembly is operated. In certain embodiments, the base bracket 42 further includes a window 69 allowing viewing of the vertical position of the traveler 60 from the side after the monitor 38 is attached.

As depicted in FIGS. 6-9 and 12-13, in certain embodiments, the wall bracket 40 includes a pair of guide notches 52 positioned apart on the wall bracket 40 and each engagable by a corresponding traveler 60 movable by the worm screw 62. In this configuration, the paired guide notches 52 prevent rotation of the wall bracket 40 relative to the base bracket 42 during expansion or contraction of the wall mount assembly 32. As depicted in FIGS. 6-9 and 12-13, in certain embodiments, the guide notches 52 are angled such that the guide notches 52 are mirrored. In other embodiments, the guide notches 52 are positioned in a parallel orientation.

In operation, the foot portion 48 of each wall bracket 40 is positioned against the corresponding portion of a wall. The worm screws 62 of each depth adjustment assembly 44 can then be operated to move the base bracket 42 to linearly align the aperture 54 or traveler 56 of each base bracket 42 with the aperture 54 or traveler 56 of the adjacent base bracket 42. The guide bar 34 is then insertable through each aperture 54 or traveler 56. In certain embodiments, the traveler 56 can be moved vertically to intersect with the guide bar 34. The wall mount assemblies 32 cooperate to support the guide bar 34 to receive the monitor mount assemblies 36 and corresponding monitors 38.

As depicted in FIGS. 14-20, each monitor mount assembly 36 includes a hanger element 68 and a monitor element 70 pivotably engaged to the hanger element 68. Each hanger element 68 includes at least one hook arm 72 engagable to the guide bar 34 to slidably secure the hanger element 68 to the guide bar 34. In this configuration, the guide bar 34 includes an L-shaped cross-section engagable by the hook arm 72. In certain embodiments, the hook arm 72 further includes a hinge 74 for rotating the hook arm 72 between an engaging position and a disengaging position. In the engaging position, the hook arm 72 is positioned to engage the guide bar 34. In the disengaged position, the hook arm 72 is positioned out of alignment with the guide bar 34 to prevent engagable of the hook arm 72 with the guide bar 34 allowing removal of the monitor element 70 from the guide bar 34. In certain embodiments, the hinge 74 is spring biased to position the hook arm 72 in the engaged position. In certain embodiments, each hanger element 68 includes at least a pair of hook arm 72 each engagable to at least one guide bar 34 as depicted in FIGS. 14-20. The dual hook arm 72 configuration prevents rotation of the hanger element 68 around a single guide bar 34. In certain embodiments, the hook arm 72 can further include a pull line 75 that can be pulled to overcome the spring bias of the hinge 74 to rotate the hook arm 72 into the disengaged position. In certain embodiments, the pull line 75 can further include a loop 77 for more efficient application of a pull force to the pull line 77.

As depicted in FIGS. 14-20, the monitor element 70 includes a plate portion 76 and at least one foot portion 78 generally transverse to the plate portion 76. In certain embodiments, each foot portion 78 includes at least one screw hole for receiving a fastener to secure the foot portion 78 to a monitor 38. In other embodiments, the foot portion 78 can include specialized engagement features corresponding to specific types and brands of monitors 38. Affixing the foot portion 78 to the monitor 38 positions the plate portion 76 generally perpendicular to the plane of the monitor 38.

As depicted in FIGS. 14-20, in certain embodiments, the plate portion 76 of the monitor element 70 includes an elongated center notch 80 and a pair of elongated hinge notches 82 positioned on either side of the center notch 80. In this configuration, the corresponding hanger element 68 includes a center spindle 84 and a pair of hinge spindles 86. The center spindle 84 is positioned within the center notch 80. Similarly, the hinge notches 82 are positioned within the corresponding hinge notches 82.

In operation, the monitor element 70 is rotatable about one of the hinge spindles 86 to change the orientation of the monitor element 70 relative to the hanger element 68. The monitor element 70 is rotatable about one of the hinge spindles 86 to rotate the monitor element 70 in a first direction, while rotating the monitor element 70 about the other hinge spindles 86 rotates the monitor element 70 in the opposite direction. As the monitor element 70 is rotated about one hinge spindle 86, the opposing hinge spindle 86 and the center spindle 84 are moved through the corresponding hinge notch 82 and the center notch 80 correspondingly. In certain embodiments, the hanger element 68 includes a pair of secondary notches 88 for receiving the hinge spindles 86. In this configuration, when the mount element 70 is rotated about one of the hinge spindle 86, the opposing hinge spindles 86 is movable within the corresponding second notch 88 to permit unrestricted rotation of the mount element 70. In certain embodiments, the center notch 80 can further include a handle 90 rotatable to tighten the center spindle 84 against the edges of the center notch 80 to prevent the center spindle 84 from moving within the center notch 80 to prevent further rotation of the monitor element 70 relative to the hinge element 68.

In operation, the hanger elements 68 are affixed to the guide bar 34 with the hook arms 72. A monitor 38 can then be secured to the mount element 70 and oriented by rotating the mount element 70 relative to the hanger element 68. In certain embodiments, the hanger elements 68 can be each moved horizontally along the guide bar 34 to position the mounted monitors 38 edge-to-edge without disengaging the hanger elements 68 from the guide bar 34.

A method of presenting a continuous, planar display from a plurality of monitors, according to an embodiment of the present invention, includes providing a plurality of wall mount assemblies 32, wherein each wall mount assembly 32 further includes a wall bracket 40, a base bracket 42 and a depth adjustment assembly 44 adjustably linking the wall bracket 40 to the base bracket 42. The method further includes affixing each wall bracket 40 to a wall. In certain embodiments, the wall brackets 40 are positioned on the wall along a generally horizontal axis. The method also includes operating each depth adjustment assembly 44 to move the corresponding base bracket 42 relative to the wall bracket 40 and along an axis perpendicular to the wall to align the base brackets 42 along a single horizontal axis. The method further includes inserting at least one guide bar 34 through an aperture 54 in each base bracket 42 such that the wall mount assemblies 32 support the guide bar 34.

The method also includes providing a plurality of monitor mount assemblies 36 each having a hanger element 68 and a monitor element 70 pivotably engaged to the hanger element 68. The method further includes slidably engaging each hanger element 68 to the guide bar 34.

The method also includes mounting a monitor 38 to each monitor element 70. In certain embodiments, each hanger element 68 is slid along the guide bar 34 to move the monitors 38 horizontally to position the monitors 38 edge-to-edge. Similarly, in certain embodiments, each monitor element 70 is rotatable to orient the monitors 38.

As depicted in FIGS. 25-28 and 40-43, a wall mount system 100, according to an embodiment of the present invention, includes a wall mount assembly 102, at least one adjustment assembly 104, a guide bar assembly 106 and a monitor mount assembly 108. Generally, the wall mount assembly 102 is affixed to a wall to secure the wall mount system 100. The at least one adjustment assembly 104 operably engages the guide bar assembly 106 to the wall mount assembly 102 in a substantially horizontal orientation and is adapted to move the guide bar assembly 106 relative to the wall mount 102 while maintaining the guide bar 106 in a substantially horizontal orientation. In certain embodiments, the wall mount system 100 includes at least two adjustment assemblies 104 each positioned on either side of the guide bar assembly 106 to cooperatively move the guide bar assembly 106. The monitor mount 108 is affixable to the oriented guide bar assembly 106 and adapted to receive a monitor 38 to secure the monitor 38 to the wall via the wall mount assembly 102.

As depicted in FIGS. 25-29, each wall mount assembly 102 includes a pair of elongated wall tracks 110 and a pair of wall plates 112. Each wall track 110 further includes a planer portion 114 and a raised lip portion 116. The planar portion 114 includes a plurality of wall screw holes 118 arranged longitudinally along the wall track 110, wherein each wall screw holes 118 is adapted to receive at least one fastener to secure the wall track 110 to a wall. The longitudinal arrangement of the wall screw holes 118 allows the fasteners to be aligned more easily aligned with desirable anchor points such as wall studs without shifting the entire wall mount assembly 102. Similarly, the raised lip portion 116 includes a plurality of wall plate screw holes 120 extending longitudinally along the wall track 110. In this configuration, each wall plate 112 includes a corresponding screw hole 122 at each end of the wall plate 112 for receiving the fastener inserted through the wall plate screw holes 120 to secure the wall plate 112 to the wall tracks 110. Each wall plate 112 also includes a foot portion 124 comprising a bore hole 126. In certain embodiments, each wall mount assembly 102 further includes a crosspiece 113 extending between the wall plates 112.

As depicted in FIGS. 29 and 40-43, during assembly, the wall tracks 110 are positioned in a parallel on the wall in generally horizontal orientations with the lip portion 116 of each wall track 110 directed at the opposing wall track 110. Fasteners can then be inserted into the wall screw holes 118 to fasten the wall tracks 110 to the wall. The wall plates 112 are then slid beneath the lip portions 116 of the wall tracks 110 and a fastener is inserted through the wall plate screw holes 120 and corresponding screw hole 122 to secure the wall plate 112 to the wall track 110. The foot portion 124 is oriented on the wall plate 112 such that the foot portion 124 extends transversely from the wall when the wall plate 112 is positioned against the wall. In certain embodiments, multiple pairs of wall plates 112 can be positioned on the single pair of wall tracks 110 for mounting multiple monitors to on the single pair of wall tracks 110.

As depicted in FIGS. 30-35, each adjustment assembly 104 includes a lift plate 128, a primary extension plate 130, an elevation assembly 132 and an extension assembly 134. Each lift plate 128 includes a generally planar shape and further includes an elongated guide notch 136. The primary extension plate 130 also includes a generally planar shape and further includes an elongated guide notch 142 and at least one guide bar notch 144. Each guide bar notch 144 of the primary extension plate 130 defines a plurality of insets 146. The elevation assembly 132 further includes a worm gear 148 rotatable by handle 150. In this configuration, the lift plate 128 further includes a traveler 152 affixed to the lift plate 128 and engagable to the worm gear 148. Similarly, the extension assembly 134 includes a worm gear 154 rotatable by a handle 155 and further includes a secondary extension plate 156 having a traveler 158 engagable to the worm gear 154.

Figure 32:
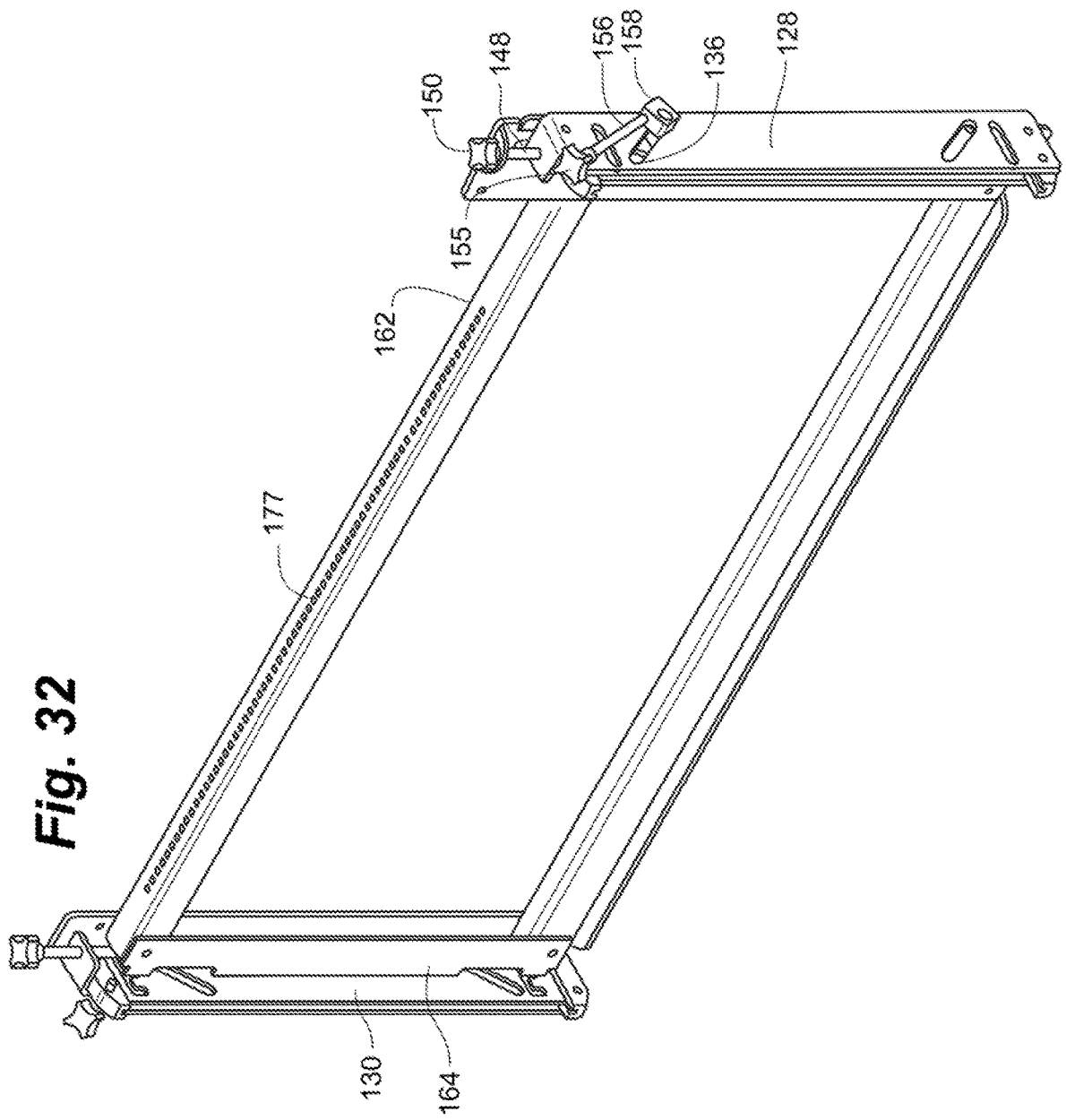
FIG. 32 is perspective view of an adjustment assembly and guide bar assembly mounted on a wall plate of a wall mount system according to an embodiment of the present invention, wherein the adjustment assembly is operated to elevate the guide bar assembly relative to the wall plate.
Figure 33:
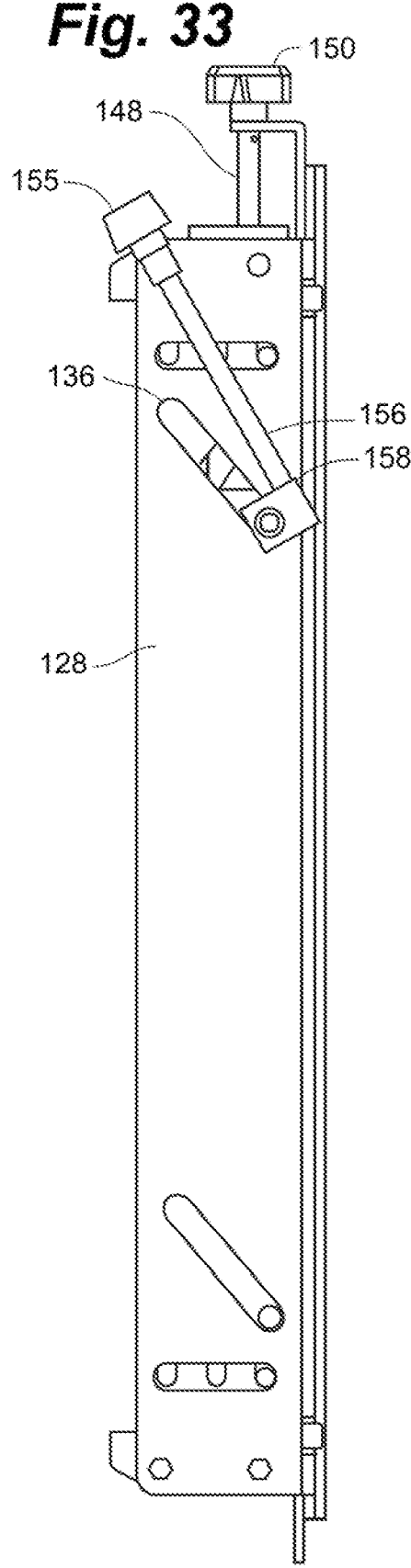
FIG. 33 is a side view of the adjustment assembly and guide bar assembly depicted in FIG. 32.

As depicted in FIGS. 32-33, in assembly, the worm gear 148 of the elevation assembly 132 is inserted through the bore hole 126 in the foot portion 124 of the wall plate 112. In operation, the worm gear 148 is rotated via the handle 150 to move the traveler 152 on the lift plate 128 to move the adjustment assembly 104 relative to the wall mount assembly 102. In certain embodiments, the worm gear 148 is positioned such that the longitudinal axis of the worm gear 148 is oriented vertically such that operating the worm gear 148 of the elevation assembly 132 moves the adjustment assembly 104 vertically.

Figure 34:
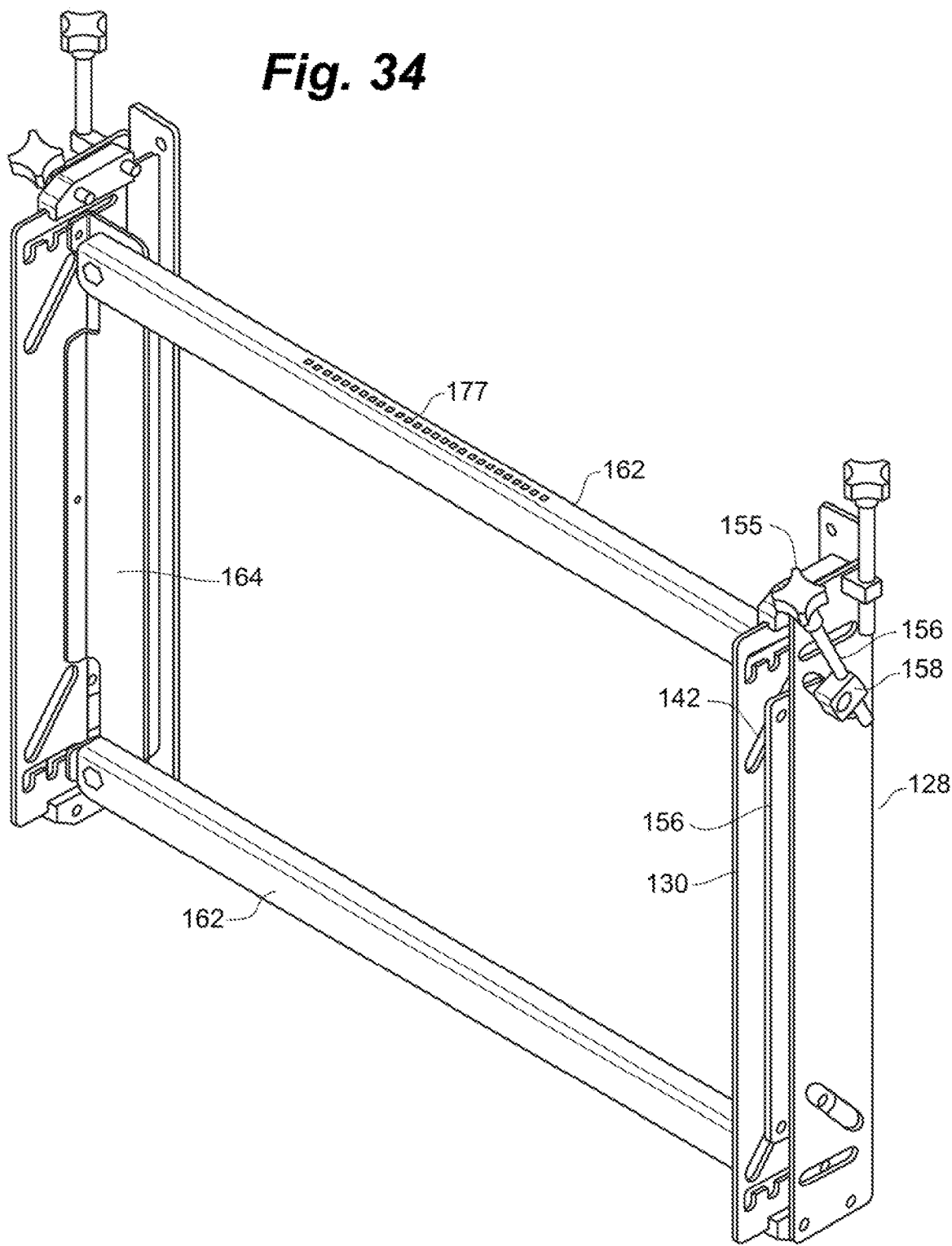
FIG. 34 is perspective view of an adjustment assembly and guide bar assembly mounted on a wall plate of a wall mount system according to an embodiment of the present invention, wherein the adjustment assembly is operated to extend the guide bar assembly outward from the wall plate.
Figure 35:
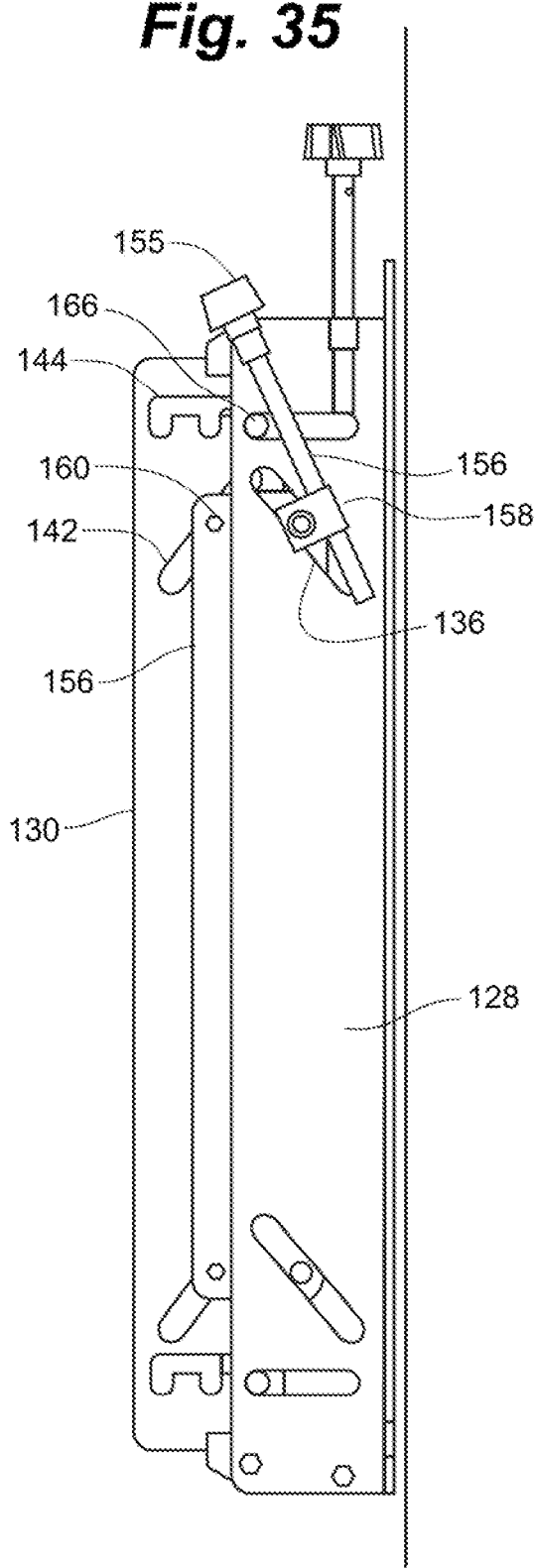
FIG. 35 is a side view of the adjustment assembly and guide bar assembly depicted in FIG. 34.
Figure 36:
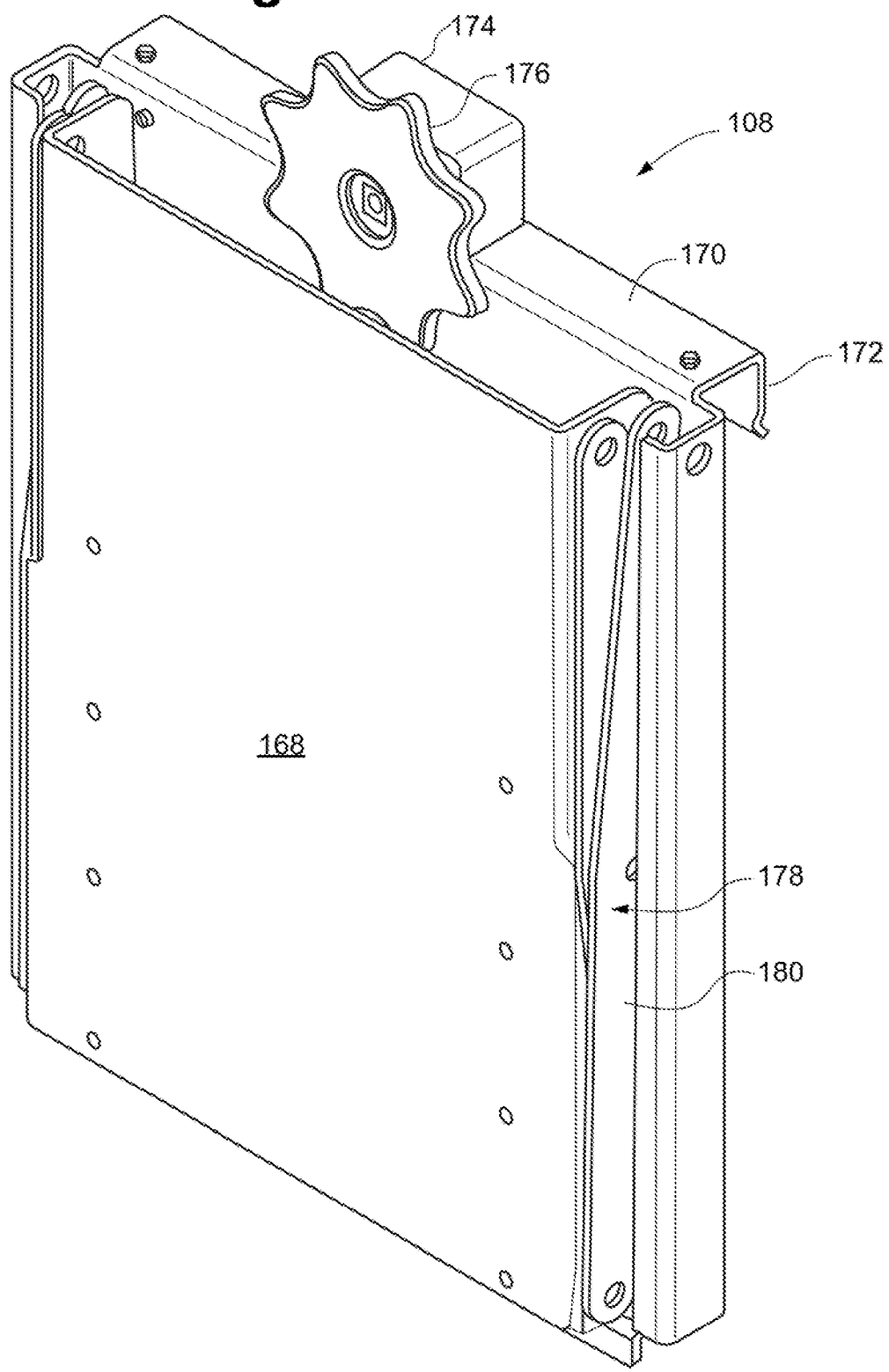
FIG. 36 is a perspective view of a monitor mount assembly of a wall mount system according to an embodiment of the present invention.
Figure 37:
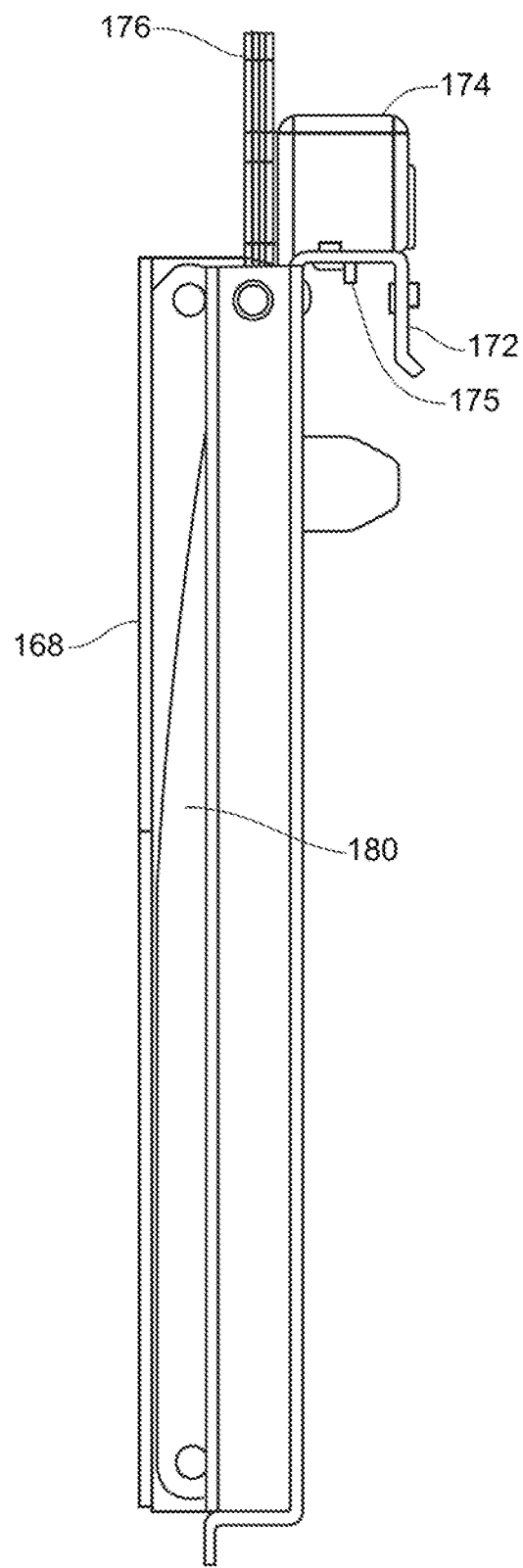
FIG. 37 is a side view of the monitor mount assembly depicted in FIG. 36.

As depicted in FIGS. 34-35, in assembly, the traveler 158 of the extension assembly 134 extends through the guide notch 136 of the lift plate 128. In operation, rotating the worm gear 154 via the handle 155 moves the traveler 158 within the guide notch 136, which corresponding moves the secondary extension plate 156 along an axis parallel to the elongated guide notch 136. In certain embodiments, the guide notch 136 is angled such moving the traveler 158 to move the secondary extension plate 156 moves the secondary extension plate 156 toward or away from the wall as well as vertically. In certain embodiments, the secondary extension plate 156 further includes a spindle 160 engagable to the elongated guide notch 142 of the primary extension plate 130. In certain embodiments, the elongated guide notch 142 of the primary extension plate 130 is generally transverse to the elongated notch 136 of the lift plate 128. The transverse orientation of the guide notches 136, 142 causes the primary extension plate 130 to move away from or toward the wall as the secondary extension plate 156 is moved vertically through the movement of the traveler 158. In certain embodiments, the extension assembly 134 can further include a pair of extension bearings 135 engaging the ends of the primary and secondary extension plates 130, 156 for guiding the extension and retraction of the primary and secondary extension plates 130, 156.

As depicted in FIGS. 30-35, the guide bar assembly 106 includes a pair of guide bars 162 and a pair of mounting plates 164. The guide bars 162 are positioned in parallel in a generally horizontal orientation. Similarly, the mounting plates 164 are also positioned in parallel and each affixed to the ends of the guide bars 162 to define a generally rectangular orientation. Each mounting plate 164 further includes at least one spindle 166 positionable within the guide bar notch 144 to operably engage the guide bar assembly 106 to the adjustment assembly 104 such that the movement of the adjustment assembly 104 from the operation of the elevation assembly 132 or the extension assembly 134 is translated to the guide bar assembly 106. In certain embodiments, the spindle 106 is movable within the guide bar assembly 106 between the plurality of insets 136 to offset the guide bar assembly 106 horizontally relative the adjustment assembly 104. The offset can include increasing or decreasing the maximum possible extension of the guide bar assembly 106 from the wall. In other configurations, an upper spindle 106 can be positioned out of vertical alignment with the lower spindle 106 such that a plane intersecting the guide bars 162 is non-vertical. The non-vertical plane creates a tilt in the mounted monitor 38.

As depicted in FIGS. 36-39, the monitor mount assembly 108 further includes an engagement plate 168 and a monitor bracket 170. The engagement plate 168 further includes at least two hook element 172 each engagable to one of the guide bars 162 to hang the monitor mount assembly 108 on the guide bar assembly 106. In certain embodiments, each hook element 172 can include a spring hinge 173 biasing the hook element 172 into engagement with the guide bar 172. In this configuration, the monitor mount assembly 108 can further include a pull wire 175 that can be pulled to over the bias of the spring hinge 173 and disengage the hook element 172 from the guide bar 172. The monitor bracket 170 is engagable to a monitor 38 to secure the monitor 38 to the wall mount system 100. As depicted, the monitor bracket 170 includes a plurality of screw holes for receiving fasteners to engagable to corresponding engagement points on the monitor 38. In other embodiments, the monitor bracket 170 can include specialized mounting elements corresponding to the different mounting systems of different types or brands of monitors 38.

As depicted in FIGS. 35-39, in certain embodiments, the monitor mount assembly 108 further includes a lateral adjustment assembly 174 for moving the monitor mount assembly 108 horizontally on the guide bars 162. The lateral adjustment assembly 174 includes a sprocket 175 having a plurality of teeth and rotatable by a handle 176. In this configuration, at least one of the guide bars 162 includes a plurality of notches 177 engagable by the sprocket. In operation, rotation of the sprocket engages the plurality of notches in the guide bar 162 to pull the monitor mount assembly 108 along the guide bar 162 moving the monitor mount assembly 108 horizontally.

Figure 38:
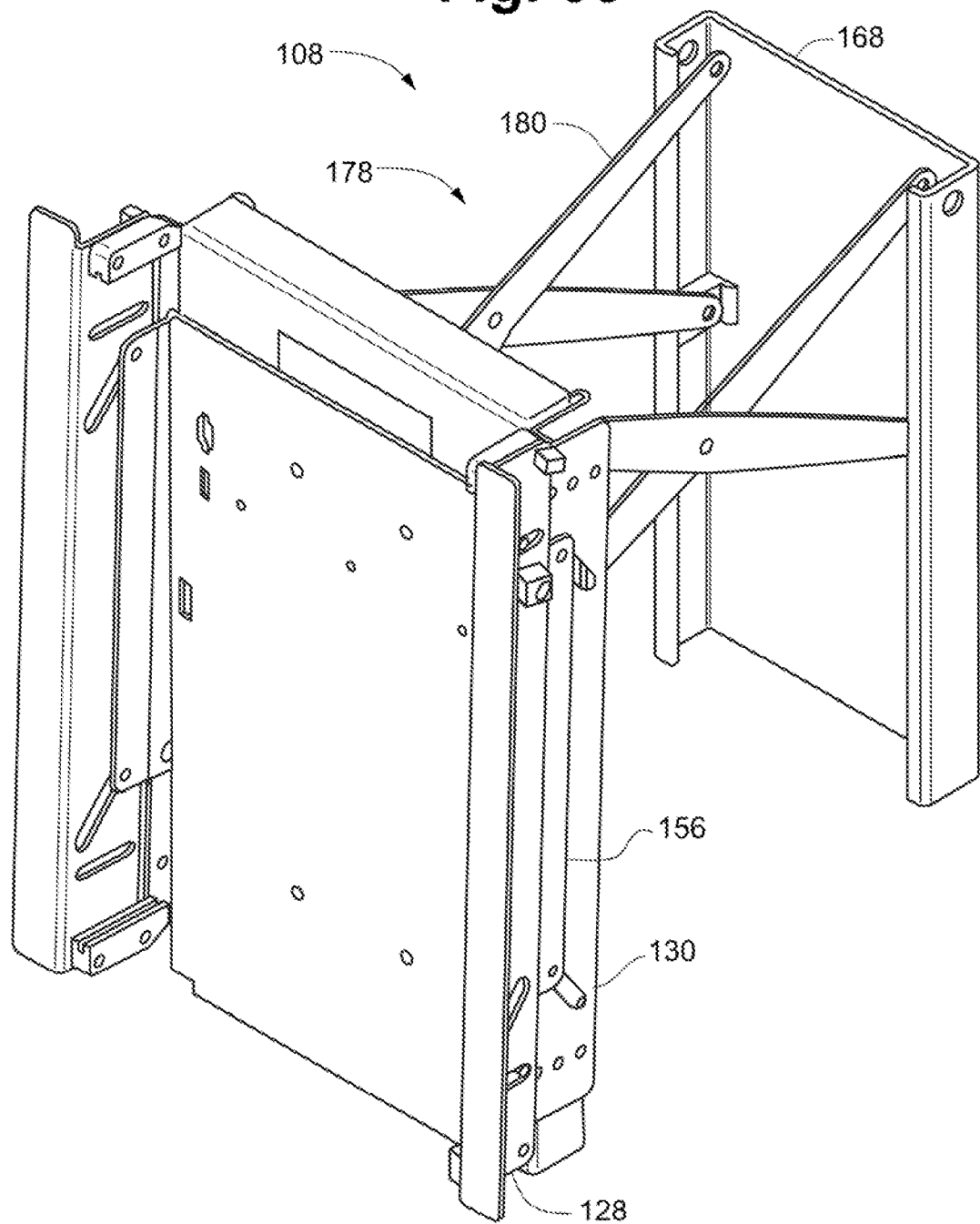
FIG. 38 is a perspective view of a monitor mount assembly of a wall mount system according to an embodiment of the present invention, wherein the monitor mount assembly is extended to position a mount plate outward from a wall plate.
Figure 39:
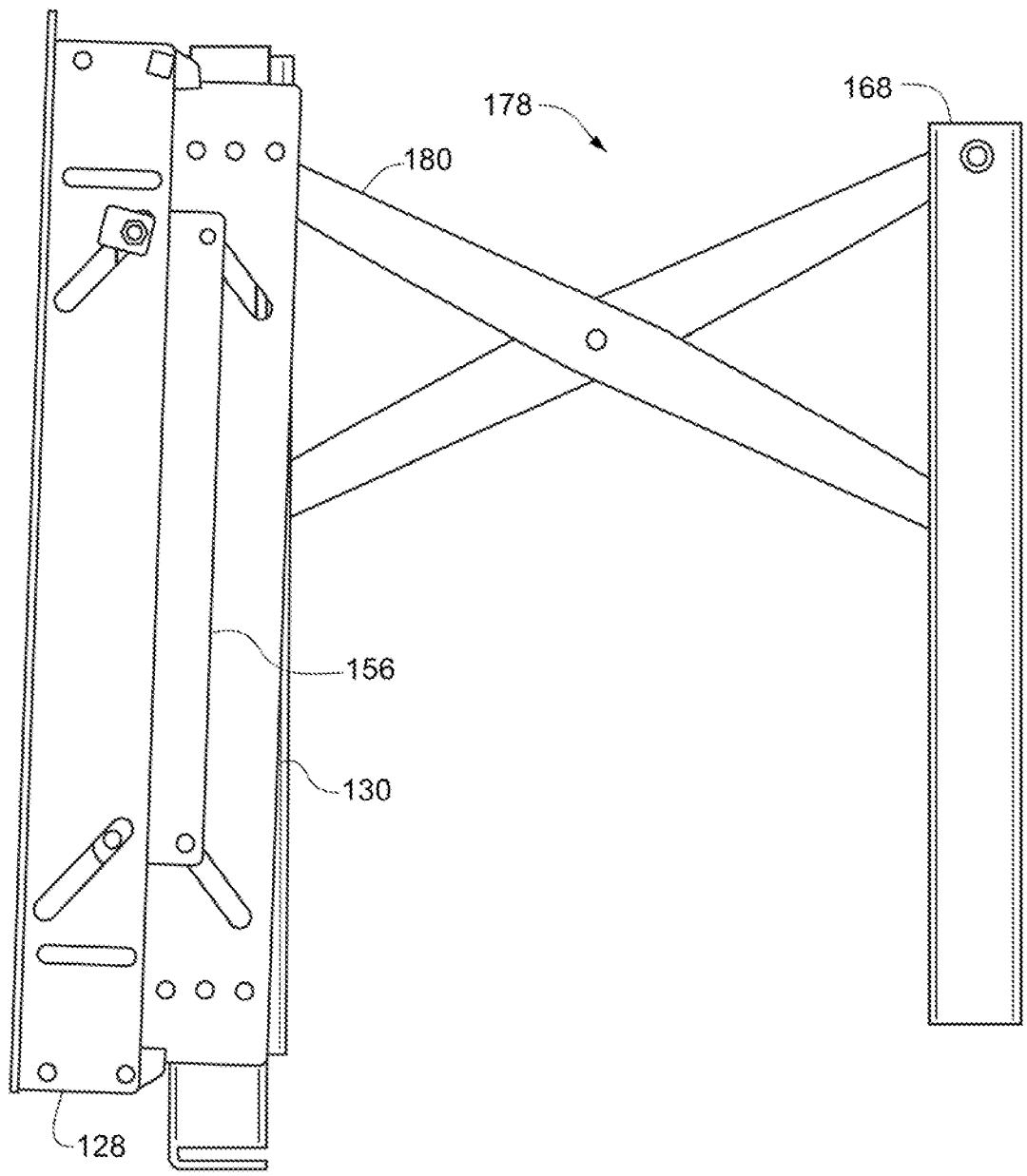
FIG. 39 is a side view of the monitor mount assembly depicted in FIG. 38.
Figure 40:
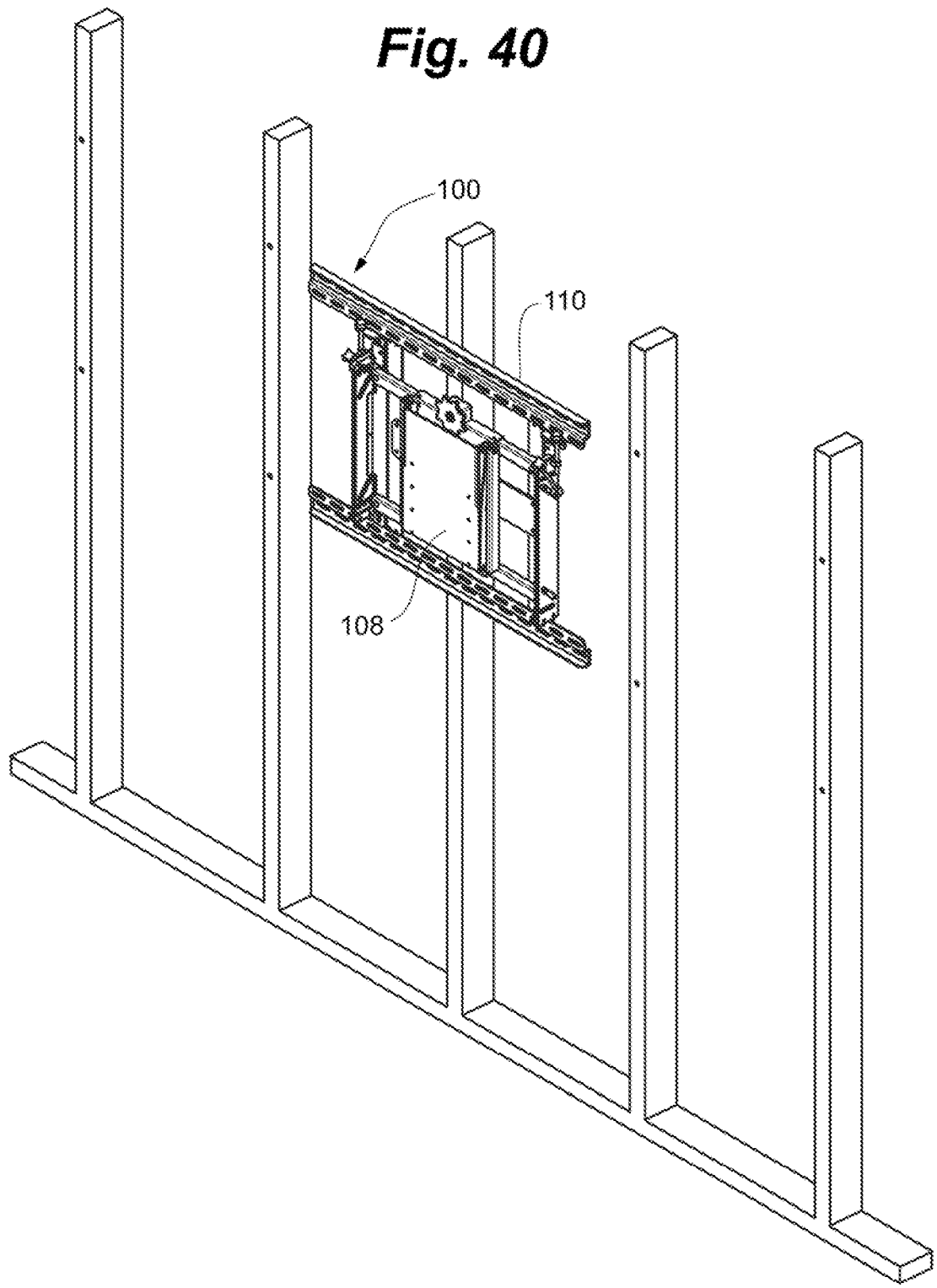
FIG. 40 is a perspective view of a wall mount system according to an embodiment of the present invention, wherein the wall mount system is affixed to a representative stud wall.
Figure 41:
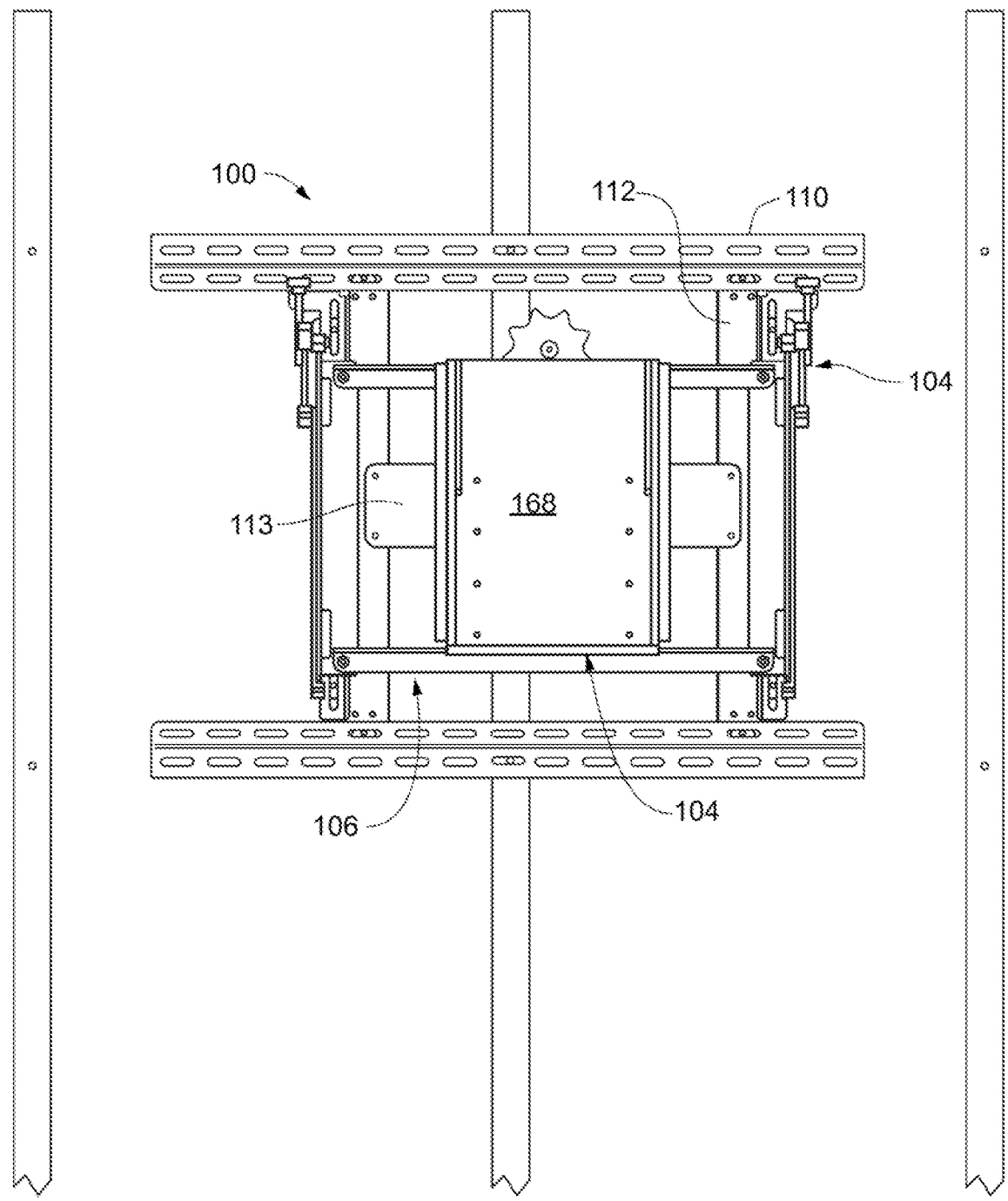
FIG. 41 is a front view of the wall mount system depicted in FIG. 40.
Figure 42:
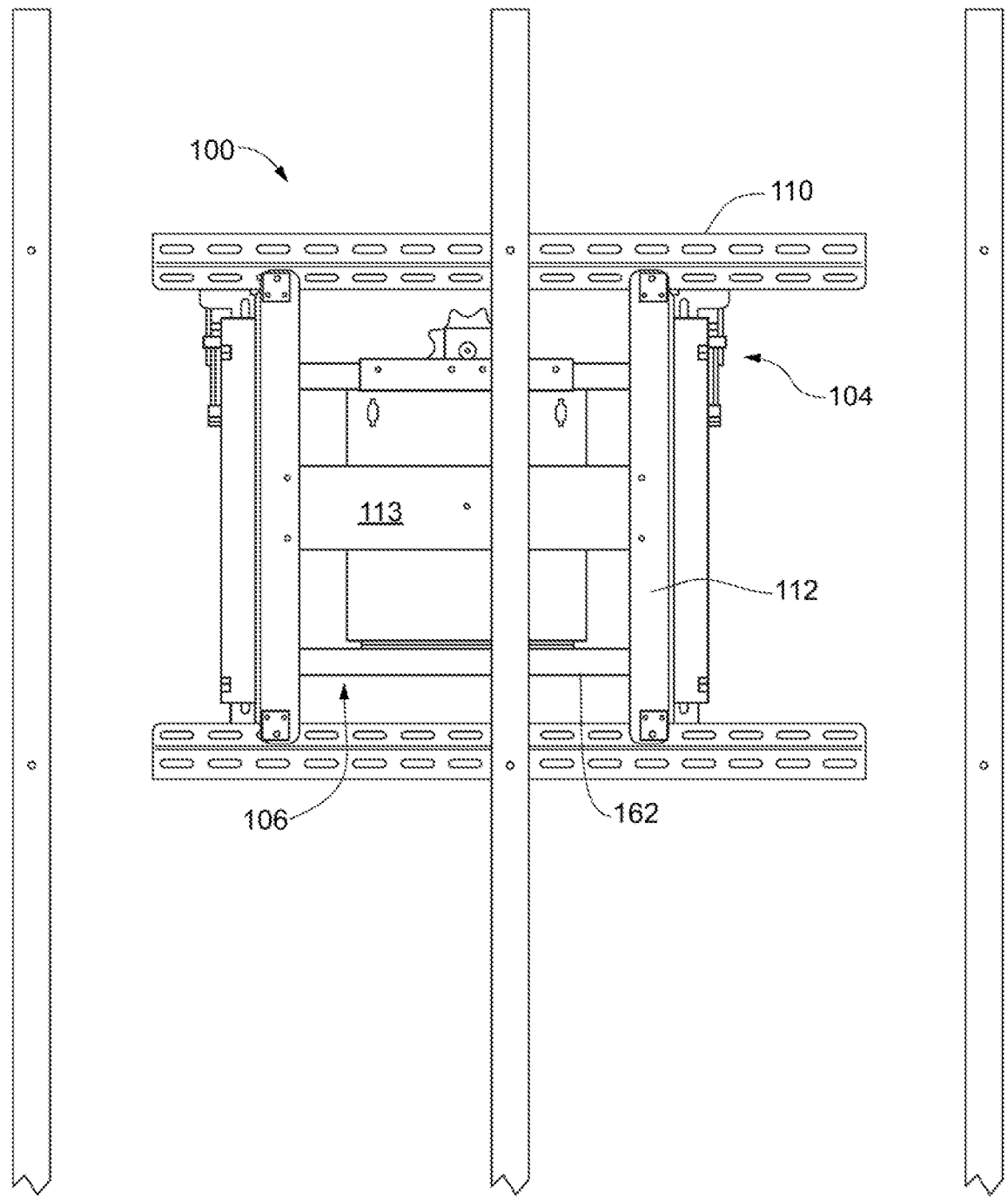
FIG. 42 is a rear view of the wall mount system depicted in FIG. 40.
Figure 43:
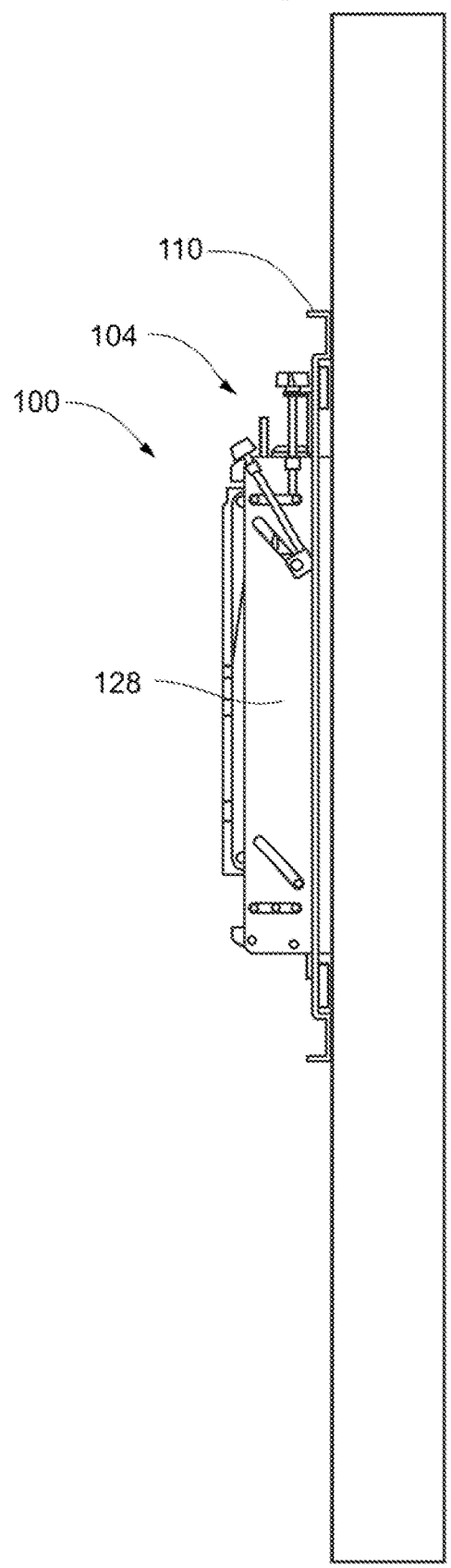
FIG. 43 is a side view of the wall mount system depicted in FIG. 25.

As depicted in FIGS. 38-39, in certain embodiments, the monitor mount assembly 108 further includes an extension assembly 178 operably connecting the engagement plate 168 and the monitor bracket 170. The extension assembly 178 further includes a plurality of scissoring arms 180 moving between a retracted position in which the monitor bracket 170 is positioned proximate the engagement bracket 168 and an extended position in which the monitor bracket 170 is extended outward from the engagement bracket 168.

In certain embodiments, the extension assembly 178 includes a hinge 182 about which the monitor bracket 170 can be rotated to tilt the monitor bracket 170 relative to the engagement plate 168. In this configuration, the engagement plate 168 includes a spindle 172 receivable within a corresponding curved notch 174 in the monitor bracket 170 for guiding the monitor bracket 170 as the monitor bracket 170 is rotated about the hinge 182.

Figure 44:
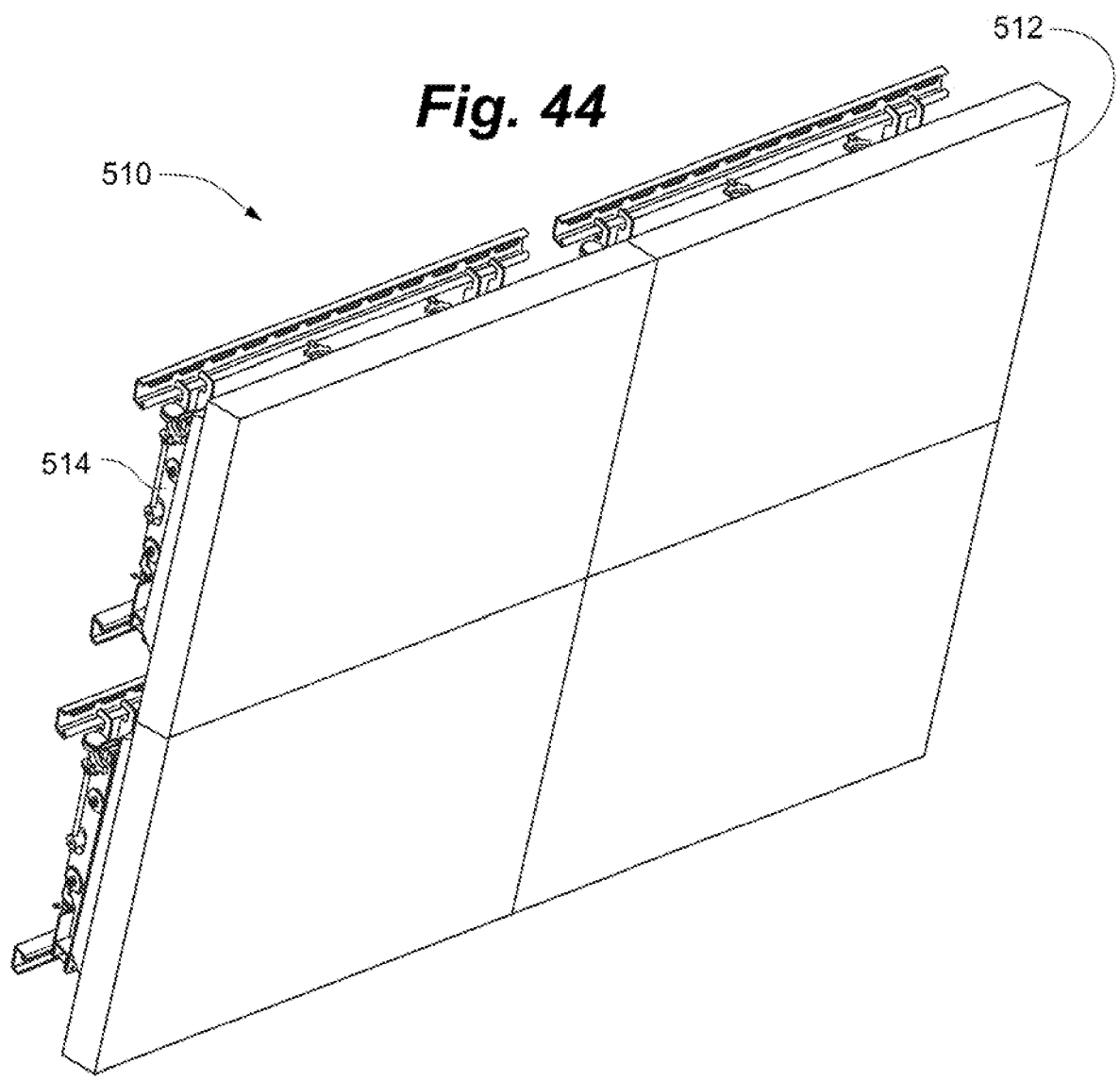
FIG. 44 is a perspective frontal view of a wall mount system including a 2×2 array of monitors, each monitor mounted on a separate monitor wall mount assembly according to an embodiment.
Figure 45:
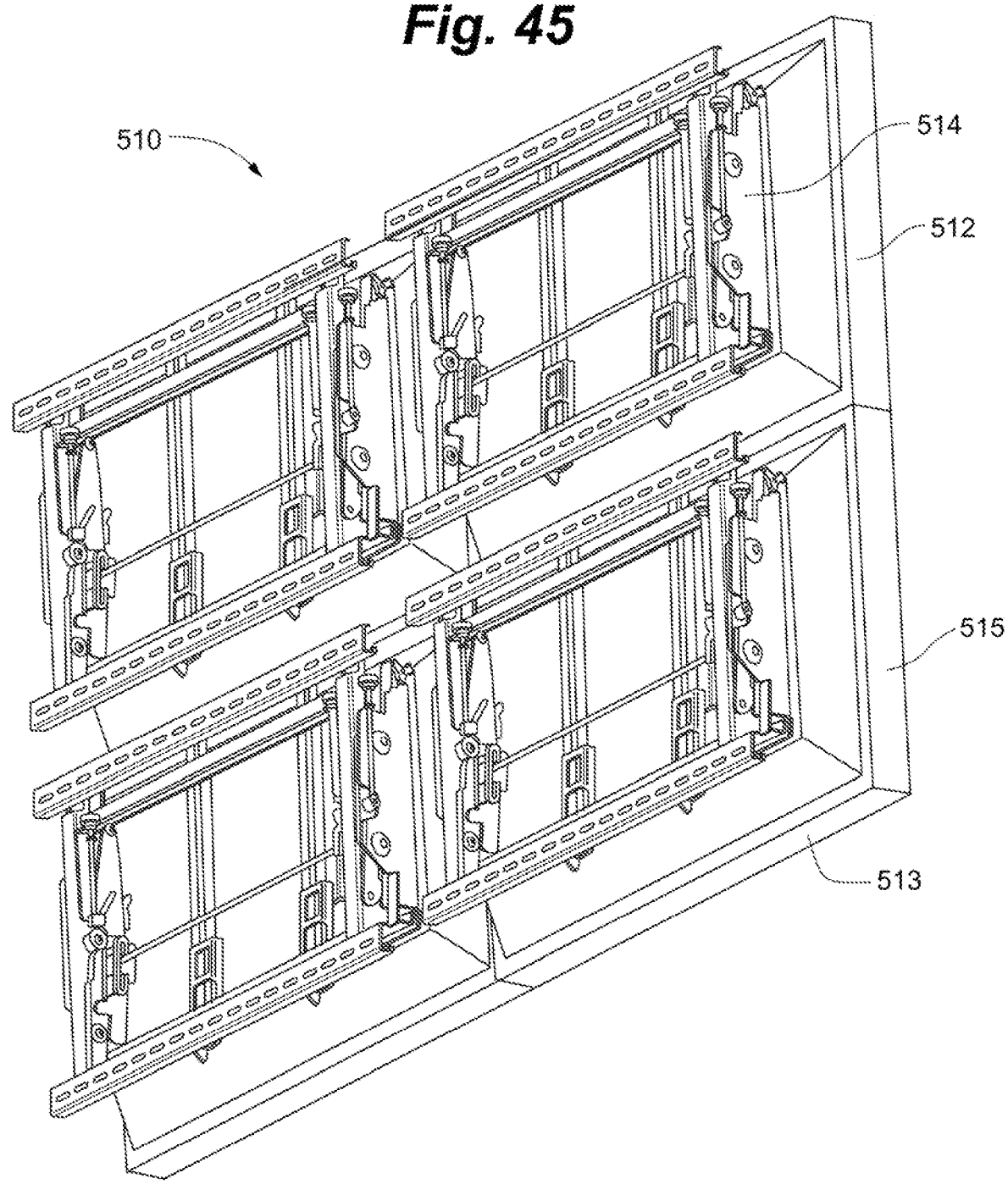
FIG. 45 is a perspective rear view of a wall mount system including a 2×2 array of monitors, each monitor mounted on a separate monitor wall mount assembly according to an embodiment.
Figure 46:
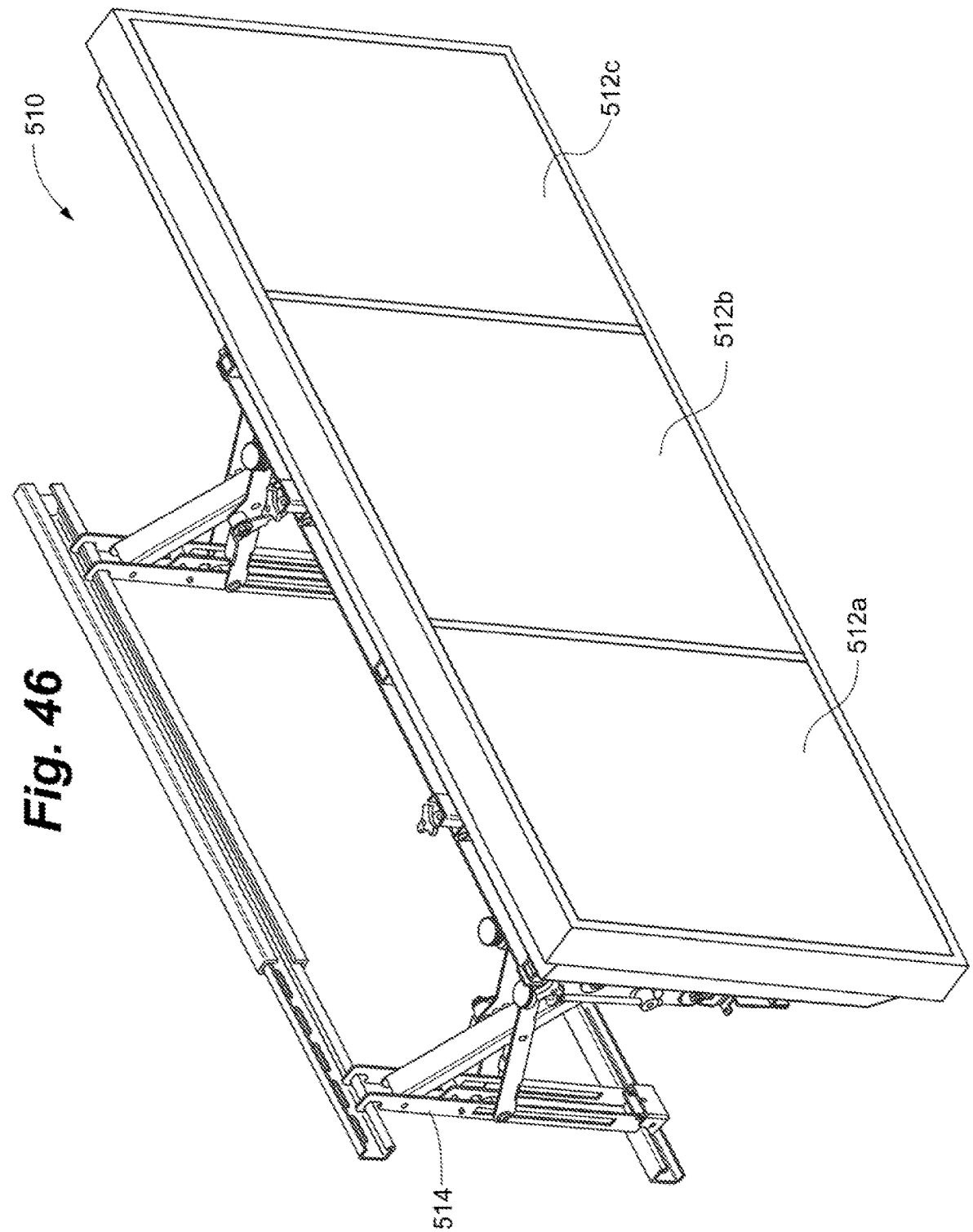
FIG. 46 is a perspective frontal view of a wall mount system including a 1×3 array of monitors, the monitors mounted on a single monitor wall mount assembly according to an embodiment.

FIGS. 44 and 45 depict an embodiment of a wall mount system 510 included of a 2×2 array of monitors 512, each monitor mounted on a separate monitor wall mount assembly 514. The wall mount system 510 includes a plurality of wall mount assemblies 514 and a plurality of monitors 512, where each wall mount assembly 514 is attached to a monitor 512. FIG. 46 depicts another embodiment of a wall mount system 510 where a single wall mount assembly 514 (shown in an expanded configuration) is attached to a plurality of monitors 512a, 512b, 512c. In the embodiment shown, monitors 512a, 512b, 512c are connected at their edges to each other so that the wall mount assembly 514 is attached only to monitors 512a and 512b. The embodiment of FIGS. 44 and 45 illustrate a 2×2 array of monitors 512 and FIG. 46 a 1×3 array of monitors, however, it is apparent to those skilled in the art that the arrays are not so limited and that any number and configuration of monitors 512 can be provided, e.g. a 3×3 array, a 4×6 array, an "L" shaped array, an "+" shaped array, etc.

Figure 47:
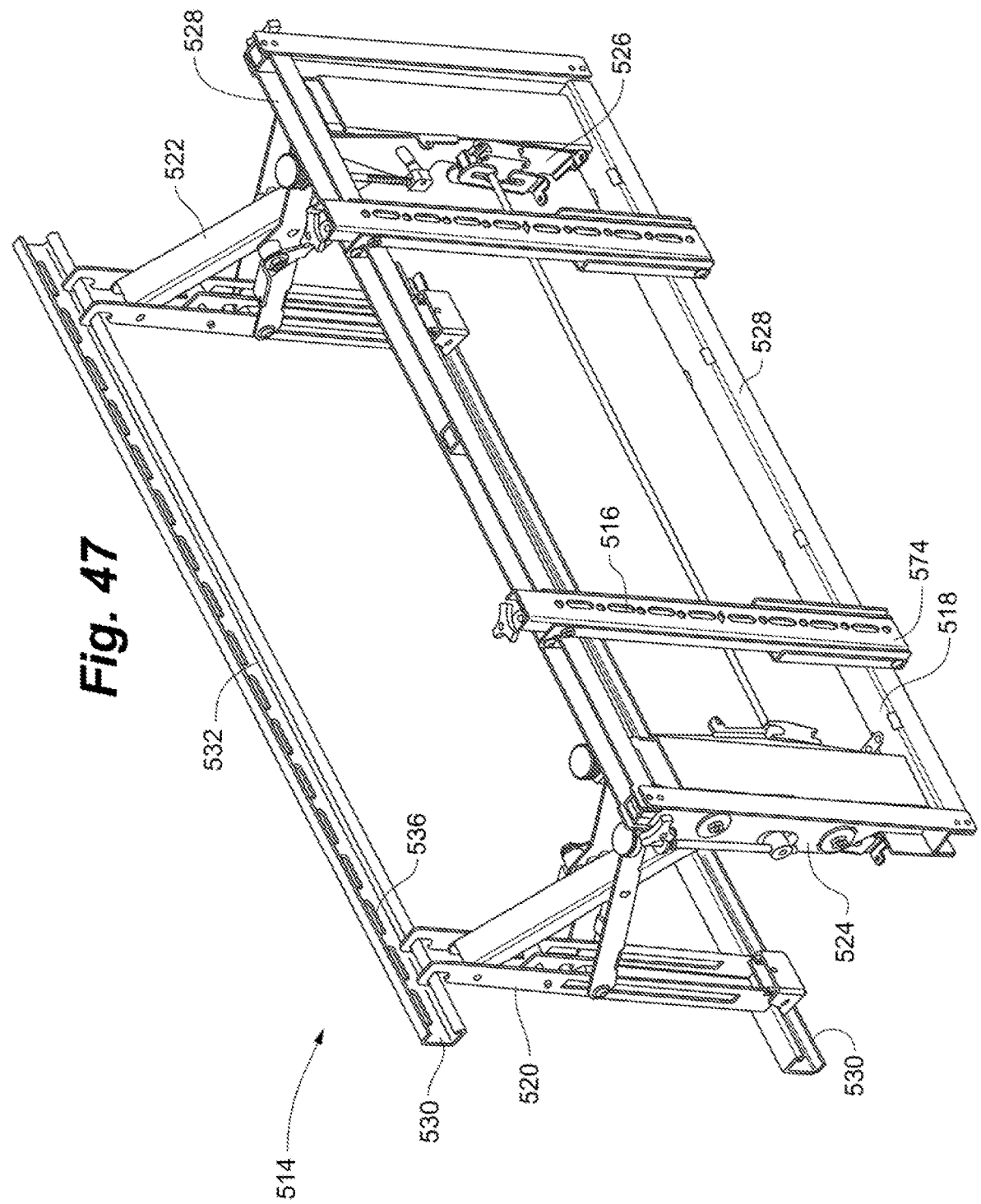
FIG. 47 is a perspective view of a wall mount assembly in an expanded position according to an embodiment of the present invention.
Figure 48:
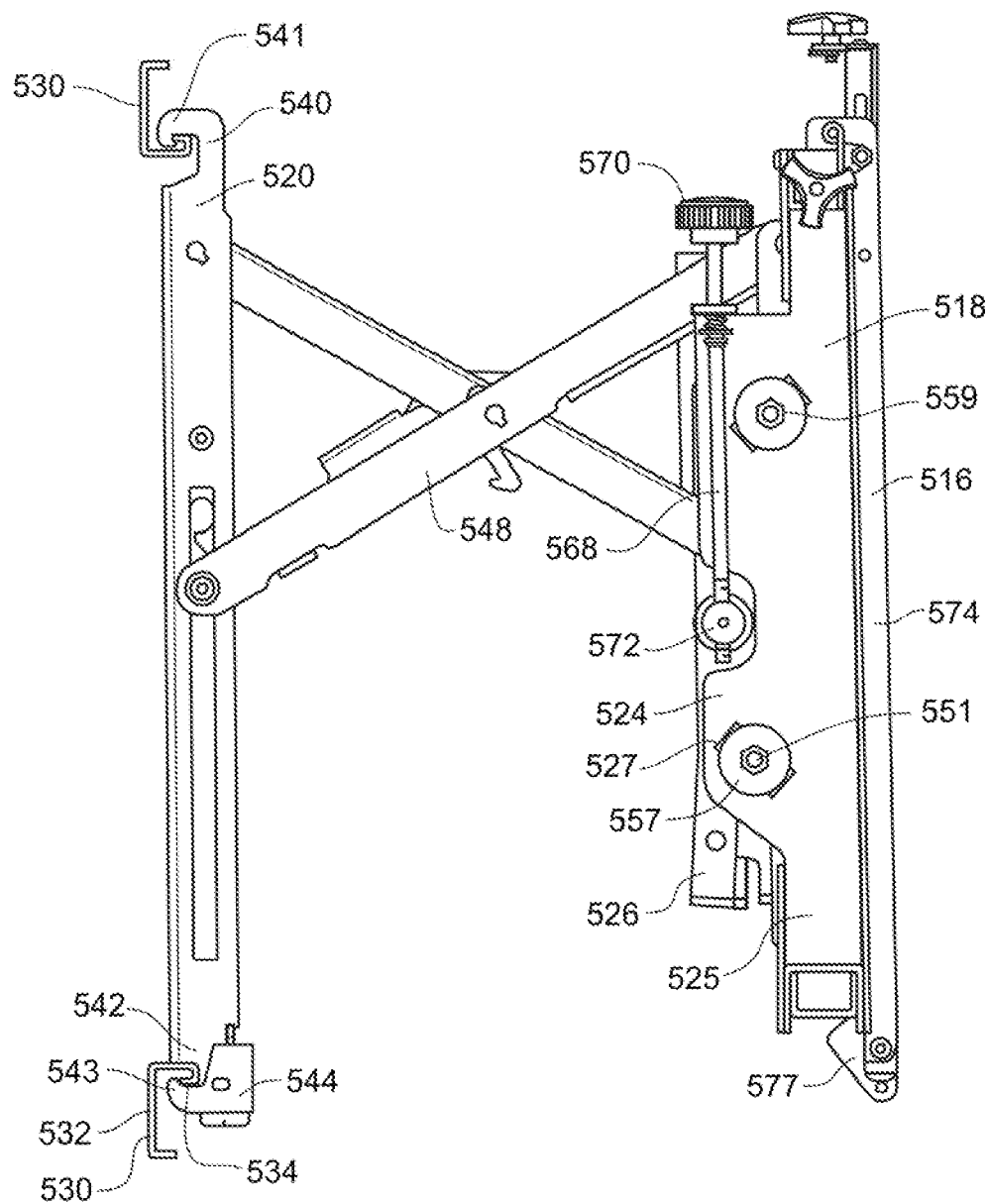
FIG. 48 is a perspective side view of a wall mount assembly in an expanded position according to an embodiment.
Figure 49:
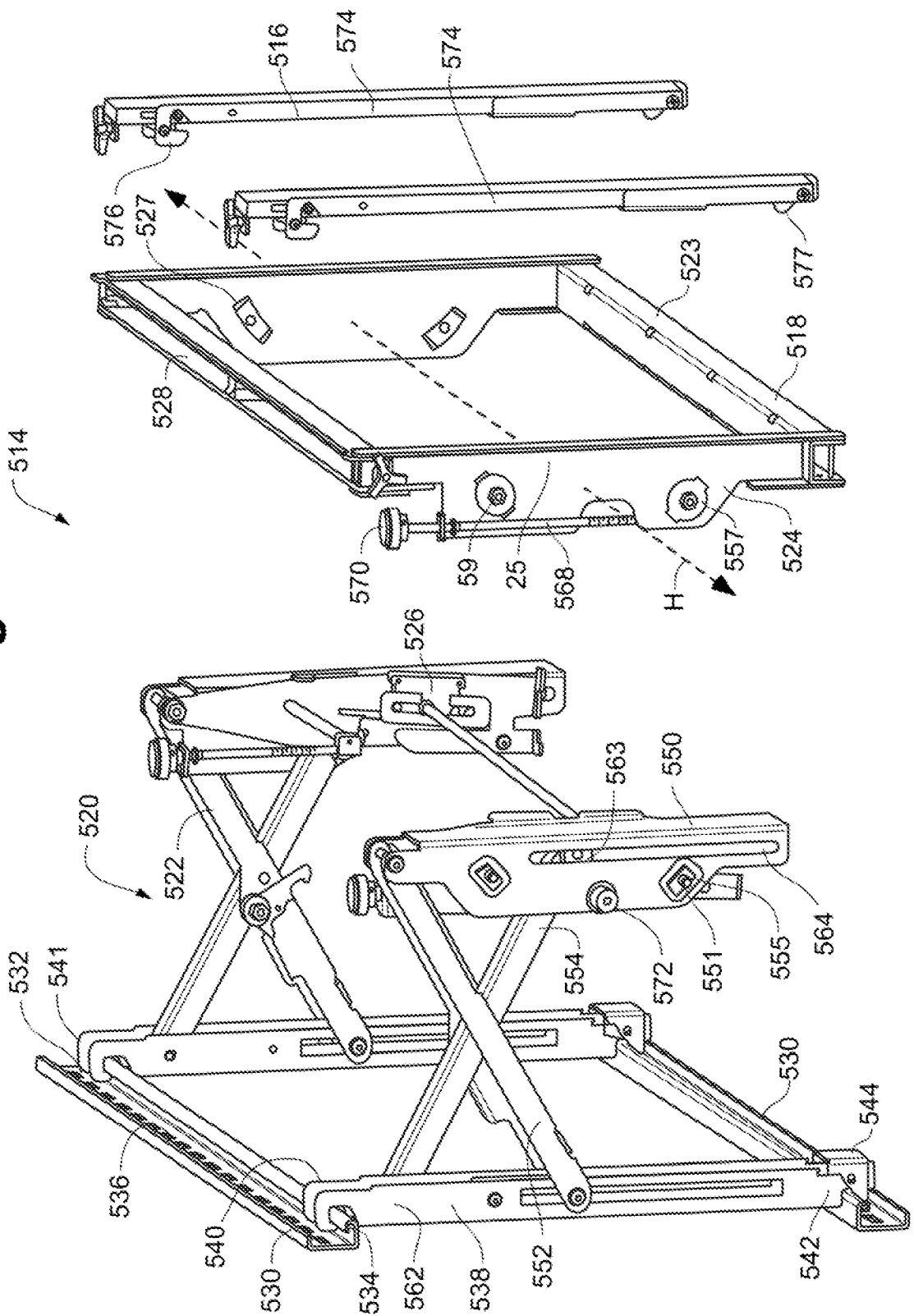
FIG. 49 is an exploded view of a wall mount assembly in an expanded position according to an embodiment.

FIG. 47 depicts wall mount assembly 514 in an expanded configuration, FIG. 48 depicts a side view, and FIG. 49 depicts an exploded view. Wall mount assembly 514 includes monitor mount assembly 516, guide bar assembly 518, and wall bracket assembly 520 including depth adjustment assembly 522. Each of the assemblies 516, 518, 520 can be adjusted independently of any other assembly 516, 518, 520 or in concert with any other assembly 516, 518, 520 in order to adjust various orientations of the monitor 512, e.g., horizontal, vertical, tilt, depth and skew. The assemblies 516, 518, 520 when oriented can be locked in place. Further adjustments of the monitor 512 can be done by easily releasing the lock mechanism and performing adjustment operations.

Each wall mount assembly 514 is adapted to receive a monitor 512 wherein the wall mount assembly 514 horizontally, vertically, skew-wise and depth-wise aligns each mounted monitor 512 with adjacent mounted monitors 512. Generally, a plurality of wall mount assemblies 514 are affixed to a wall and each wall mount assembly 514 includes at least two depth adjustment assemblies 522, each depth adjustment assembly 522 able to independently expand or contract, thus altering the distance of the monitor 512 from the wall. Each wall mount assembly 514 further includes a tilt adjustment assembly 524 able to adjust the vertical tilt of the monitor 512. Each wall mount assembly 514 further includes at least two directional adjustment assemblies 526 able to independently adjust the horizontal inclination or declination of the horizontal edge 513 (FIG. 45) of the monitor 512 and the skew of the monitor 512 so that the mounted monitors are positioned edge to edge. The wall mount assembly 514 is expanded or contracted, skewed, tilted, or horizontally adjusted to account for recesses or elevated portions of a contoured or uneven wall regardless of the relative elevation of the portion of the wall to which the wall mount assembly 514 is mounted. Similarly, the monitor mount assemblies 516 are slidable horizontally along the guide bar 528 of the guide bar assembly 518 to position the vertical edges 515 (FIG. 45) of mounted monitors 512 edge to edge as depicted in FIGS. 44 and 45. In certain embodiments, each mounted monitor 512 is operably engaged to guide bar 528 by monitor mount assemblies 516.

Generally, the wall mount assembly 514 is affixed to a wall via the wall bracket assembly 520 to secure the wall mount system 510. The wall bracket assembly 520 operably engages the guide bar assembly 518 to the wall bracket assembly 520 in a substantially horizontal orientation and is adapted to move the guide bar assembly 518 relative to the wall bracket assembly 520. In certain embodiments, the wall bracket assembly 520 includes at least two depth adjustment assemblies 522 having depth guide channels 550, where tilt adjustment assemblies 524 are adapted to be rotatably connected to depth guide channels 550 to cooperatively tilt guide bar assembly 518. In certain embodiments, wall bracket assembly 520 includes at least two directional adjustment assemblies 526 adapted to be fixedly connected to depth guide channels 550 to cooperatively move mounted monitors 512 in skew or in a generally vertical direction. Monitor mount assembly 516 is affixable to oriented guide bar assembly 518 and adapted to receive monitor 512 to secure the monitor 512 to the wall via wall mount assembly 514.

As depicted in FIGS. 47-49, each wall mount assembly 514 includes a pair of elongated wall tracks 530. Each wall track 530 includes a planar portion 532 and channel hem portion 534. The planar portion 532 includes a plurality of wall screw holes 536 arranged longitudinally along wall track 530, wherein each wall screw hole 536 is adapted to receive at least one fastener to secure wall track 530 to a wall. The longitudinal arrangement of wall screw holes 536 allows the fasteners to be more easily aligned with desirable anchor points such as wall studs without shifting the entire wall mount assembly 514. Channel hem portion 534 can be formed in a "U" shape as depicted. In other embodiments, channel hem portion 534 can be an "L" shape. During assembly, wall tracks 530 are positioned in parallel on the wall in generally horizontal orientations with channel hem portion 534 of each wall track 530 directed at the opposing wall track 530. Fasteners can then be inserted into wall screw holes 536 to fasten wall tracks 530 to the wall.

Figure 50:
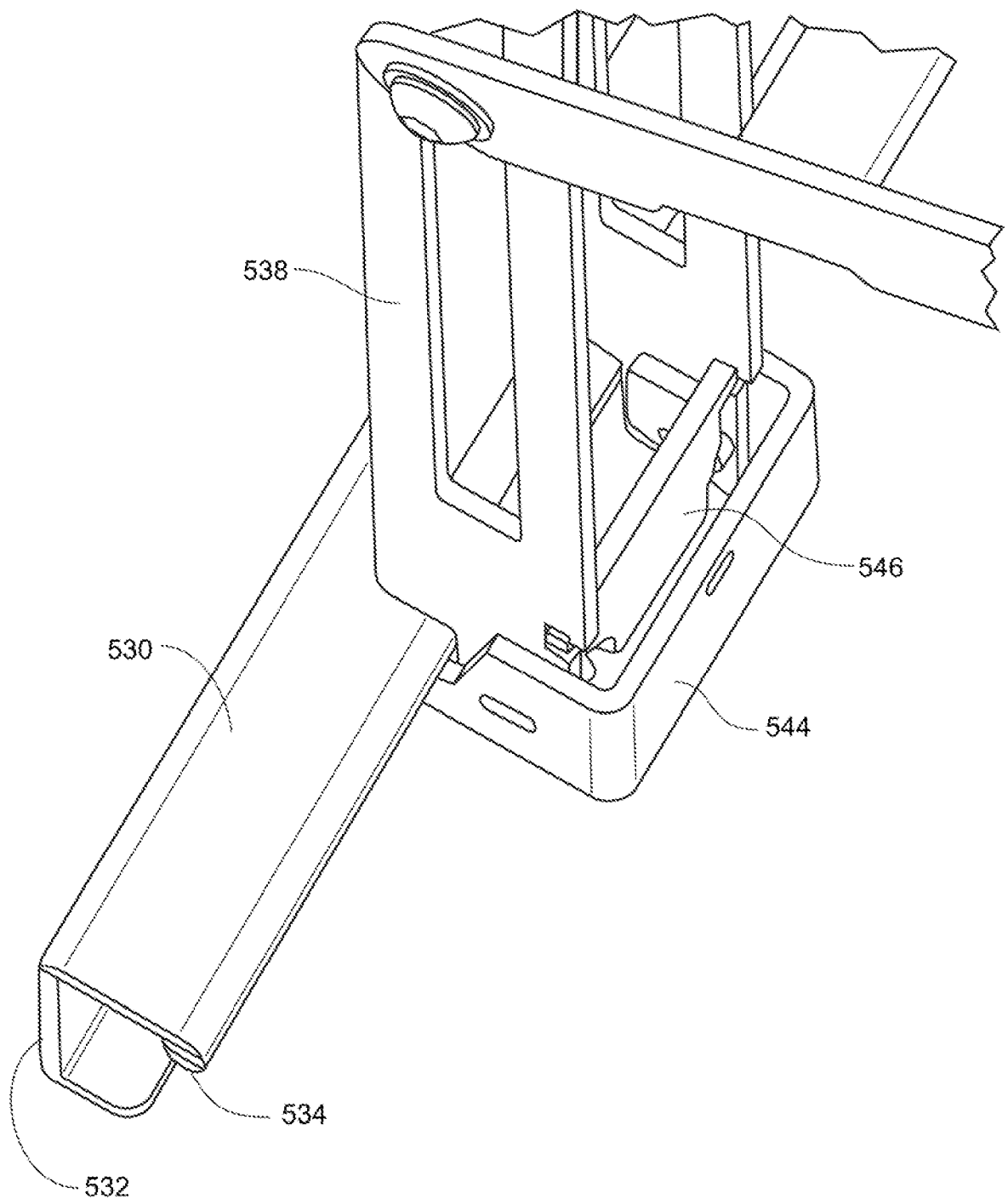
FIG. 50 is a perspective view of an adjustment foot of a wall guide channel a according to an embodiment.

Wall mount assembly 514 further includes at least one pair of wall guide channels 538. The top end 540 flanges of wall guide channel 538 can be provided with hooks 541. The bottom end 542 of wall guide channel 538 flanges can be pivotably attached to an adjustment foot 544. Adjustment foot 544 flanges are provided with hooks 543. During assembly, wall guide channel 538 is positioned so that it spans between the two wall tracks 530. Hook 541 is positioned so that channel hem portion 534 of the top wall track 530 is disposed within the inside curvature of hook 541. Hook 543 of adjustment foot 544 is positioned so that channel hem portion 534 of lower wall track 530 is disposed within the inside curvature of hook 543. Adjustment foot 544 is then pivoted and locked in place via a pressure latch 546, as shown in FIG. 50, thus compressing hooks 541, 543 against channel hem portions 534 to anchor wall guide channel 538 in a desired location. In other embodiments, adjustment foot 544 can be provided with an adjustment knob (not shown) that can be rotated resulting in compression of hooks 541, 543 against channel hem portions 534. In certain embodiments, multiple pairs of wall guide channels 538 can be positioned on the single pair of wall tracks 530 for mounting multiple monitors 512 on the single pair of wall tracks 530.

Figure 51:
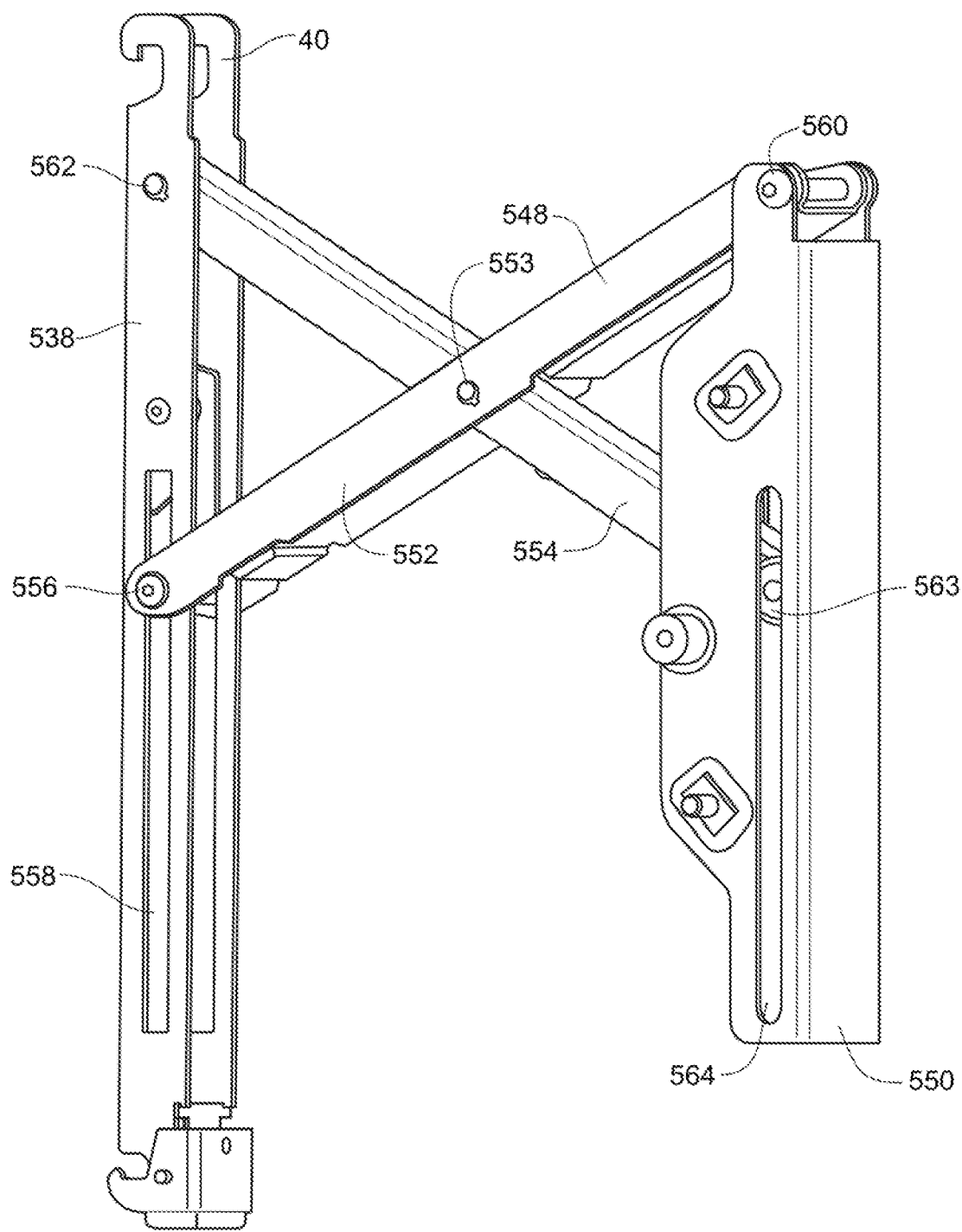
FIG. 51 is a perspective side view of a portion of the depth adjustment assembly in an expanded position according to an embodiment.

Depth adjustment assembly 522, depicted in FIG. 51, includes wall guide channel 538, scissoring arms 548, and depth guide channel 550. Depth adjustment assembly 522 operably connects wall tracks 530 and tilt adjustment assembly 524. Scissoring arms 548 move between a retracted position in which guide bar assembly 518 is positioned proximate wall guide channel 538 and an extended position in which guide bar assembly 518 is extended outward from wall guide channel 538. Scissoring arms 548 are included of an outer arm 552 and an inner arm 554 connected by a pin 553 near the midpoint of each arm 552, 554. Outer arm 552 is slidingly attached at one end to wall guide channel 538 via a pin 556 attached to outer arm 552 where the pin engages with a guide notch 558 in the wall guide channel 538. The other end of the outer arm 552 is fixedly pivotably attached via a pin 560 to the top flanged end of the depth guide channel 550. Inner arm 554 is fixedly pivotably attached closer to the top end flanges 540 of the guide bar assembly 518 via a pin 562. The other end of the inner arm 554 is slidingly attached via a roller pin 563 at one end to guide notch 564 of depth guide channel 550. Roller pin 563 is configured to ride within depth guide channel 550 with roller pin 563 ends projecting into guide notch 564.

In operation, pins 556, 563 move within the guide notches 558, 564 thus operably retracting or extending the guide bar assembly 518 to alter the depth of the guide bar assembly 518. The fixed ends of the arms 552, 554 working in concert with the scissoring motion of the scissoring arms 548 and the travel of the pins 556, 563 within guide notches 558, 564 provide that the while the depth of the of guide bar assembly 518 is altered, the horizontal and vertical orientations remain constant. The scissoring arms 548 can move independently thereby adjusting the depth of one side of the monitor 512 only or providing that one end of the monitor 512 moves towards the wall while the other end of the monitor 512 moves away from the wall.

Figure 52:
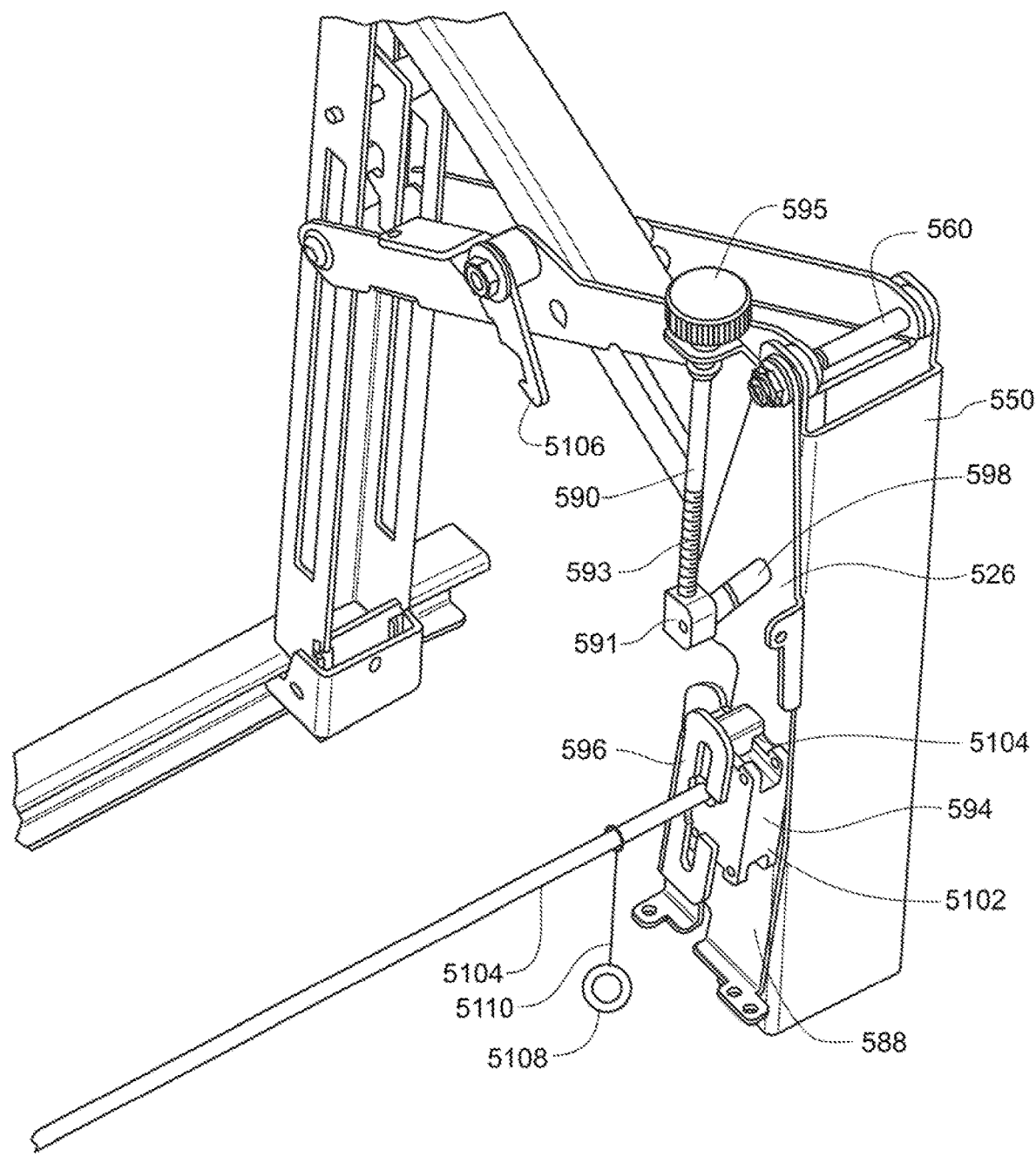
FIG. 52 is a perspective view of a directional adjustment assembly according to an embodiment.
Figure 53:
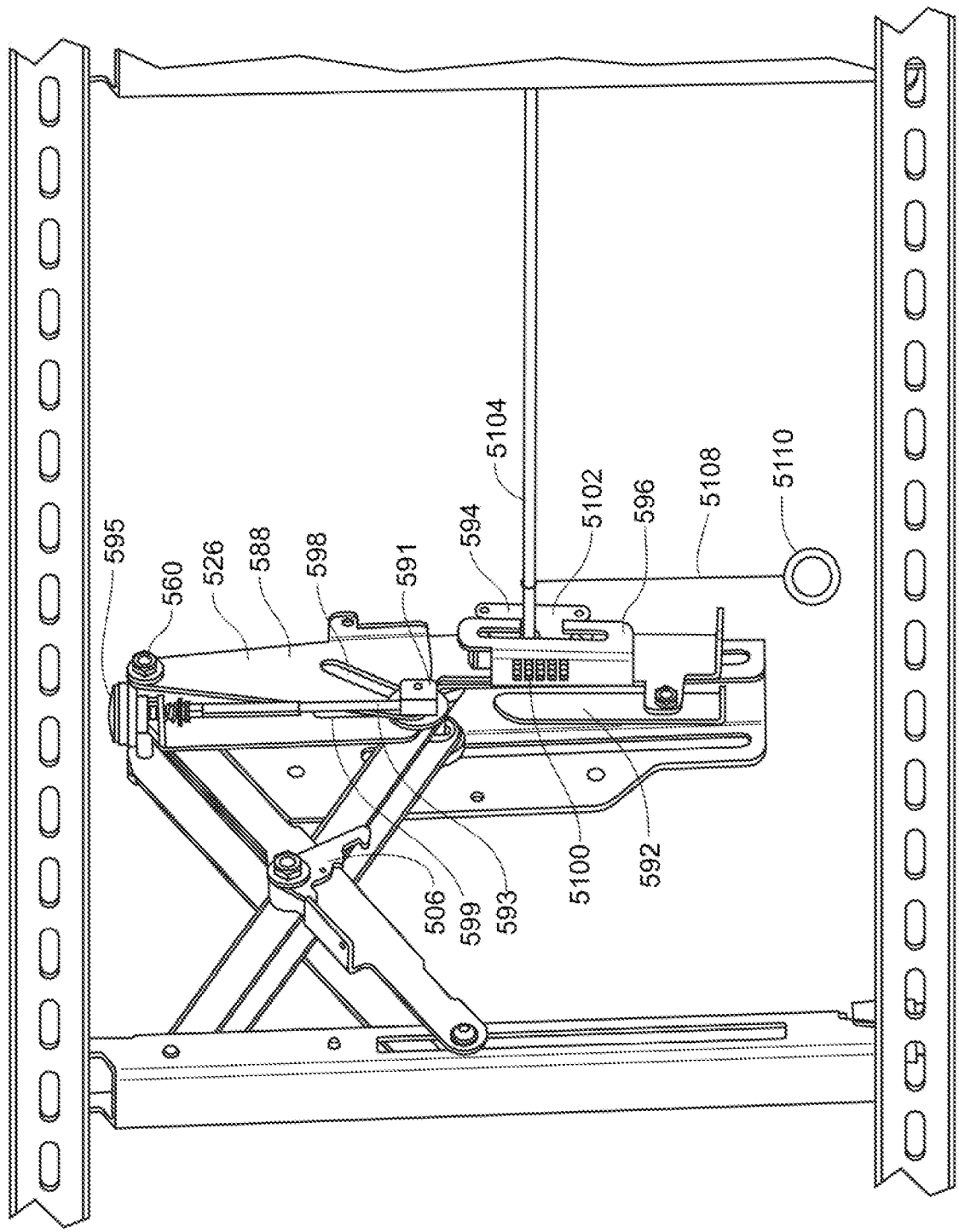
FIG. 53 is a perspective rear and side view of a directional adjustment assembly according to an embodiment.

FIGS. 52 and 53 depict the directional adjustment assembly 526 operably attached to the depth guide channel 550. Each directional adjustment assembly 526 includes a plate 588, a worm gear 590, a stop leg 592, a sprocket assembly 594, and a sprocket and rod guide 596. A latch 5106 rotatably attached to outer scissoring arm 552 is also provided to cooperate with sprocket assembly 594. Plate 588 is rotatably affixed to depth guide channel 550 via pin 560 at the top flanged end of the depth guide channel 550. Plate 588 is further provided with an elongated guide aperture 598. Worm gear 590 further includes traveler 591 positioned on worm screw 593, wherein rotation of worm screw 593 via handle 595 moves traveler 591 along the length of worm screw 593. A portion of traveler 591 is positioned within an elongated aperture 599 disposed on depth guide channel 550 such that the rotation of worm screw 593 moves traveler 591 vertically within the elongated aperture 599. Traveler 591 is further slidably engagable to plate 588 along the elongated guide aperture 598 to permit rotational movement of the plate 588 along traveler 591.

Figure 54:
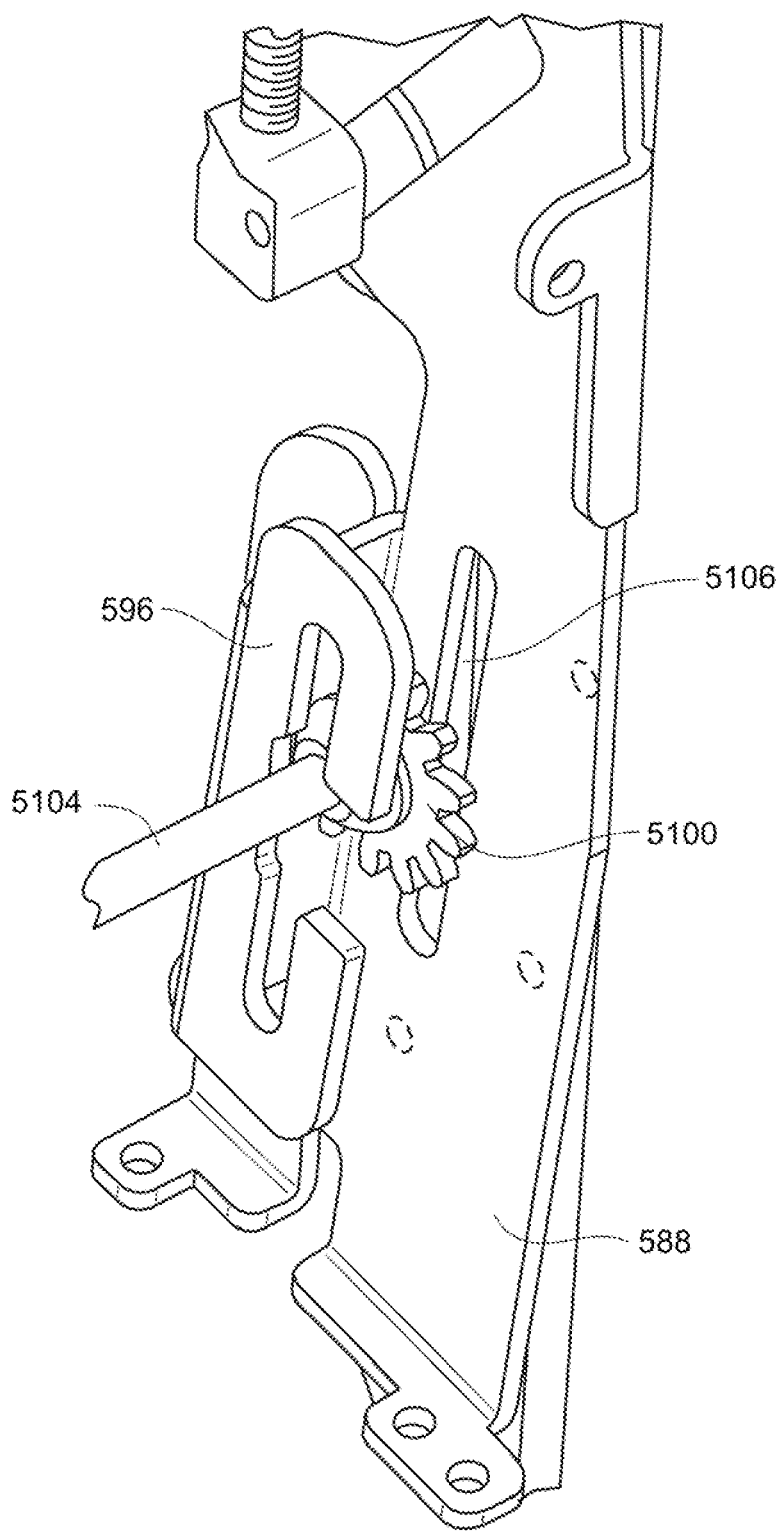
FIG. 54 is a perspective view of a sprocket assembly without the casing according to an embodiment.
Figure 55:
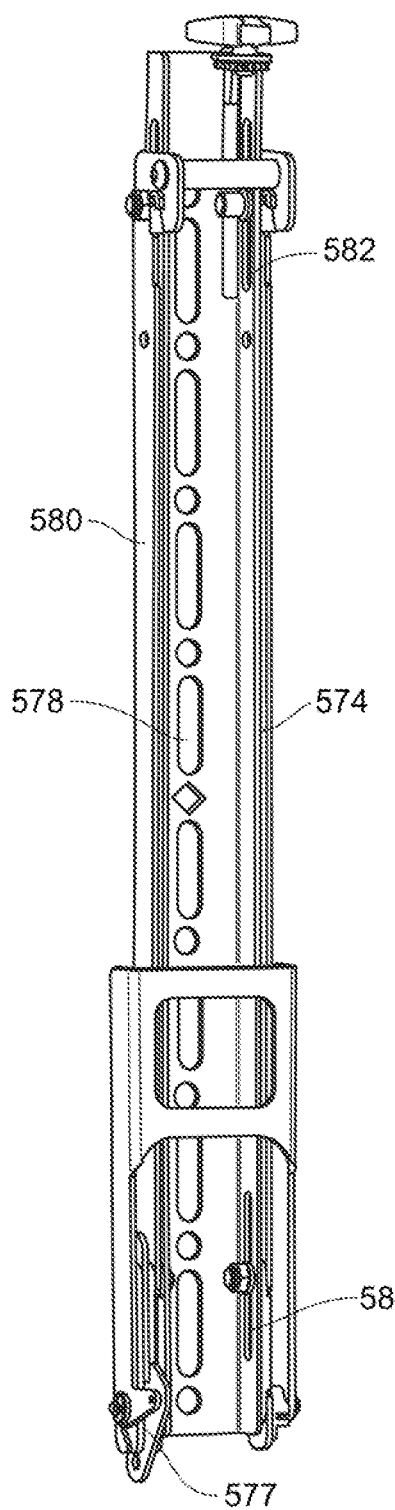
FIG. 55 is a perspective rear view of a monitor mount assembly according to an embodiment.
Figure 56:
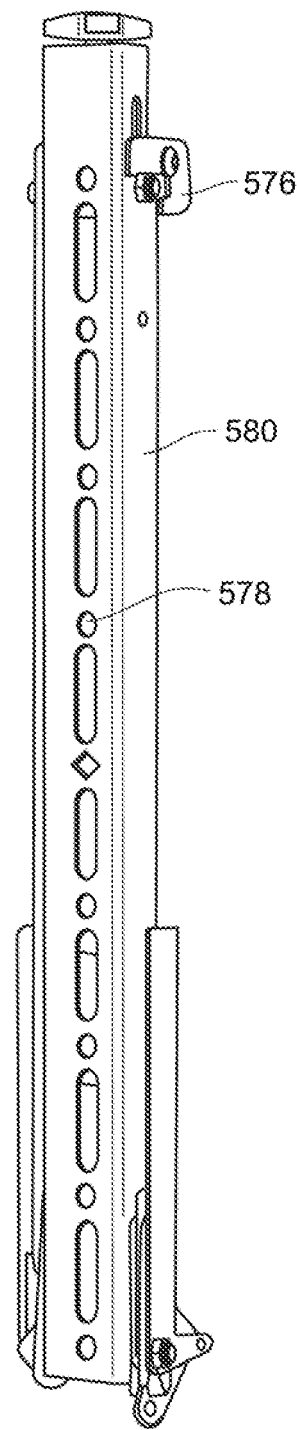
FIG. 56 is a perspective front view of a monitor mount assembly according to an embodiment.

As depicted in FIGS. 52-54, during assembly, worm gear 590 of directional adjustment assembly 526 is rotated via handle 595 to move traveler 591 thus moving directional adjustment assembly 526 relative to wall mount assembly 514. Traveler 591 extends through guide notch 599 of depth guide channel 550. In operation, rotating worm gear 590 via handle 595 moves traveler 591 within guide notch 599, which correspondingly moves plate 588 along traveler 591 along elongated guide notch 598. In certain embodiments, guide notch 598 is angled such that moving traveler 591 moves plate 588 toward or away from the wall.

Sprocket assembly 594 includes sprocket 5100 housed in casing 5102. Sprocket 5100 is provided with a bearing that rotatably attaches sprocket 5100 to rod 5104 where rod 5104 is rotatably attached at its other end to second sprocket assembly 594. Also provided is sprocket and rod guide 596. Provided in plate 588 is sprocket guide notch 5106, as depicted in FIG. 54, where casing 5102 has been removed to better detail sprocket 5100 and its cooperation with sprocket guide notch 5106.

In operation, wall mount system 510 is generally used in a substantially retracted position so that latch 5106 engages with casing 5102 at lip 5104. Sprocket casing 5102 and sprocket 5100 are vertically adjustable to ensure that latch 5106 engages with casing 5102 at various retracted positions. Sprocket assembly 594 is configured to travel in sprocket guide notch 5106 thus maintaining the latched position based on various retracted positions. Rotation of worm gear 590 provides that depth and skew of monitor 512 are relationally adjusted and sprocket assembly 594 is further configured to slidingly adjust to maintain a latched status. Latch 5106 can be disengaged from lip 5104 by application of a downward force on the rod 5104.

In some embodiments, downward force on rod 5104 can be provided via pull line 5108. Pull lines 5108 can be provided at each end of rod 5104. In other embodiments, pull lines 5108 can be provided at one end of rod 5104 or substantially centered on rod 5104. Pull line 5108 is pulled to and overcomes the pressure of latch 5106 engagement with casing 5102 thereby releasing or disengaging depth adjustment assembly 522 into a disengaged position. In certain embodiments, pull line 5108 can further include loop 5110 for more efficient application of a pull force to pull line 5108.

In an embodiment, application of a pull force to single pull line 5108 can result in disengagement of latch 5106 at both ends of rod 5104. Configuration of rod 5104 and sprocket assembly 594 provides that downward motion at one rod 5104 location is transferred along the length of rod 5104 so that sprocket 5100 at each end rotates in a downward direction, the downward motion being transferred to casing 594 causing latch 5106 to disengage from casing 594 at each end.

As depicted in FIGS. 48-49, guide bar assembly 518 generally includes a pair of guide bars 528 and a pair of mounting plates 525 where mounting plates 525 are configured as part of tilt adjustment assembly 524. Guide bars 528 are positioned in parallel in a generally horizontal orientation. Similarly, mounting plates 525 are also positioned in parallel and each affixed substantially perpendicular to the ends of guide bars 528 to define a generally rectangular orientation. Tilt adjustment assembly 524 includes at least one mounting plate 525 guide bar notch 527 to receive at least one projection 555, having a threaded spindle 551. Projection 555 is disposed on depth guide channel 550 so that guide bar assembly 518 is operably engaged with depth guide channel 550. Projection 555 is sized so that projection 555 is shorter than guide bar notch 527 allowing guide bar notch 527 to move in a substantially longitudinal direction along projection 555. Washer 557 and nut 559 are placed over spindle 551 and nut 559 is threadingly engaged with spindle 551.

Tilt adjustment assembly 524 further includes worm gear 568 having handle 570 attached to mounting plate 525 and receiver 572 having a threaded bore hole attached to the depth guide channel 550 that operably engages with worm gear 568. Guide bar assembly 518 is moved relative to wall bracket assembly 520 so that guide bar assembly 518 is rotated about a horizontal axis H thus moving projection 555 within guide bar notch 527 thus creating a tilt in mounted monitor 512. In addition, worm gear 568 is rotated via handle 570 to make precise adjustments to the tilt of the monitor 512. Once the monitor 512 is positioned, nut 559 is tightened so that tilt adjustment assembly 524 is held in place.

As depicted in FIGS. 47-49 and 55-58, the wall mount system 510 further includes monitor mount assembly 516 with at least two monitor mount channels 574. In an embodiment, each channel 574 can further include a pair of hook plates 580 slidingly attached to a flange on channel 574 near the top and bottom via guide notches 582, each hook plate having a top hook element 576. Each channel 574 can further include at least one bottom hook plate 584 attached to the channel 574 flange near the bottom via a fastener, the bottom hook plate having a bottom hook element 577. Each monitor mount channel 574 further includes a worm drive 584 having a handle 585, the worm drive received by a threaded receiver 586.

Figure 59:
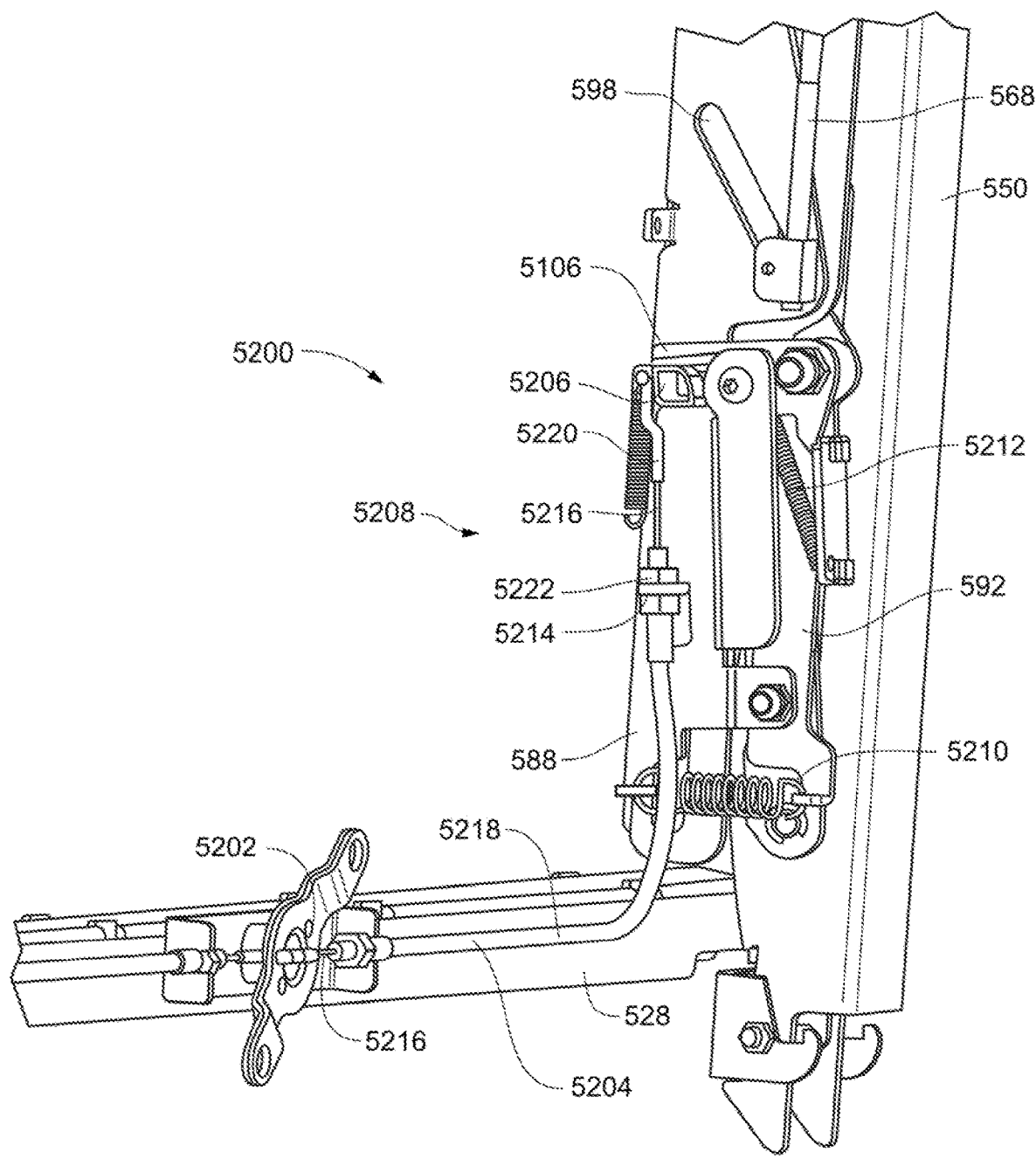
FIG. 59 is a perspective view of a cable release system of a monitor mount assembly according to an embodiment.

In embodiments, as depicted in FIGS. 59 and 60, the wall mount system 510 further includes a cable release system 5200 having a release mechanism 5208. The release mechanism 5208 includes a stop element 5206, a plate 588, a stop leg 592, tension springs 5210, 5212, and a cable housing stop 5214. The release mechanism 5208 operates in concert with the release handle 5202 and the cable 5204 to release the latch 5106. In an embodiment, two release mechanisms 5208 are provided, one on each depth guide channel 550. The release handle 5202 can be attached to the lower guide bar 528 so that when the wall mount system 510 is attached to a structure, the release handle 5202 is accessible to a user.

Cable 5204 is provided to span the distance between the stop element 5206 and the release handle 5202. Cable 5204 is a two part cable having a wire 5216 and an outer housing 5218. Attached to the ends of the wire 5216 are "Z" type cable end fittings 5220. While "Z" fittings 5220 are shown, it is understood to one with skill in the art that any type of fitting can be provided as long as it is able to be anchored to the release handle 5202 and the stop element 5206, for example, but not limited to, shank, eye, fork, thimble, etc. fittings. The "Z" fittings 5220 are removably attached, at one end, to the release handle 5202 and, at the other end, to the stop element 5206. Stop nuts 5222 are provided at each end of the cable housing 5218 and are anchored at cable housing stops 5214 thus preventing the cable outer housing 5218 from moving while still allowing the wire 5216 to move freely as the release handle 5202 is rotated.

In operation, wall mount system 10 is generally used in a substantially retracted position so that latch 5106 is pulled into position by tension spring 5212 and engages with stop element 5206 thus maintaining a latched status. Latch 5106 can be disengaged from stop element 5206 by application of a pivoting force on the release handle 5202. Pivoting of the release handle 5202 causes the wire 5216 end with the "Z" fitting 5220 that is connected to the stop element 5206 to move downward, thus pulling the stop element 5206 in a downward direction and causing the latch 5106 to disengage from the stop element 5206.

The release handle 5202 can be provided at one end of the guide bar 528 or substantially centered on the rod 5104. The release handle 5202 is rotated, or otherwise engaged, to overcome the pressure of the latch 5106 engagement with the stop element 5206 thereby releasing or disengaging the depth adjustment assembly 522 into a disengaged position.

In an embodiment, release mechanism 5208 can be provided in pairs so that a release mechanism 5208 is provided on each depth guide channel 550. In an embodiment, application of a force to a single release handle 5202 can result in disengagement of the latch 5106 at both depth guide channels 550.

During assembly, monitor mount channel 574 is positioned so that it spans between the guide bars 528. Top hook element 576 is positioned so that flange portion of the top guide bar 528 is disposed within the inside curvature of top hook element 576. Bottom hook element 577 is positioned so that flange portion of lower guide bar 528 is disposed within the inside curvature of bottom hook element 577. Handle 585 is rotated driving the worm drive 584 in the threaded receiver 586 which results in compression of hook elements 576, 577 against flange portions of guide bars 528 to frictionally anchor monitor mount channel 574 in a desired location. Monitor 512 can be adjusted horizontally by rotating handle 585 so that hook elements 576, 577 are not frictionally anchored guide bars 528 so that hook elements 576, 577 are slidably engaged with guide bars 528.

In operation, the monitor mount channels 574 are affixed to the guide bars 528 with the hook elements 576, 577. A monitor 512 can then be secured to the monitor mount channels and in certain embodiments, the monitor mount channels 574 can be each moved horizontally along the guide bars 528 to position the mounted monitors 512 edge-to-edge without disengaging the monitor mount channels 574 from the guide bars 528.

As depicted, monitor mount channels 574 include a plurality of apertures 578 for receiving fasteners to engage to corresponding engagement points on the monitor 512. In other embodiments, the monitor mount channels 574 can include specialized mounting elements corresponding to the different mounting systems of different types or brands of monitors 512.

A method of presenting a continuous, planar display from a plurality of monitors, according to an embodiment of the present invention, includes providing a plurality of wall mount assemblies 514, wherein each wall mount assembly 514 further includes a monitor mount assembly 516, a guide bar assembly 518 and a wall bracket assembly 520 including a depth adjustment assembly 522. The method further includes affixing wall bracket 520 to a wall. In certain embodiments, the wall brackets 520 are positioned on the wall along a generally horizontal axis. The method also includes operating each depth adjustment assembly 522 to move corresponding guide bar assembly 518 relative to the wall bracket assembly 520 and along an axis perpendicular to the wall to align the guide bar assembly 518 along a single horizontal axis. The method further includes mounting at least one wall guide channel 538 on substantially parallel wall tracks 530 such that the wall tracks 530 support the wall guide channel 538.

The method also includes providing a plurality of monitor mount assemblies 516 engaged to the guide bar assembly 518. The method further includes slidably engaging each monitor mount assembly 516 to the guide bar assembly 518. The method also includes mounting a monitor 512 to each monitor mount assembly 516. In certain embodiments, each monitor mount assembly 516 is slid along the guide bar 528 to move the monitors 512 horizontally to position the monitors 512 edge-to-edge. The method also includes providing at least one pull line 5108 where application of a downward force on the pull line 5108 disengages the latch 5106 from the sprocket casing 594 to release the depth adjustment assembly 522 from locked position. In an embodiment, the method can include providing a release mechanism 5208 that is disengaged from the latch 5106 by rotating a release handle 5202 causing a wire 5216 to provide a downward force to a stop element 5206 thus disengaging the latch 5106.

While the invention is amenable to various modifications and alternative forms, specifics thereof have been shown by way of example in the drawings and described in detail. It is understood, however, that the intention is not to limit the invention to the particular embodiments described. On the contrary, the intention is to cover all modifications, equivalents, and alternatives falling within the spirit and scope of the invention as defined by the appended claims.

What is claimed is:

1. A mount for mounting a plurality of electronic displays on a wall, the mount comprising:
   a pair of horizontally oriented spaced apart wall tracks adapted to attach to the wall, each wall track presenting a flange;
   a plurality of vertically oriented wall guide channels, each wall guide channel presenting a pair of opposing ends with a hook disposed at each opposing end, each hook engaged with the flange of a separate one of the wall tracks;
   a plurality of adjustment assemblies, each adjustment assembly operably coupled to a separate one of the plurality of wall guide channels with an arm assembly;
   a guide bar assembly operably coupled to each of the adjustment assemblies, the guide bar assembly comprising a pair of spaced apart horizontally oriented guide bars; and
   a plurality of pairs of monitor mount brackets engaged with the guide bars, each pair of monitor mount brackets adapted to attach to a separate one of the electronic displays to attach the electronic display to the mount.

2. The mount of claim 1, wherein each adjustment assembly of the plurality of adjustment assemblies enables selective tilt positioning of the guide bar assembly relative to the wall.

3. The mount of claim 1, wherein each adjustment assembly of the plurality of adjustment assemblies enables selective depth positioning of the guide bar assembly relative to the wall.

4. The mount of claim 1, wherein each adjustment assembly of the plurality of adjustment assemblies enables selective height positioning of the guide bar assembly relative to the wall.

5. The mount of claim 1, wherein each arm assembly includes a scissoring arm.

6. The mount of claim 1, wherein the hooks of the wall guide channel include a top hook and a bottom hook, the wall tracks including a top wall track and a bottom wall track, the bottom hook being selectively shiftable to engage and disengage the bottom hook from the bottom wall track.

7. The mount of claim 1, wherein the flange of each wall track is a channel hem portion.

8. A mount for mounting a plurality of electronic displays on a wall to a pair of horizontally oriented spaced apart wall tracks on the wall, each wall track presenting a flange, the mount comprising:
- a plurality of vertically oriented wall guide channels, each wall guide channel presenting a pair of opposing ends with a hook disposed at each opposing end, each hook engaged with the flange, of a separate one of the wall tracks;
- a plurality of adjustment assemblies, each adjustment assembly operably coupled to a separate one of the plurality of wall guide channels with an arm assembly;
- a guide bar assembly operably coupled to each of the adjustment assemblies, the guide bar assembly comprising a pair of spaced apart horizontally oriented guide bars; and
- a plurality of pairs of monitor mount brackets engaged with the guide bars, each pair of monitor mount brackets adapted to attach to a separate one of the electronic displays to attach the electronic display to the mount.

9. The mount of claim 8, wherein each adjustment assembly of the plurality of adjustment assemblies enables selective tilt positioning of the guide bar assembly relative to the wall.

10. The mount of claim 8, wherein each adjustment assembly of the plurality of adjustment assemblies enables selective depth positioning of the guide bar assembly relative to the wall.

11. The mount of claim 8, wherein each adjustment assembly of the plurality of adjustment assemblies enables selective height positioning of the guide bar assembly relative to the wall.

12. The mount of claim 8, wherein each arm assembly includes a scissoring arm.

13. The mount of claim 8, wherein the hooks of the wall guide channel include a top hook and a bottom hook, the bottom hook being selectively shiftable to engage and disengage the bottom hook from the wall track with which it is engaged.

14. A method of mounting a plurality of electronic displays on a wall, the method comprising:
- affixing a first elongate wall track to the wall in a horizontal orientation;
- providing an assembly comprising a plurality of vertically oriented wall guide channels, each wall guide channel presenting a pair of opposing ends with a hook disposed at each opposing end, a plurality of adjustment assemblies, each adjustment assembly operably coupled to a separate one of the plurality of wall guide channels with an arm assembly, and a guide bar assembly operably coupled to each of the adjustment assemblies, the guide bar assembly comprising a pair of spaced apart horizontally oriented guide bars;
- engaging one of the hooks of each wall guide channel with the flange of the first wall guide channel;
- affixing a second wall guide channel to the wall, the second wall guide channel presenting a flange;
- engaging the other one of the hooks of each wall guide channel with the flange of the second wall guide channel;
- attaching a pair of monitor mount brackets to each one of the electronic displays; and
- attaching each monitor mount bracket to the guide bar assembly to mount the electronic displays to the mount and the wall.

* * * * *